(12) United States Patent
Iyer et al.

(10) Patent No.: US 12,306,778 B2
(45) Date of Patent: May 20, 2025

(54) METHOD AND SYSTEM FOR EXTENDING SDXI TO INCLUDE IP ADDRESSES

(71) Applicant: Dell Products L.P., Round Rock, TX (US)

(72) Inventors: Shyamkumar T Iyer, Cedar Park, TX (US); Glen Owen Sescila, III, Austin, TX (US); Srikrishna Ramaswamy, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 97 days.

(21) Appl. No.: 18/463,387

(22) Filed: Sep. 8, 2023

(65) Prior Publication Data

US 2025/0086129 A1    Mar. 13, 2025

(51) Int. Cl.
*G06F 13/28* (2006.01)
*G06F 13/16* (2006.01)

(52) U.S. Cl.
CPC .......... *G06F 13/28* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 9,875,199 B2* | 1/2018 | Saga | G06F 13/1673 |
| 11,281,602 B1* | 3/2022 | Iyer | G06F 13/1668 |
| 2022/0129469 A1* | 4/2022 | Iyer | G06F 16/24569 |
| 2023/0342060 A1* | 10/2023 | Koparde | G06F 12/0246 |
| 2024/0028805 A1* | 1/2024 | Sescila | G06F 30/347 |
| 2024/0036935 A1* | 2/2024 | Gowda | G06F 9/5077 |

* cited by examiner

*Primary Examiner* — Idriss N Alrobaye
*Assistant Examiner* — Dayton Lewis-Taylor
(74) *Attorney, Agent, or Firm* — Chamberlain, Hrdlicka, White, Williams & Aughtry; Aly Z. Dossa

(57) ABSTRACT

A method for managing a data movement operation includes: sending an API configuration to a producer of a first IHS to start implementing a request received from a user; enqueuing a descriptor into a descriptor ring; sending a doorbell signal to notify an SDXI function; fetching the descriptor; analyzing the descriptor to infer a source AKey table entry and a destination AKey table entry; analyzing the source AKey table entry to infer an RKey index and a source IP address index; analyzing the destination AKey table entry to infer a destination IP address index; verifying the SDXI function is allowed to access a source buffer of the first IHS; obtaining the data from the source buffer based on the source IP address index; and moving the data to a destination buffer of the second IHS using a TCP connection.

20 Claims, 21 Drawing Sheets

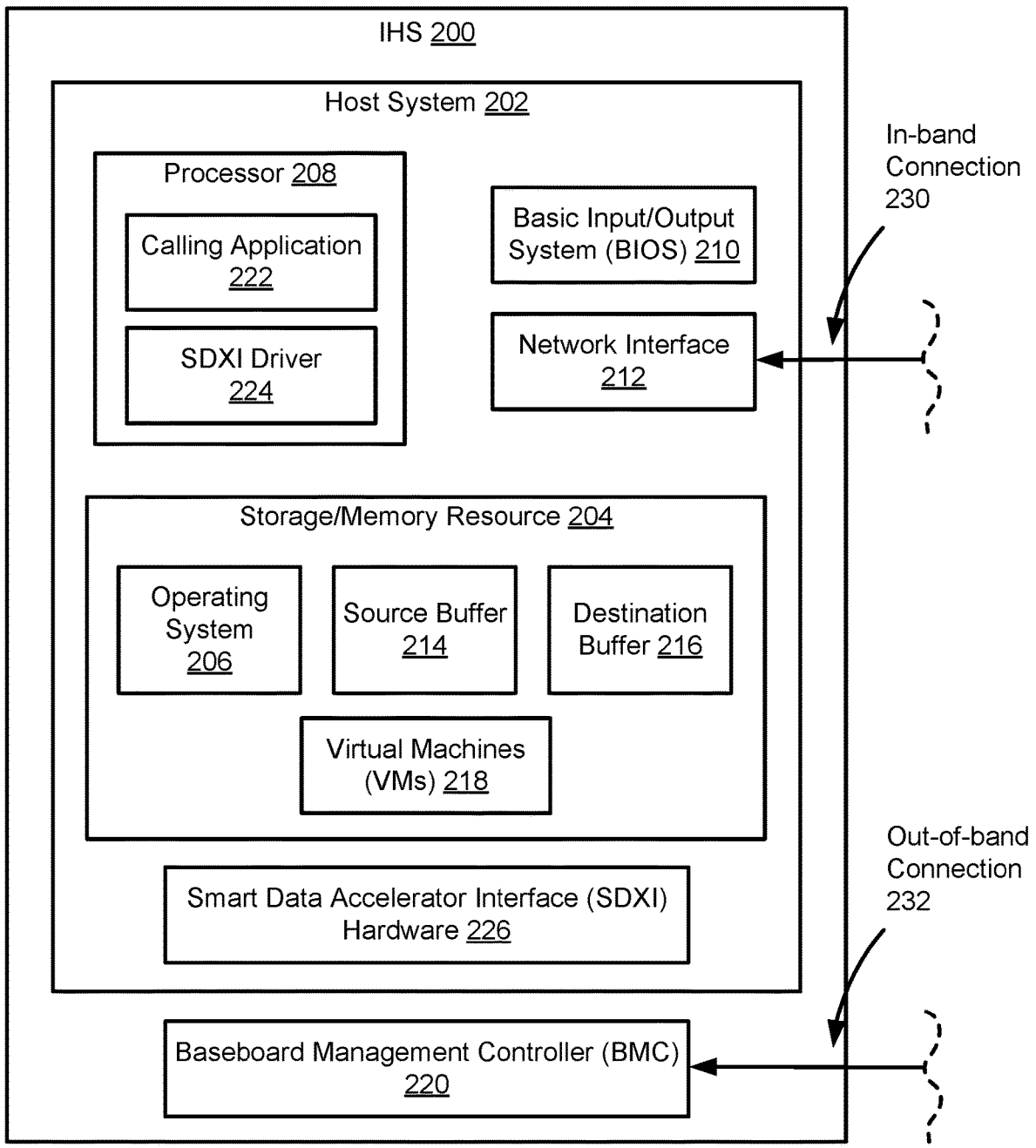
FIG. 2.1

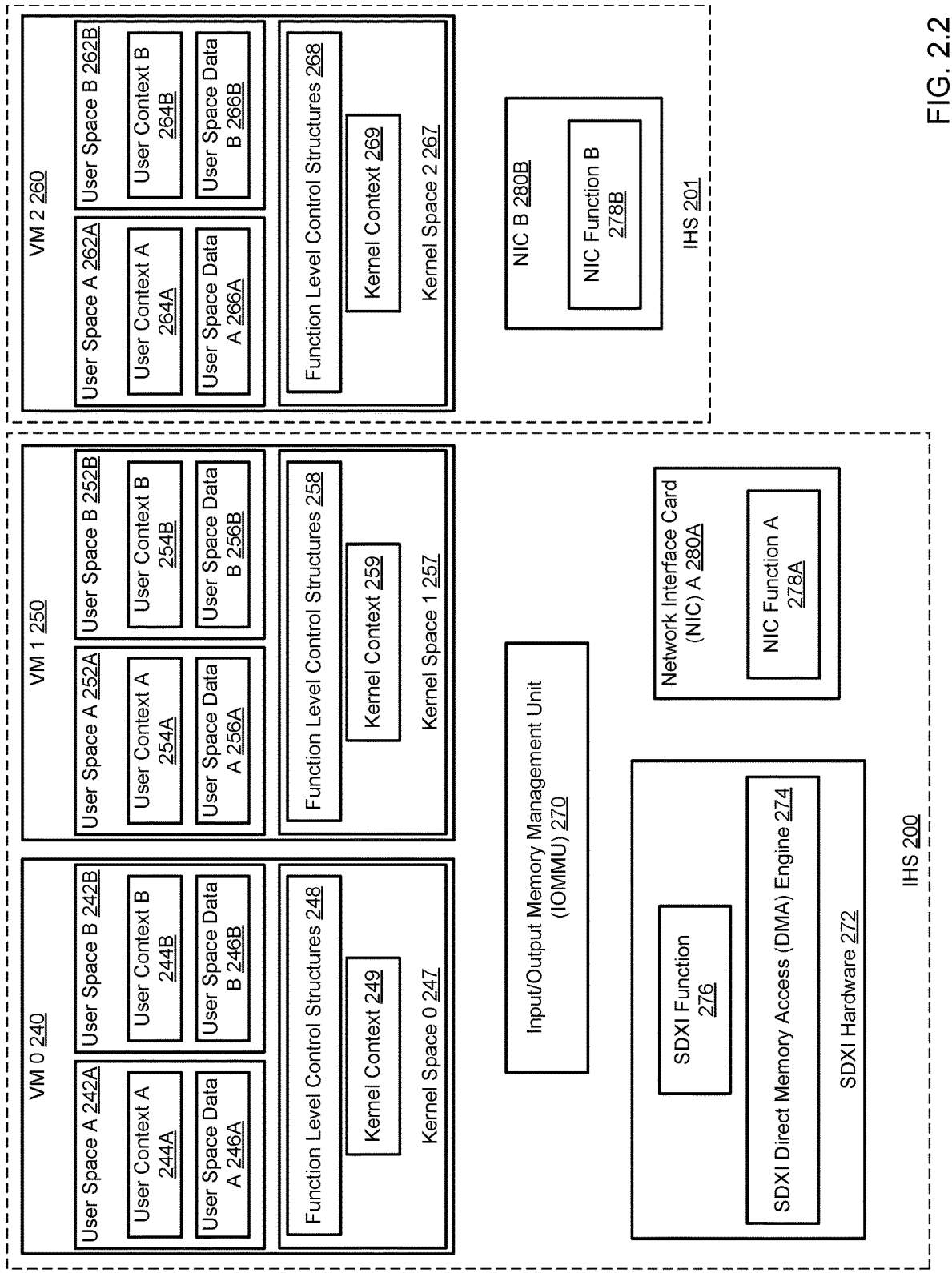
FIG. 2.2

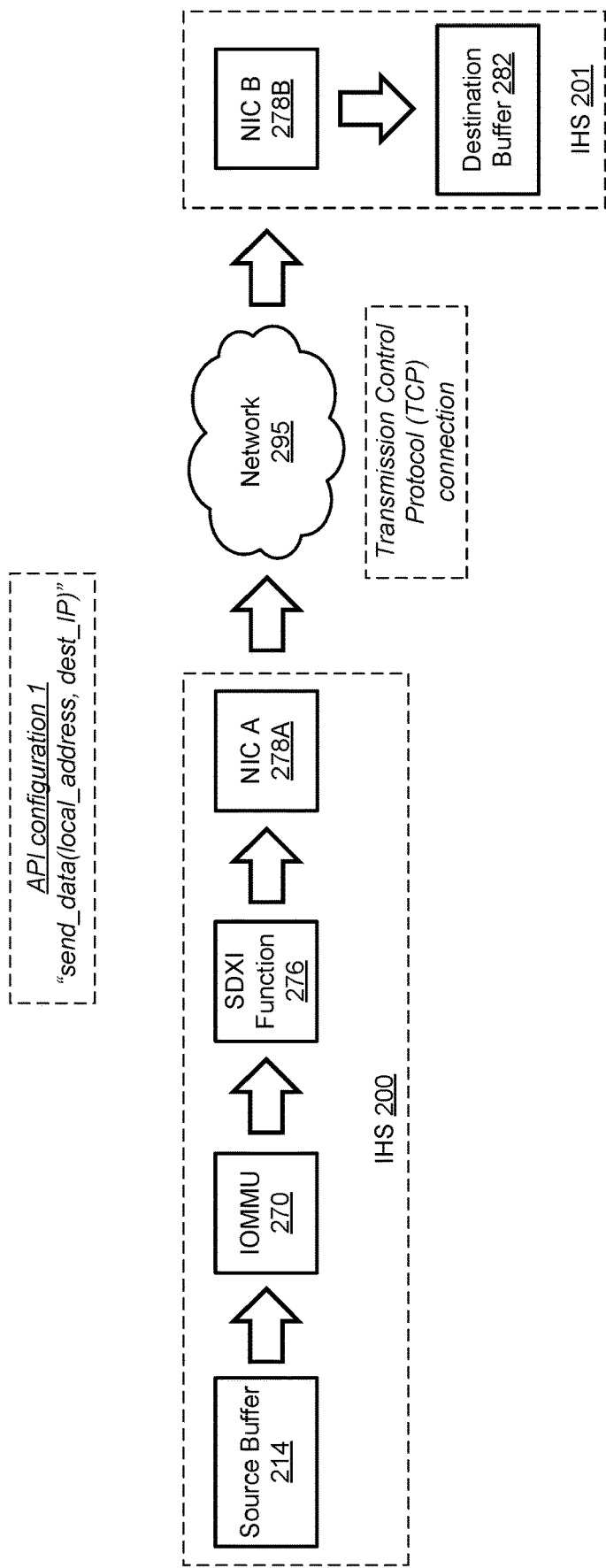
FIG 2.3

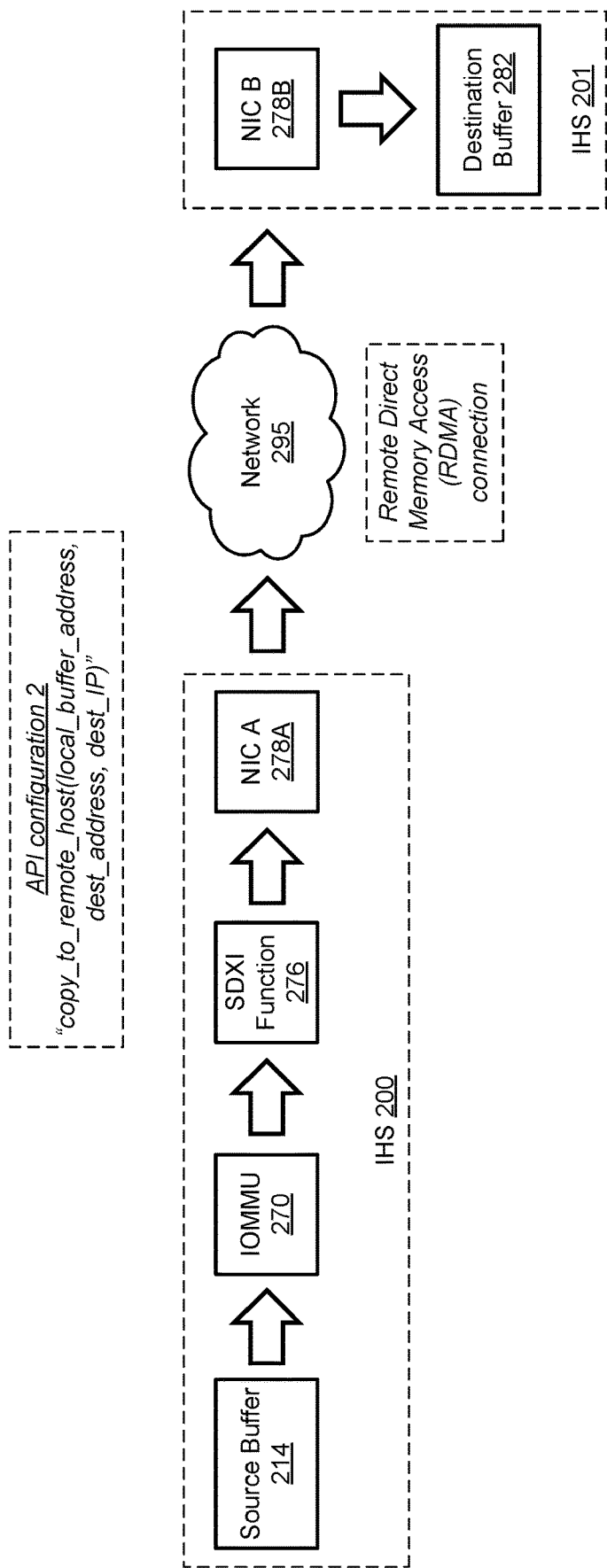
FIG 2.4

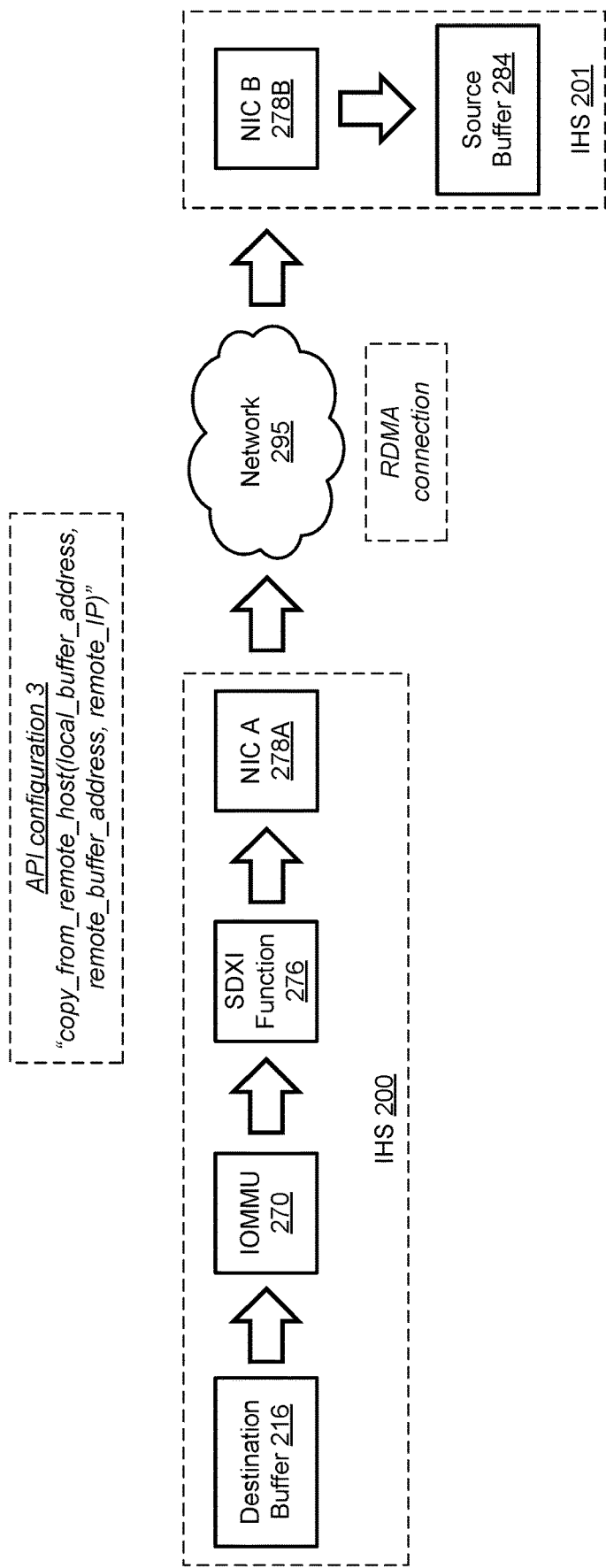
FIG 2.5

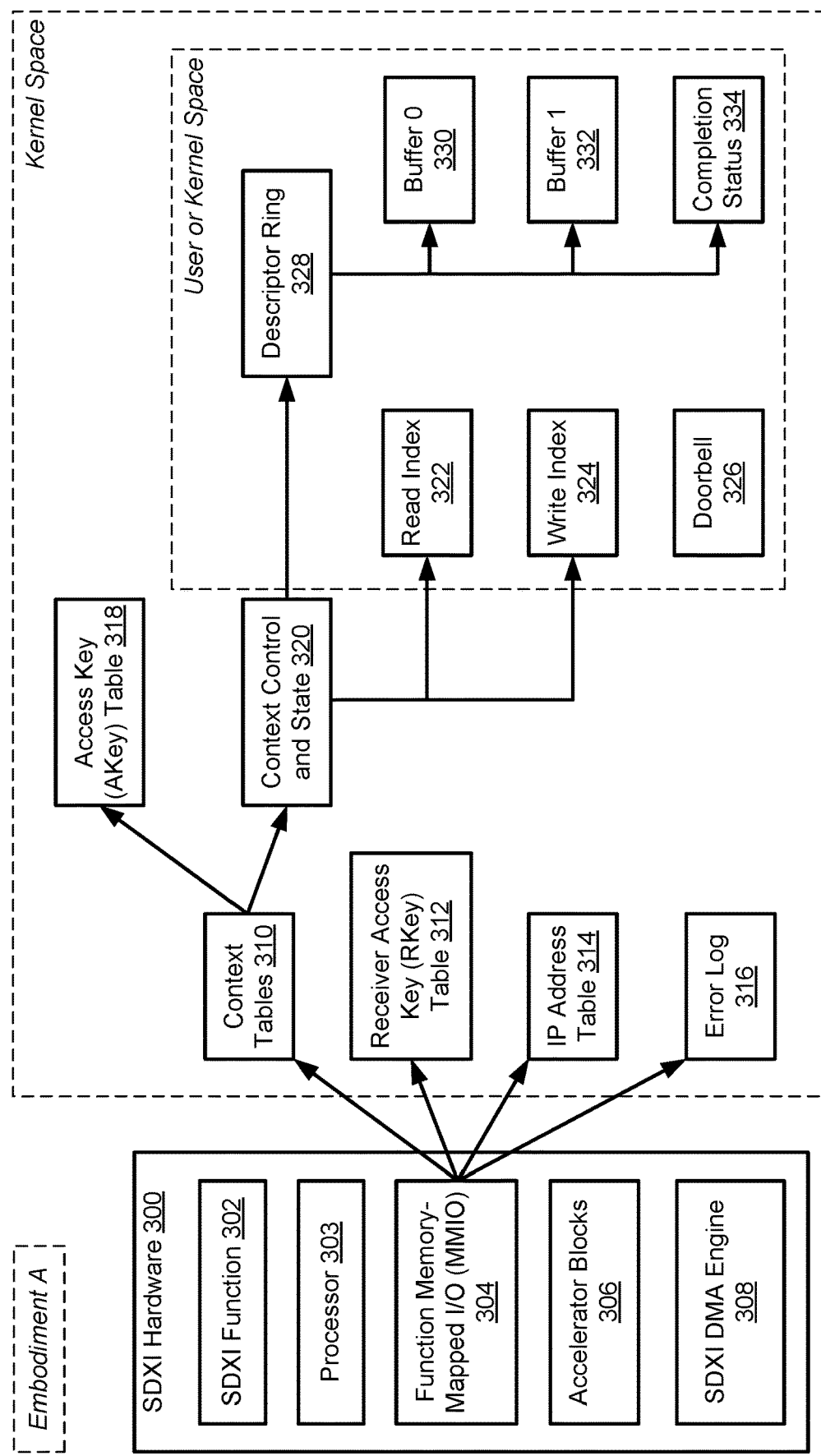
FIG. 3.1

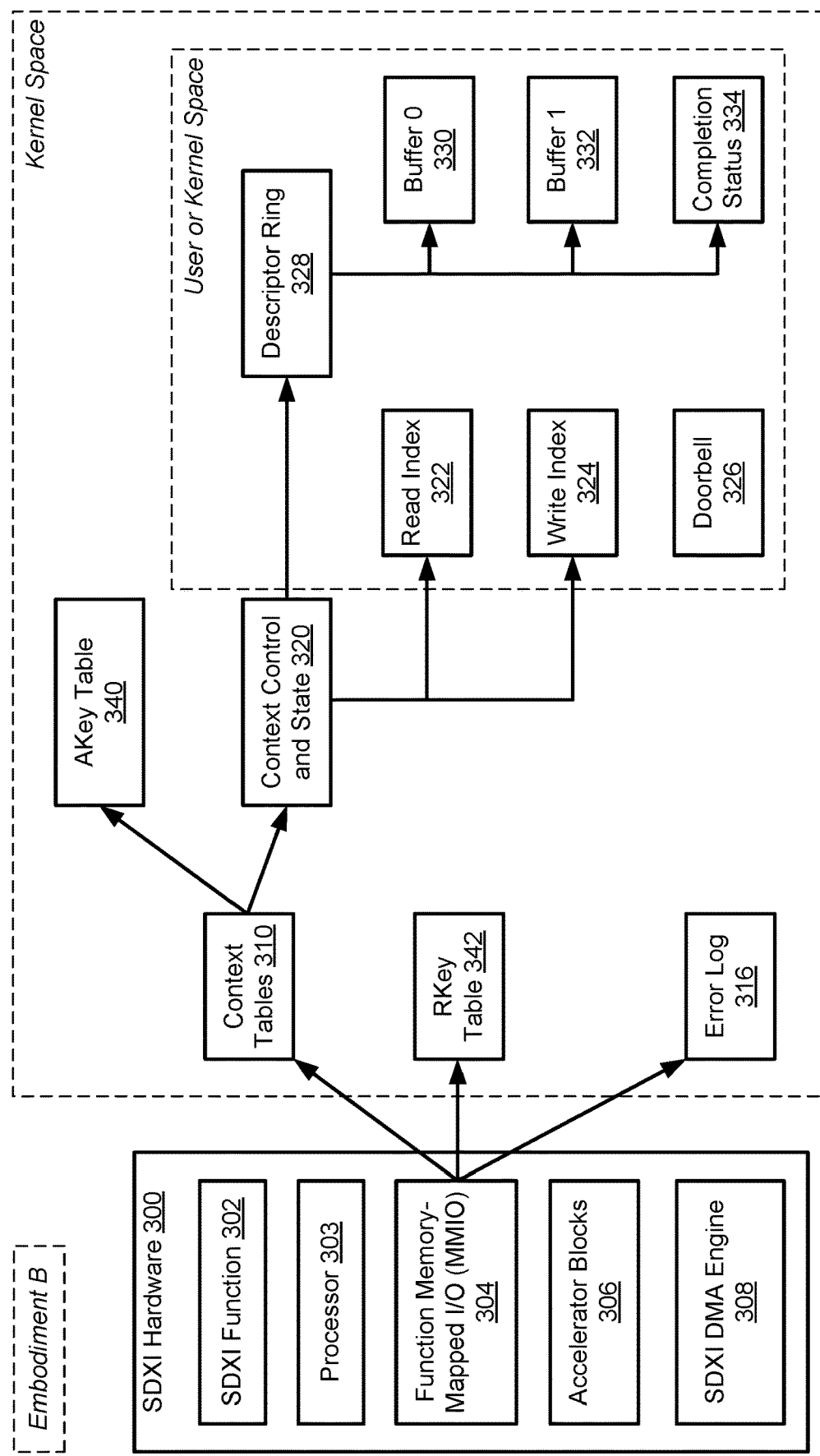
FIG. 3.2

FIG 3.3 — An AKey table entry of the AKey table shown in Embodiment A

| Bits | Field | Offset |
|---|---|---|
| 31–16: rsv / tgt_sfunc (with ph); 15–4: intr_num; 3: ste; 2: pv; 1: iv; 0: vl | | + 0x00 |
| pasid / rsv | | + 0x04 |
| stag | | + 0x08 |
| rkey / ipaddrkey | | + 0x0C |

FIG. 3.4 — An RKey table entry of the RKey table shown in Embodiment A

| Bits | Field | Offset |
|---|---|---|
| 31–16: rsv / req_sfunc (with ph); 15–4: intr_num; 3: ste; 2: pv; 1: iv; 0: vl | | + 0x00 |
| pasid / rsv | | + 0x04 |
| stag | | + 0x08 |
| rsv / ipaddrkey | | + 0x0C |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| *An AKey table entry of the AKey table shown in Embodiment B* ||||||||||||||||||||||||||||||||||
| tgt_sfunc |||||||||||||||| rsv | intr_num |||||||| ste | pv | iv | vl | + 0x00 |
| ph | rsv ||||||||||||||||||||||||||||||| + 0x04 |
| pasid |||||||||||||||||||||| stag |||||||||| + 0x08 |
| ipaddr_lower16 |||||||||||||||| rkey |||||||||||||||| + 0x0C |
| ipaddr_upper16 ||||||||||||||||||||||||||||||||| |

FIG. 3.5

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| *An RKey table entry of the Rkey table shown in Embodiment B* ||||||||||||||||||||||||||||||||||
| req_sfunc |||||||||||||||| rsv | intr_num |||||||| ste | pv | iv | vl | + 0x00 |
| ph | rsv ||||||||||||||||||||||||||||||| + 0x04 |
| pasid |||||||||||||||||||||| stag |||||||||| + 0x08 |
| ipaddr_lower16 |||||||||||||||| rsv |||||||||||||||| + 0x0C |
| ipaddr_upper16 ||||||||||||||||||||||||||||||||| |

FIG. 3.6

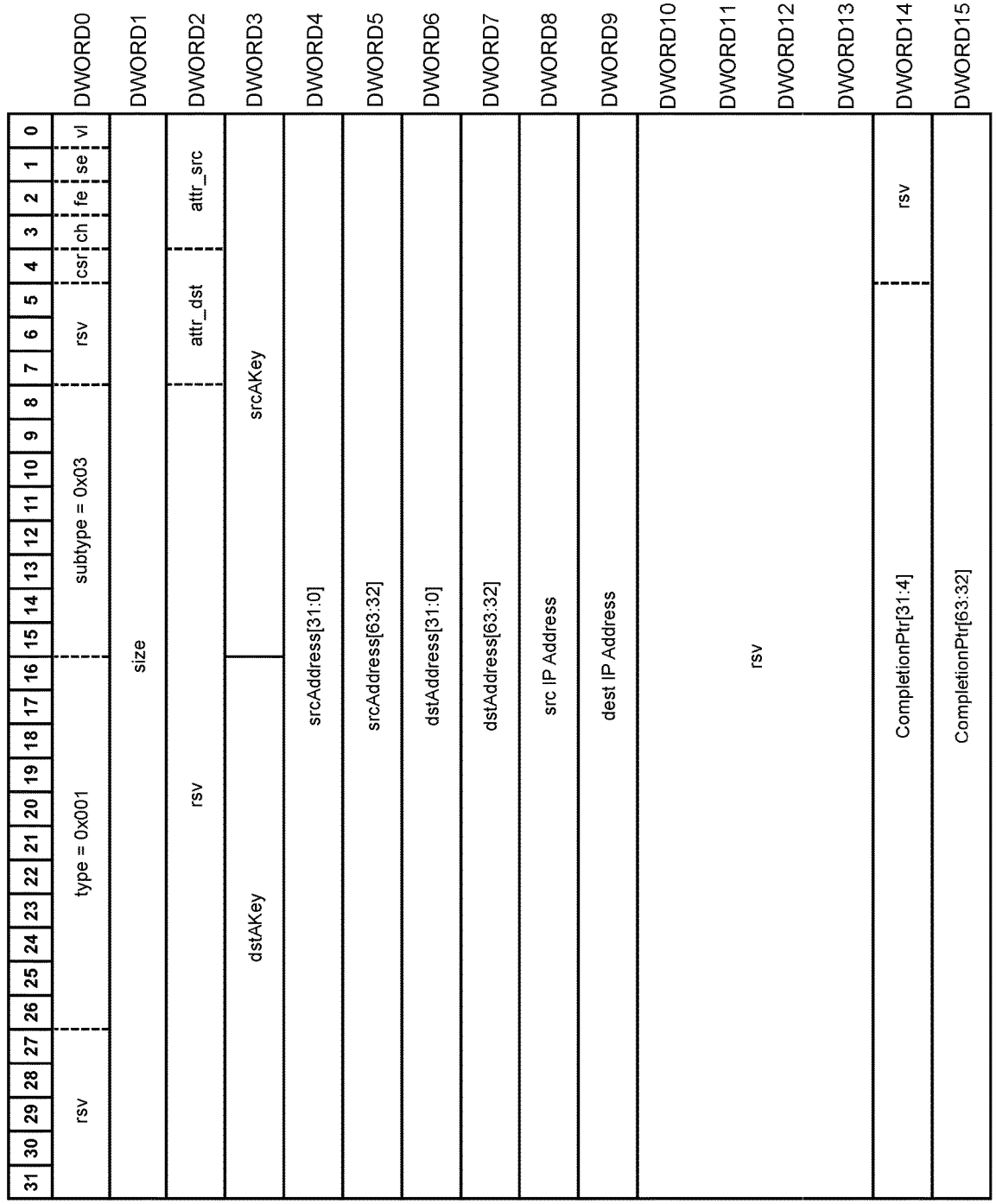
FIG. 3.7

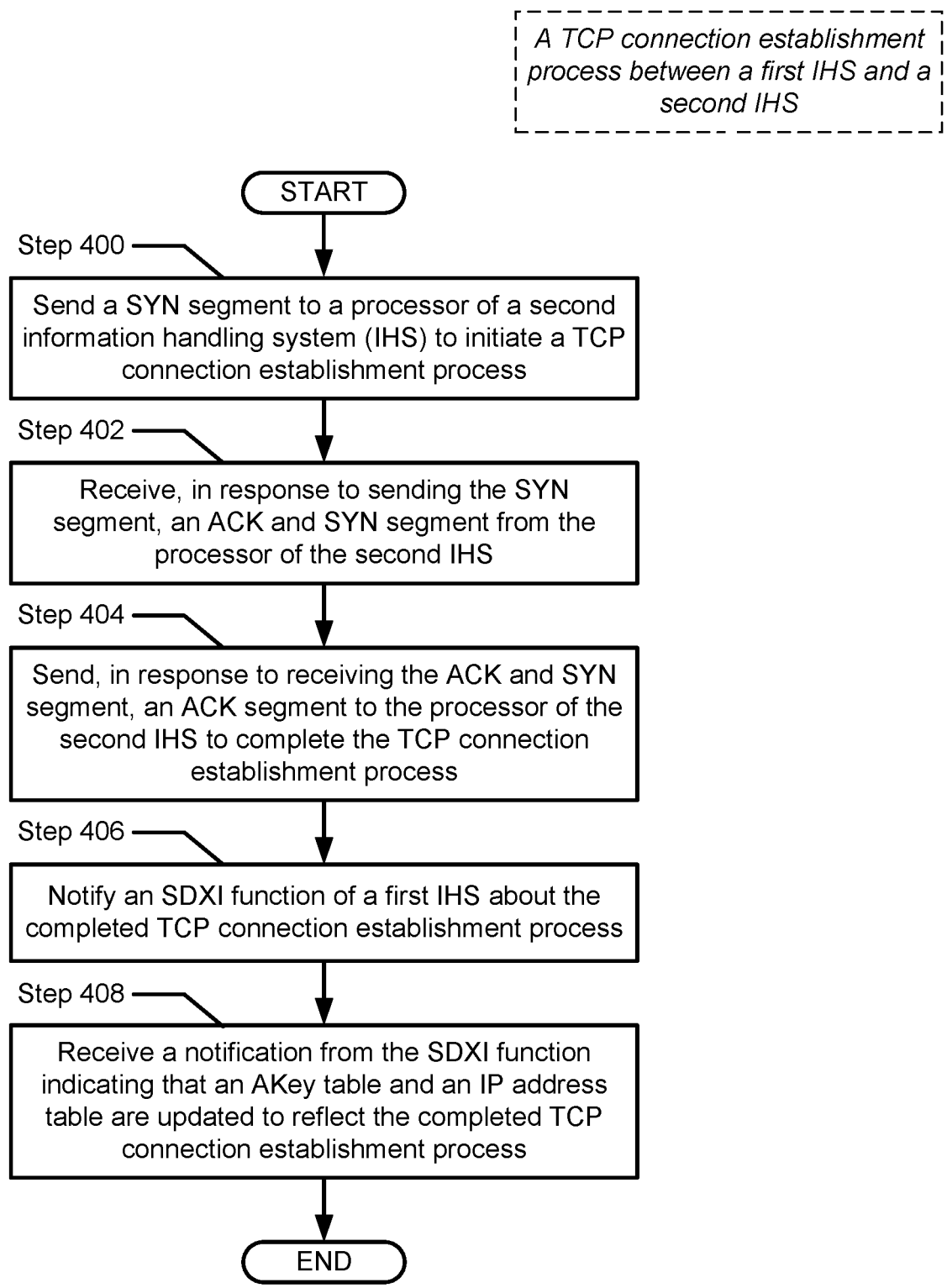
FIG. 4.1

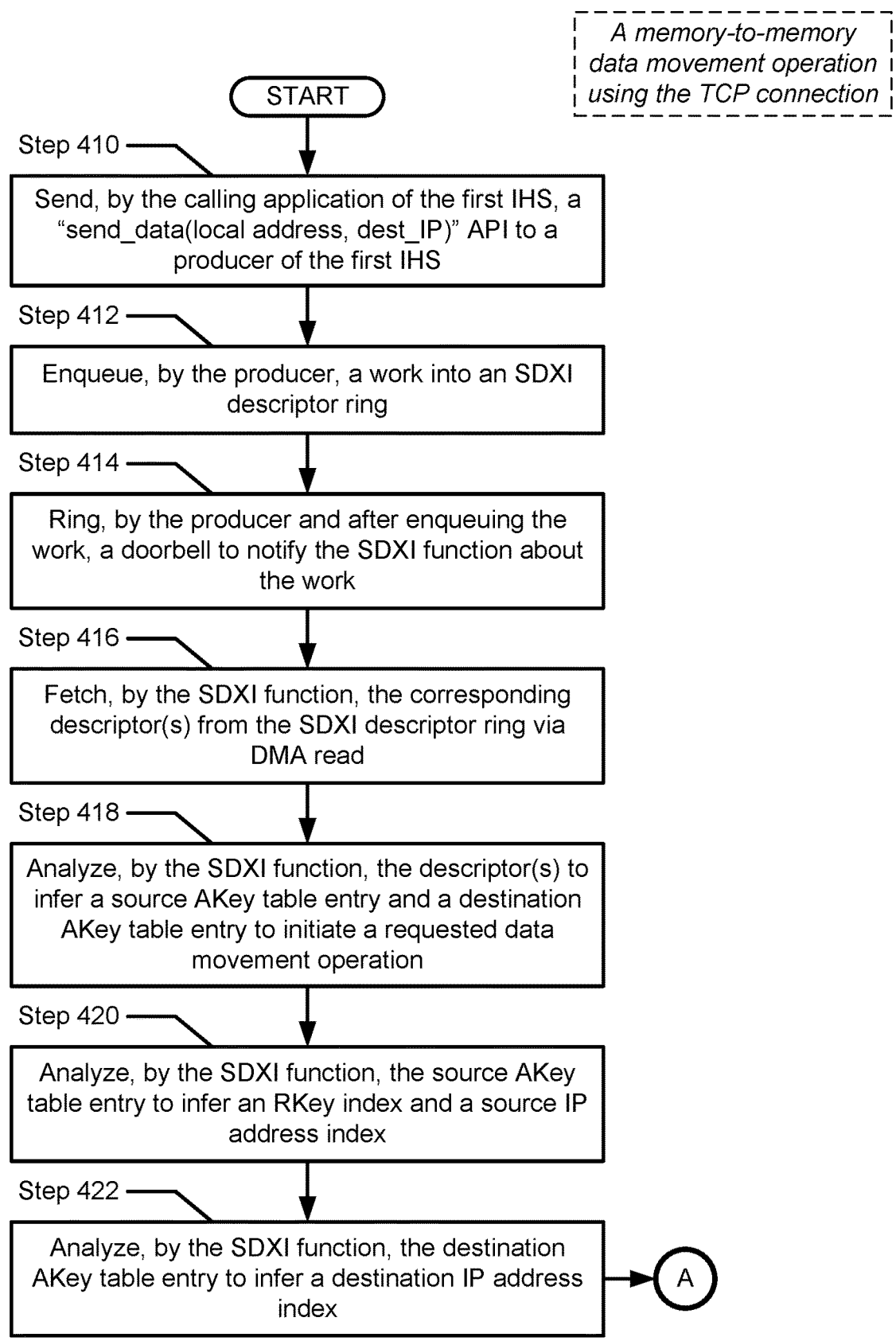
FIG. 4.2

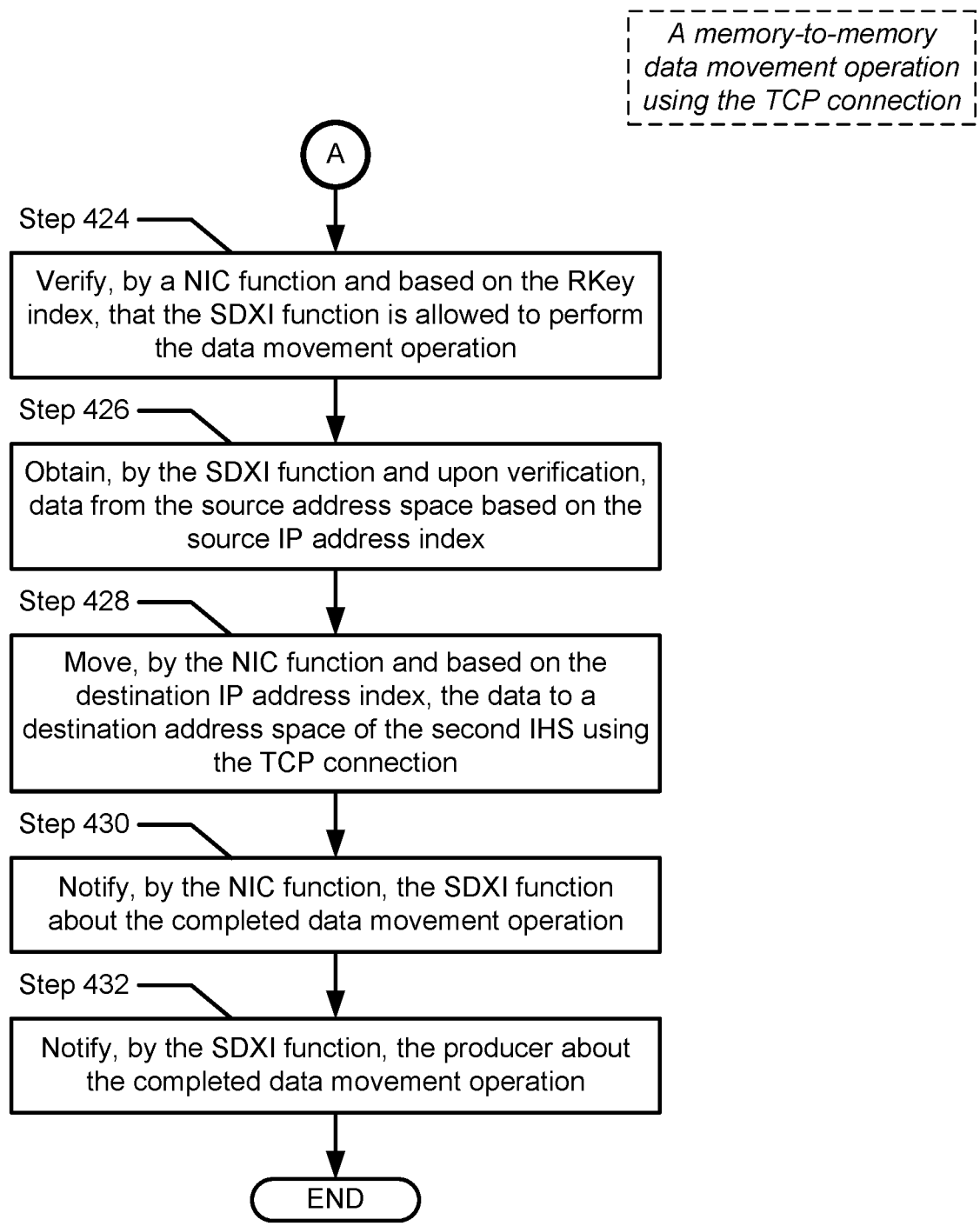
FIG. 4.3

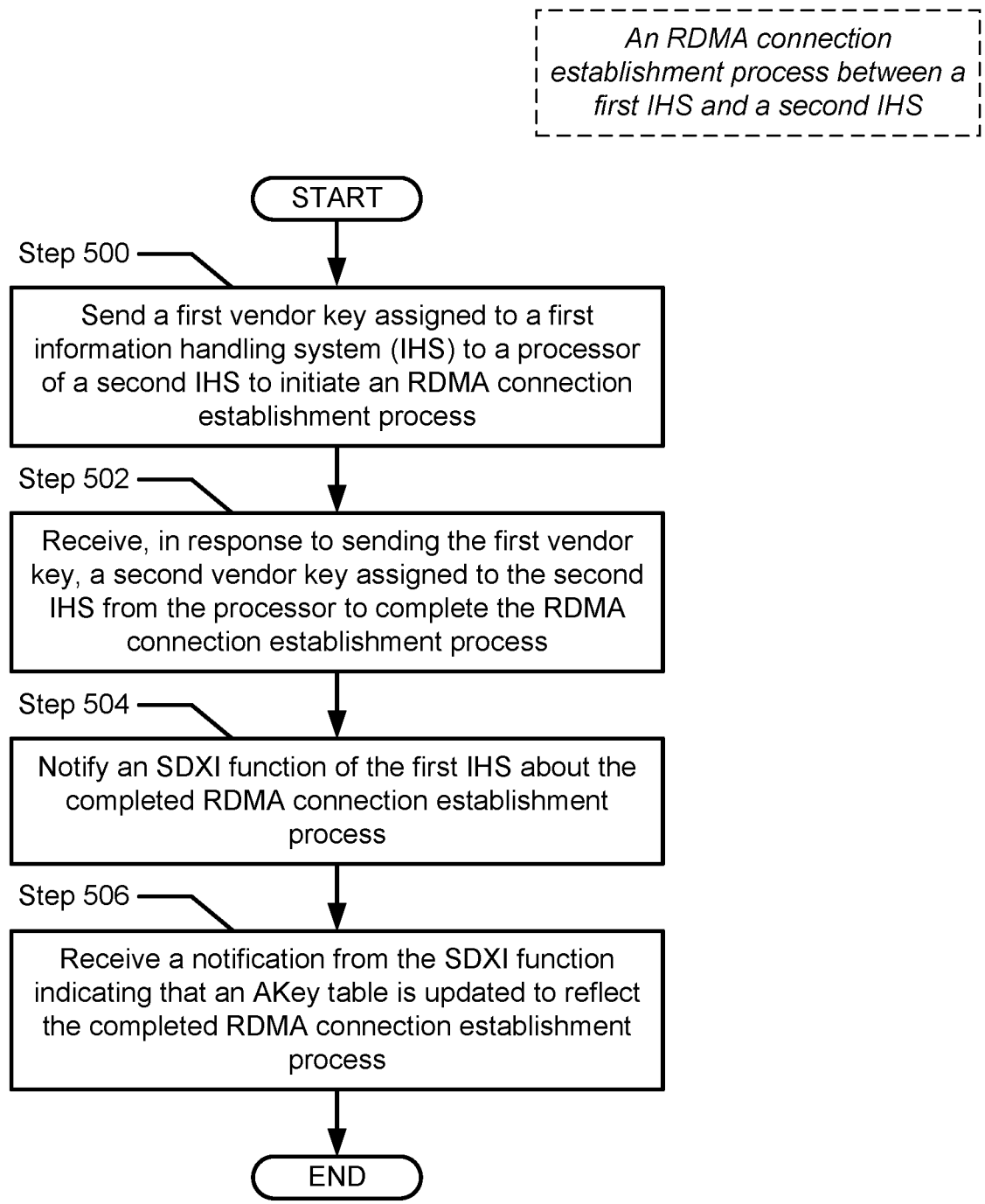
FIG. 5.1

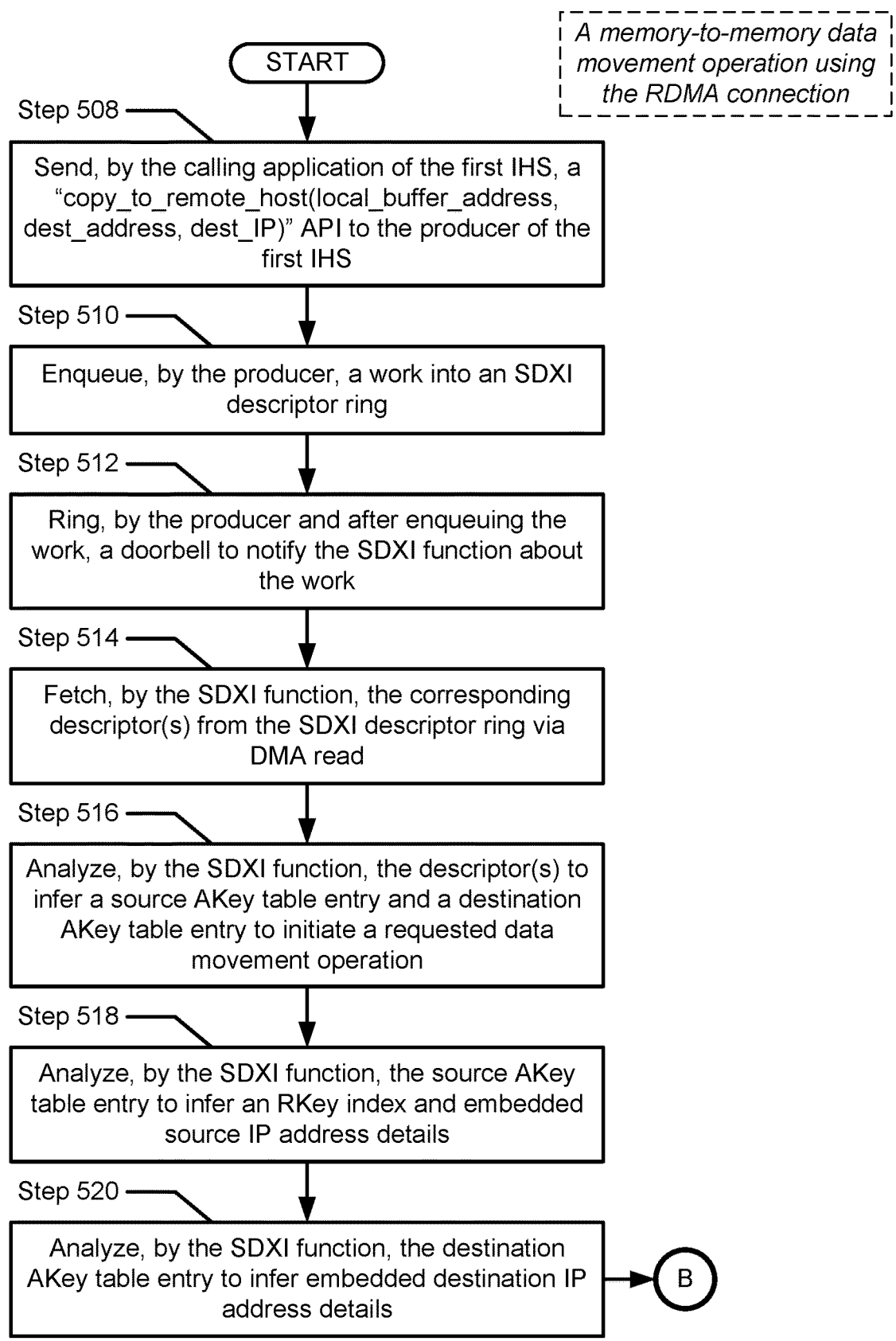
FIG. 5.2

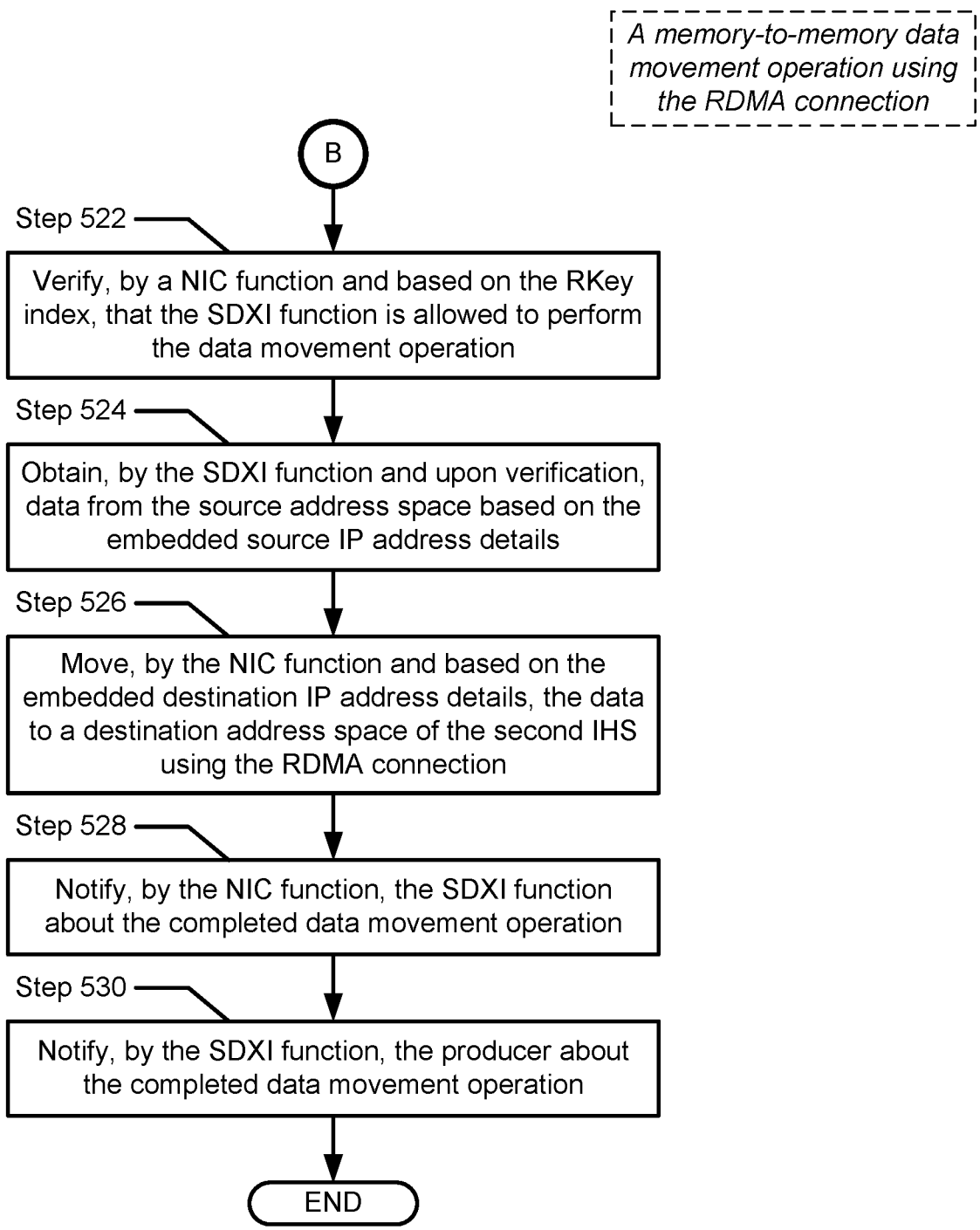
FIG. 5.3

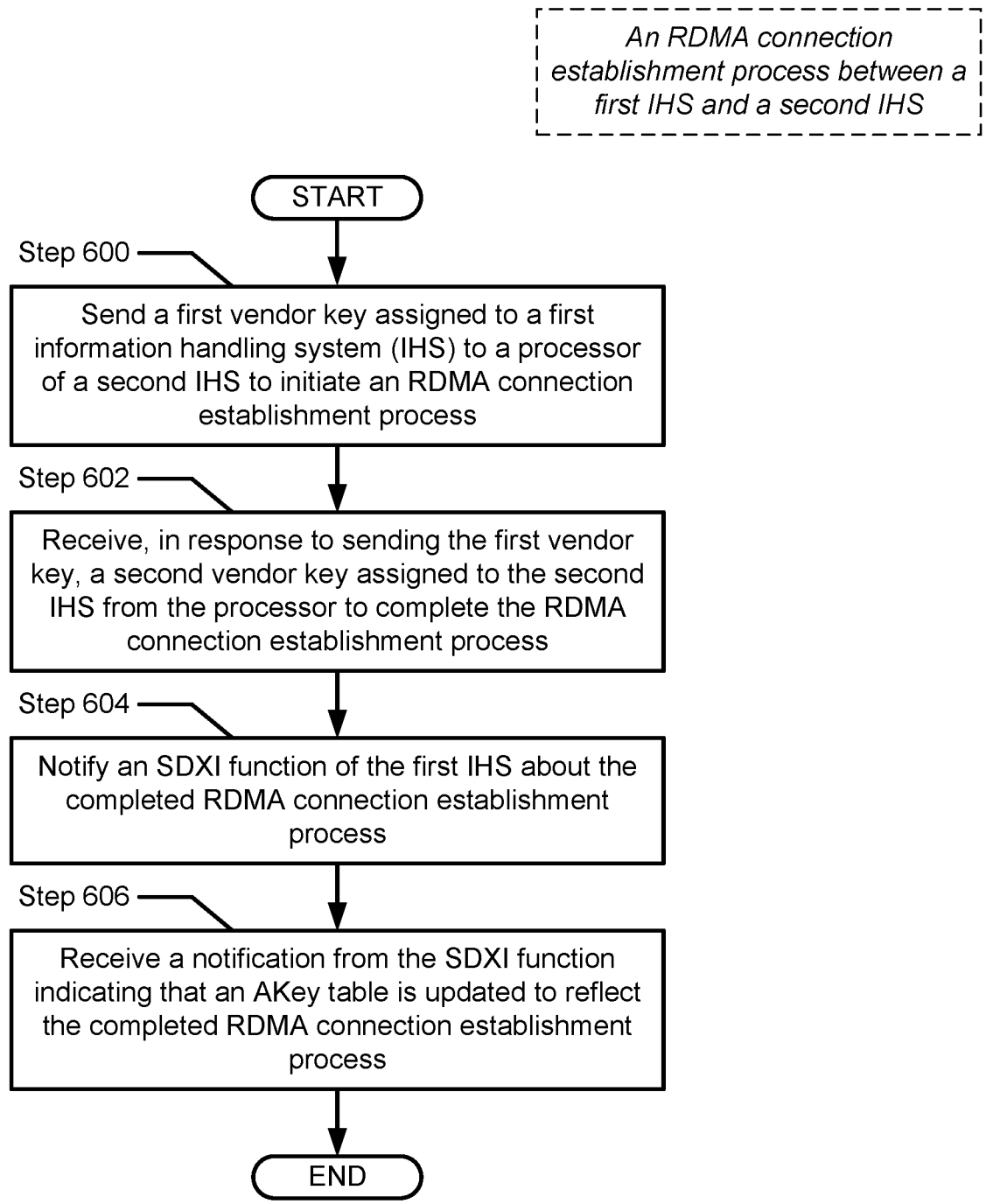
FIG. 6.1

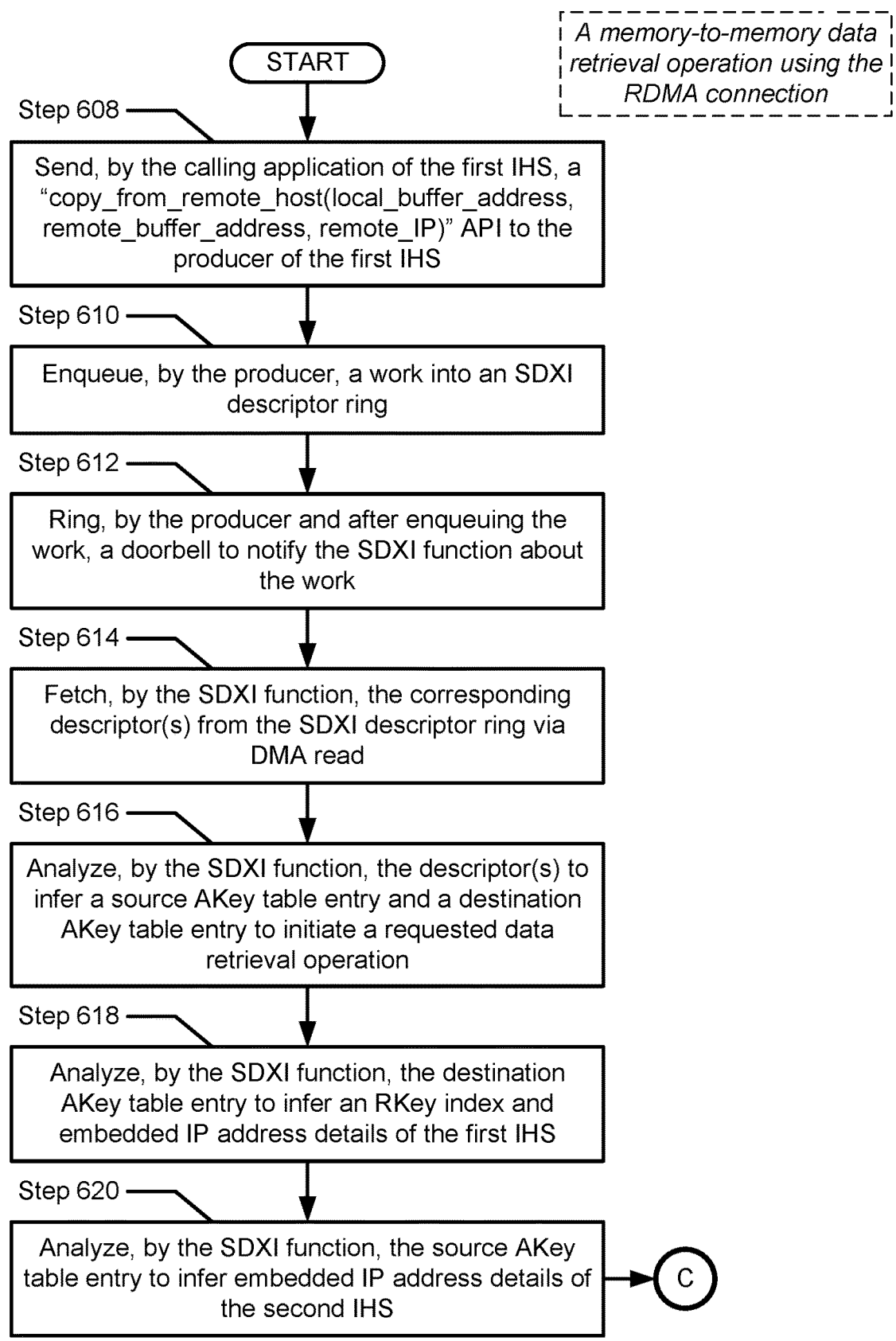
FIG. 6.2

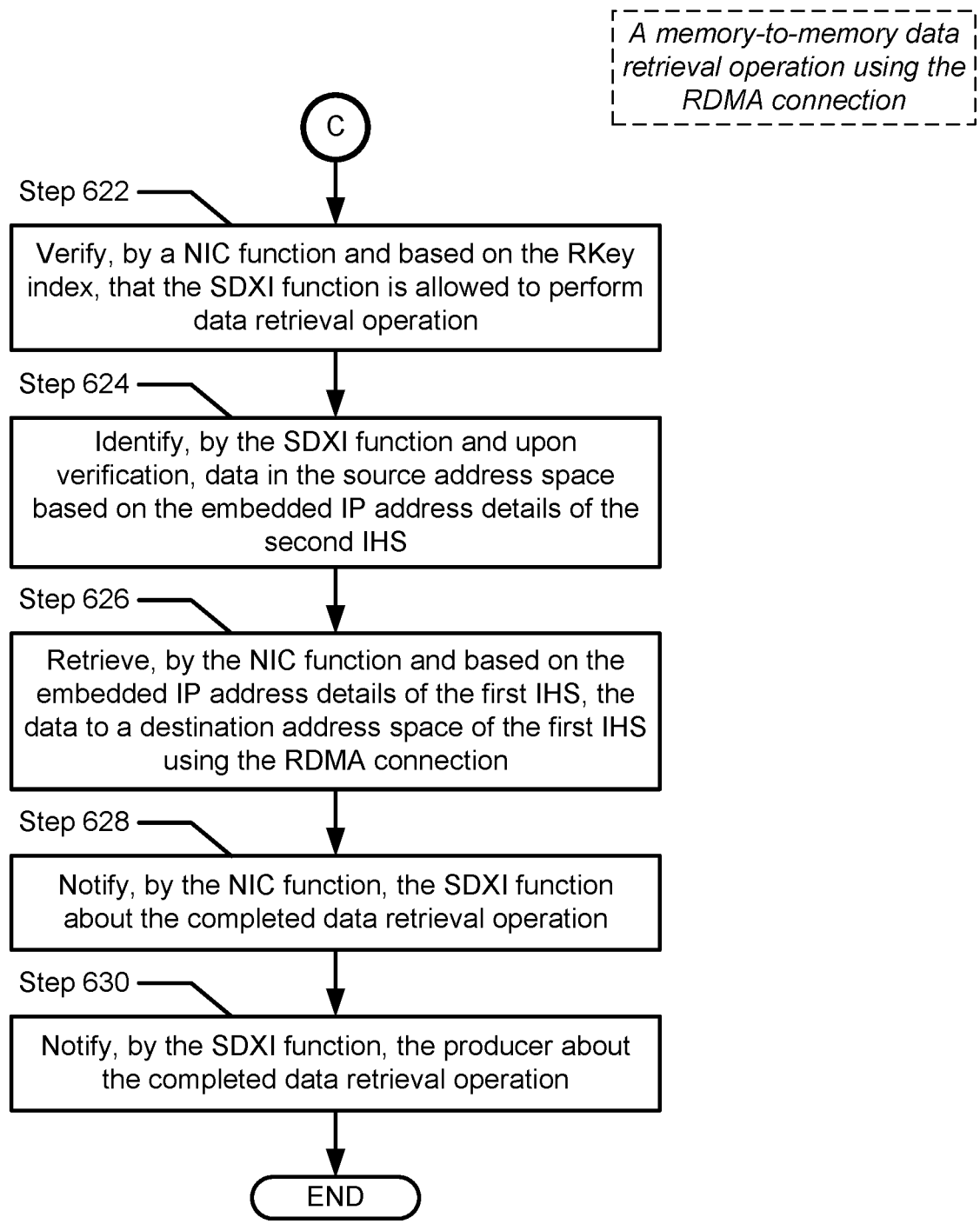
FIG. 6.3

METHOD AND SYSTEM FOR EXTENDING SDXI TO INCLUDE IP ADDRESSES

BACKGROUND

As the value and use of information continues to increase, individuals and businesses seek additional ways to process and store information. One option is an information handling system (IHS). An IHS generally processes, compiles, stores, and/or communicates information/data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow IHSs to be general or configured for a specific user or specific use such as reservations, enterprise data storage, or global communications. In addition, IHSs may include a variety of hardware and/or software resources that may be configured to process, store, and communicate data and may include one or more computer systems, data storage systems, and/or networking systems.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 2.1 shows a diagram of an IHS in accordance with one or more embodiments of the invention.

FIG. 2.2 shows a diagram that includes multiple IHSs in accordance with one or more embodiments of the invention.

FIGS. 2.3-2.5 show different memory-to-memory data movement or retrieval operations using different simplified application programming interface (API) configurations in accordance with one or more embodiments of the invention.

FIG. 3.1 shows a layout including smart data accelerator interface (SDXI) hardware and memory-addressed data structures in accordance with one or more embodiments of the invention.

FIG. 3.2 shows a layout including SDXI hardware and memory-addressed data structures in accordance with one or more embodiments of the invention.

FIG. 3.3 shows an access key (AKey) table entry in accordance with one or more embodiments of the invention.

FIG. 3.4 shows a receiver access key (RKey) table entry in accordance with one or more embodiments of the invention.

FIG. 3.5 shows an AKey table entry in accordance with one or more embodiments of the invention.

FIG. 3.6 shows an RKey table entry in accordance with one or more embodiments of the invention.

FIG. 3.7 shows a descriptor format in accordance with one or more embodiments of the invention.

FIG. 4.1 shows a transmission control protocol (TCP) connection establishment process between a first IHS and a second IHS in accordance with one or more embodiments of the invention.

FIGS. 4.2 and 4.3 show a memory-to-memory data movement operation using a TCP connection in accordance with one or more embodiments of the invention.

FIG. 5.1 shows a remote direct memory access (RDMA) connection establishment process between a first IHS and a second IHS in accordance with one or more embodiments of the invention.

FIGS. 5.2 and 5.3 show a memory-to-memory data movement operation using an RDMA connection in accordance with one or more embodiments of the invention.

FIG. 6.1 shows an RDMA connection establishment process between a first IHS and a second IHS in accordance with one or more embodiments of the invention.

FIGS. 6.2 and 6.3 show a memory-to-memory data retrieval operation using an RDMA connection in accordance with one or more embodiments of the invention.

DETAILED DESCRIPTION

Figure 1:
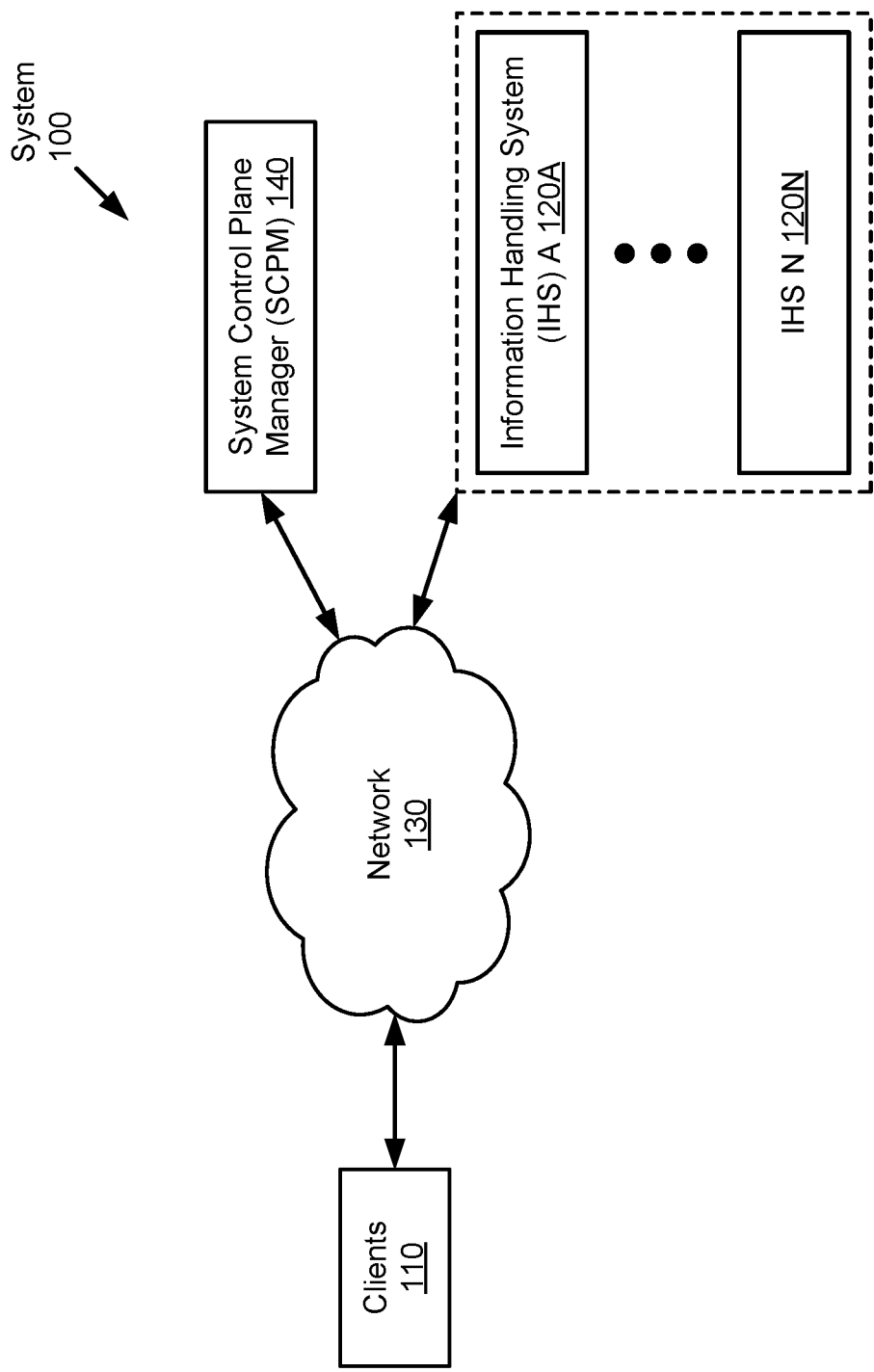
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, as central processing unit (CPU) cores scale, the usage and demand for ever larger and faster data exchange scale, which means (i) there is a desperate need to increase core counts to enable scaling (e.g., scaling among kernels, applications, virtual machines (VMs), input/output (I/O) devices, etc.) and (ii) compute density is on the rise. In most cases, (a) I/O intensive workloads and (b) network and storage workloads are becoming noticeable in terms of how they take away compute cycles available within a computing system.

A user may execute a computing system (or a compute infrastructure) based on one or more VMs, in which using network stacks, the user may scale the VMs in order to meet application demands. In most cases, the user may use a separate storage infrastructure in the form a storage VM or may use an entire storage network to satisfy all of the storage needs. Recently, accelerating intra-host traffic and inter-host traffic are becoming critical to server/host performance, because, for example, each intra-host exchange may include multiple buffer copies. However, software-to-software copies usually rely on per-core synchronous software (CPU only) memory copies (e.g., memcpy). Still, a stable CPU instruction set architecture (ISA) is assumed as the current data movement standard; however, because one needs to rely on CPU instructions, (i) they may take away from applications' performance (e.g., because the compute cycles are used up to perform memory copies) and (ii) they may introduce overhead when one needs to provide context isolation layers between, for example, two VMs.

In order to overcome the aforementioned problems, developers used various different methods such as, for example, offload direct memory access (DMA) engines (e.g., to preform hardware DMA copies between VMs). However, offload DMA engines generate other problems, for example, (i) being vendor-specific implementations, (ii) coming with vendor-specific APIs, and (iii) not being useful in terms of direct access by user-level software. To this end, in order to overcome the aforementioned problems, developers build an architecture/interface (i.e., the SDXI) to standardize a memory-to-memory data movement and acceleration among entities. However, to perform a memory-to-memory data movement, current SDXI descriptors only takes memory addresses (or memory address spaces) for a source and a destination (e.g., the addressing is based on memory addresses (e.g., source address space, destination address space, etc.), where there is no Internet protocol (IP) based addressing (e.g., IP address space) available in the SDXI descriptors).

Further, current SDXI APIs (e.g., copy (source_address, destination_address)) only specify source address space(s) and/or destination address space(s) and because the aforementioned issue with the current SDXI descriptors, there is no way to know/distinguish whether the source address space and/or destination address space is a local or remote address space (e.g., address space located in a different IHS). The current SDXI assumes that as long as there is a path and prior information of a destination address space (e.g., of a remote location), a memory-to-memory data movement operation may be performed based on the prior information. However, if there is no prior information of a destination address space, performance of a memory-to-memory data movement operation would not be possible (e.g., to make this operation possible, at least, a remote identifier, an IHS-based addressing, or an IP-based addressing is required).

For at least the reasons discussed above and without requiring resource (e.g., time, engineering, etc.) intensive efforts, a fundamentally different approach is needed. Embodiments of the invention relate to methods and systems to manage a data movement or retrieval operation. More specifically, in one or more embodiments, a calling application (CA) may first send an API configuration to a producer of a first IHS to start implementing a data movement request received from a user. Upon receiving the API, the producer may enqueue a descriptor into a descriptor ring, in which the producer enqueues the descriptor to make sure that the producer and an SDXI function are synchronized. After enqueuing the descriptor, the producer may send a doorbell signal to notify the SDXI function about a presence of the descriptor. In response to receiving the doorbell signal, the SDXI function may fetch the descriptor from the descriptor ring via direct memory access (DMA) read.

Thereafter, the SDXI function may analyze the descriptor to infer a source AKey table entry of an AKey table and a destination AKey table entry of the AKey table to initiate the data movement operation. The SDXI function may analyze the source AKey table entry to infer an RKey index and a source IP address index, in which the SDXI function may send the RKey index to a network interface controller (NIC) function. The SDXI function may then analyze the destination AKey table entry to infer a destination IP address index. The NIC function may verify that the SDXI function is allowed to perform the operation. Upon verification, the SDXI function obtains the data from the source buffer based on the source IP address index, in which, after the obtaining, the SDXI function may send the data to the NIC function. Based on the destination IP address, the NIC function may move the data to a destination buffer of the second IHS using a TCP connection. Finally, the NIC function may then initiate notification of the SDXI function about the completed data movement operation.

As a result of the processes discussed below, one or more embodiments disclosed herein advantageously ensure that: (i) I/O is offloaded from compute CPU cycles, (ii) architectural stability is provided for a better user experience (which is aligned with CPU instructions without using CPU cycles for them), (iii) data movement or retrieval is accelerated among applications and/or VMs (while enabling migration from existing software stacks), (iv) address-space to address-space (e.g., memory-to-memory) data movement is enabled while being extensible, forward-compatible, and/or independent of I/O interconnect technology, (v) a data movement operation (or a data retrieval operation) between different address spaces (e.g., including user address spaces both within and/or across VMs, newer address spaces that get defined, etc.) is enabled, (vi) memory-to-memory data movement is enabled without mediation by privileged software once a connection has been established, (vii) real-time workload and/or VM migration between IHSs is enabled by ensuring that all of architectural states are open and standard (e.g., a suspend state, a resume state, etc.), (viii) forwards and backwards compatibility is enabled to provide interoperability between different software and/or hardware, (ix) a concurrent DMA model is satisfied (e.g., where multiple parallel DMAs may occur without one obstructing the other), (x) scalable data movement is enabled (e.g., a standard interface (i.e., the SDXI), that supports acceleration, software reuse, and virtualization, is provided), (xi) a number of required memory buffer copies is reduced, (xii) hardware-based offloaded memory copies are enabled (e.g., to provide much better performance), (xiii) when performing a memory-to-memory data movement operation, software context isolation layers are eliminated and direct user-mode access (e.g., from applications) is allowed, (xiv) a method to extend SDXI data structures (e.g., an AKey table, an RKey table, a descriptor ring, etc., see FIG. 3.1) and the corresponding APIs (see FIGS. 2.3-2.5) is provided in such a way that an SDXI producer may specify a remote IHS' IP address for memory access (or memory address space access), (xv) an SDXI function is able to implement a TCP and/or an RDMA to perform a data transfer operation, (xvi) IP-based addressing is available in SDXI descriptors (see FIG. 3.7), (xvii) without dealing with so many APIs, a simplified/normalized SDXI API is provided to allow specifying source IHS' IP address and/or destination IHS' IP address for a data movement operation to provide a better user experience, (xviii) a method to simplify SDXI APIs and to offload IP address based data movement establishment and management (e.g., error management) is provided (e.g., from an SDXI function's point of view), (xix) a standard interface is enabled for privileged software to control a data mover including connection management and data movement between multiple address spaces, and/or (xx) a standard interface that can be virtualized by privileged software is enabled to allow greater compatibility of workloads or VMs across different IHSs.

The following describes various embodiments of the invention.

FIG. 1 shows a diagram of a system (100) in accordance with one or more embodiments of the invention. The system (100) includes any number of clients (110), a system control plane manager (SCPM) (140) (e.g., an orchestrator), any number of IHSs (e.g., IHS A (120A), IHS B (120B), etc.), and a network (130). The system (100) may include additional, fewer, and/or different components without departing from the scope of the invention. Each component may be operably connected to any of the other components via any combination of wired and/or wireless connections. Each component illustrated in FIG. 1 is discussed below.

In one or more embodiments, the clients (110), the SCPM (140), and the IHSs (e.g., 120A, 120B, etc.) may be physical or logical devices, as discussed below. While FIG. 1 shows a specific configuration of the system (100), other configurations may be used without departing from the scope of the invention. For example, although the clients (110) and the IHSs (e.g., 120A, 120B, etc.) are shown to be operatively connected through a communication network (e.g., 130), the clients (110) and the IHSs (e.g., 120A, 120B, etc.) may be directly connected (e.g., without an intervening communication network). As yet another example, although the SCPM (140) and the IHSs (e.g., 120A, 120B, etc.) are shown to be operatively connected through a communication network (e.g., 130), the SCPM (140) and the IHSs (e.g., 120A, 120B, etc.) may be directly connected.

Further, the functioning of the clients (110) and the IHSs (e.g., 120A, 120B, etc.) is not dependent upon the functioning and/or existence of the other components (e.g., devices) in the system (100). Rather, the clients (110) and the IHSs (e.g., 120A, 120B, etc.) may function independently and perform operations locally that do not require communication with other components. Accordingly, embodiments disclosed herein should not be limited to the configuration of components shown in FIG. 1.

In one or more embodiments, the system (100) may represent a distributed system (e.g., a distributed computing environment, a private network environment, etc.) that delivers, at least, computing power, storage capacity, and data protection as a service to users of the clients (110). The system (100) may also represent a comprehensive middleware layer running on computing devices (e.g., 700, FIG. 7) that supports virtualized application environments. In one or more embodiments, the system (100) may support a VM environment, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide the aforementioned computer-implemented services to the users, the system (100) may perform some computations locally (e.g., at the users' site using the clients (110)) and other computations remotely (e.g., away from the users' site using the environments (e.g., 120A, 120B, etc.)) from the users. By doing so, the users may utilize different computing devices that have different quantities of computing resources while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, a "resource" refers to any program, application, document, file, asset, executable program file, desktop environment, computing environment, or other resource made available to, for example, a user of a client. The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a data center (not shown) may be configured for hosting the IHSs (e.g., 120A, 120B, etc.) and maintaining various workloads, and/or for providing a computing environment whereon workloads may be implemented (to provide computer-implemented services). As being implemented as a physical computing device or a logical computing device and with the help of the hosted IHSs, a data center may include functionality to, e.g.,: (i) provide software-defined data protection, (ii) provide automated data discovery, protection, management, and/or recovery operations, (iii) provide data deduplication, (iv) empower data owners to perform self-service data backup and restore operations from their native applications, (v) ensure compliance and satisfy different types of service level objectives (SLOs), (vi) enable data discovery, protection, management, and/or recovery operations for cloud-native workloads across multiple cloud environments, (vii) simplify VM image backups of a VM with near-zero impact on the VM, (viii) increase resiliency of an organization by enabling rapid recovery or cloud disaster recovery from cyber incidents, (ix) provide dynamic network-attached storage (NAS) backup and recovery, (x) consolidate multiple data process or protection requests (received from, for example, the clients (110)) so that duplicative operations (which may not be useful for restoration purposes) are not generated, and/or (xi) initiate multiple data process or protection operations in parallel.

In one or more embodiments, a data center may be capable of providing a range of functionalities/services to the users of the clients (110). However, not all of the users may be allowed to receive all of the services. To manage the services provided to the users of the clients (110), a system (e.g., a service manager) in accordance with embodiments of the invention may manage the operation of a network (e.g., 130), in which the clients (110) are operably connected to the data center. Specifically, the service manager (i) may identify services to be provided by the data center (for example, based on the number of users using the clients (110)) and (ii) may limit communications of the clients (110) to receive data center provided services.

For example, the priority (e.g., the user access level) of a user may be used to determine how to manage computing resources (e.g., of the IHSs (e.g., 120A, 120B, etc.)) within the data center to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a user with a user access level/tier of 4/10). In such a scenario, the user level of that user may indicate that certain ports (of the subcomponents of the network (130) corresponding to communication protocols such as TCP, user datagram protocol (UDP), etc.) are to be opened, other ports are to be blocked/disabled so that (i) certain services are to be provided to the user by the data center (e.g., while the computing resources of the IHSs (e.g., 120A, 120B, etc.) may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (110) may be granularly configured without modifying the operation(s) of the clients (110) and (ii) the overhead for managing the services of the clients (110) may be reduced by not requiring modification of the operation(s) of the clients (110) directly.

In contrast, a second user may be determined to be a high-priority user (e.g., a user with a user access level of 9/10). In such a case, the user level of that user may indicate that more ports are to be opened than were for the first user so that (i) the data center may provide more services to the second user and (ii) network traffic from that user is to be afforded a high-level of quality (e.g., a higher processing rate than the traffic from the normal user).

In one or more embodiments, an IHS (e.g., 120A, 120B, etc.) may include (i) a chassis (e.g., a mechanical structure, a rack mountable enclosure, etc.) configured to house one or more servers (or blades) and their components (see, e.g., FIG. 2.1) and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes. For example, an IHS may be a personal computer, a personal digital assistant (PDA), a smart phone, a tablet device, a network storage device, a network server, a switch, a router (or any other network communication device), or any other suitable device, and may vary in size, shape, performance, functionality, and price.

In one or more embodiments, as being a physical computing device or a logical computing device, an IHS (e.g., 120A, 120B, etc.) may be configured for, e.g.,: (i) hosting and maintaining various workloads, (ii) providing a computing environment whereon workloads may be implemented, (iii) providing computer-implemented services to one or more entities, (iv) exchanging data with other components registered in/to the network (130) in order to, for example, participate in a collaborative workload placement, and/or (v) operating as a standalone device. In one or more embodiments, in order to read, write, or store data, an IHS may communicate with, for example, a storage array (not shown).

To provide any quantity and any type of computer-implemented services, an IHS (e.g., 120A, 120B, etc.) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a CPU, a graphics processing unit (GPU), a data processing unit (DPU), memory, a network resource, storage space (e.g., to store any type and quantity of information), storage I/O, a hardware resource set, a compute resource set (e.g., one or more processors, processor dedicated memory, etc.), a control resource set, etc. In one or more embodiments, computing resources of an IHS (e.g., 120A, 120B, etc.) may be divided into three logical resource sets: a compute resource set, a control resource set, and a hardware resource set. Different resource sets, or portions thereof, from the same or different IHSs may be aggregated (e.g., caused to operate as a computing device) to instantiate a VM of VMs (e.g., 218, FIG. 2.1) and/or a composed IHS having at least one resource set from each set of the three resource set model.

In one or more embodiments, as a central processing virtualization platform, a virtual CPU (vCPU) implementation may be provided to one or more VMs, in which the vCPU implementation may enable the VMs to have direct access to a single physical CPU. More specifically, the vCPU implementation may provide computing capabilities by sharing a single physical CPU among VMs. In one or more embodiments, as a graphics virtualization platform, a virtual GPU (vGPU) implementation may be provided to one or more VMs, in which the vGPU implementation may enable the VMs to have direct access to a single physical GPU. More specifically, the vGPU implementation may provide parallel data processing and accelerated computing capabilities by sharing a single physical GPU among VMs. Further, as a data processing virtualization platform, a virtual DPU (vDPU) implementation may be provided to one or more VMs, in which the vDPU implementation may enable the VMs to have direct access to a single physical DPU. More specifically, the vDPU implementation may provide full data center-on-chip programmability, and high-performance networking and computing capabilities by sharing a single physical DPU among VMs.

In one or more embodiments, memory may be any hardware component that is used to store data in a computing device. The data stored in memory may be accessed almost instantly, real-time (e.g., in milliseconds (ms)) regardless of where the data is stored in the memory. In most cases, memory may provide the aforementioned instant data access because memory may be directly connected to a CPU on a wide and fast bus connection.

In one or more embodiments, memory may be (or may include), for example (but not limited to): DRAM (e.g., DDR4 DRAM, error correcting code (ECC) DRAM, etc.), PMEM (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be may be specified in base units of bits per second (bps). The computer network may be generated using hardware components (e.g., routers, access points, cables, switches, etc.) and software components (e.g., operating systems (OSs), business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, storage space (or simply "storage") may refer to a hardware component that is used to store data in a computing device. In one or more embodiments, storage may be a physical computer-readable medium. For example, storage may be (or may include) hard disk drives (HDDs), Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, a hardware resource set (e.g., of an IHS, of an external resource, etc.) may include (or specify), for example (but not limited to): a configurable CPU option (e.g., a valid vCPU count per-VM option), a minimum user count per-VM, a maximum user count per-VM, a configurable network resource option (e.g., enabling/disabling single-root input/output virtualization (SR-IOV) for specific VMs), a configurable memory option (e.g., maximum and minimum memory per-VM), a configurable GPU option (e.g., allowable scheduling policy and/or vGPU count combinations per-VM), a configurable DPU option (e.g., legitimacy of disabling inter-integrated circuit (I2C) for various VMs), a configurable storage space option (e.g., a list of disk cloning technologies across all VMs), a configurable storage I/O option (e.g., a list of possible file system block sizes across all target file systems), a user type (e.g., a knowledge worker, a high-end user that requires a rich multimedia experience, etc.), a network resource related template (e.g., a 10 GB/s BW with 20 ms latency QoS template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 2 vCPUs with 4 cores template), a memory related template (e.g., an 8 GB DRAM template), a vCPU count per-VM, a speed select technology configuration (e.g., enabled/disabled), a VM hardware virtualization configuration (e.g., enabled/disabled), a VM input/output memory management unit (IOMMU) configuration (e.g., enabled/disabled), a virtual NIC (vNIC) count per-VM, a wake on LAN support configuration (e.g., enabled/disabled), a VM host SR-IOV status configuration (e.g., enabled/disabled), a swap space configuration per-VM, a reserved memory configuration (e.g., as a percentage of configured memory such as 0-100%), a memory ballooning configuration (e.g., enabled/disabled), a vGPU count per-VM, a type of a vGPU scheduling policy (e.g., a "fixed share" vGPU scheduling policy), a type of a GPU virtualization approach (e.g., graphics vendor native drivers approach such as a vGPU), a storage mode configuration (e.g., an enabled high-performance storage array mode), an I2C interface configuration (e.g., enabled/disabled), a user profile folder redirection configuration (e.g., a local user profile, a profile redirection, etc.), a file system block size, a backup frequency, a number of VMs available for logon, different work start time configurations with respect to a number of VMs to be powered on and available, a virtualization-relevant resource parameter (e.g., a VM disk I/O latency, a VM I/O operation per second, etc.), etc.

In one or more embodiments, a control resource set (e.g., of an IHS, of an external resource, etc.) may facilitate formation of VMs and/or composed IHSs. To do so, a control resource set may prepare (in conjunction with the SCPM (140)) any quantity of computing resources from any number of hardware resource sets (e.g., of the corresponding IHS and/or other IHSs) for presentation. Once prepared, the control resource set may present the prepared computing resources as bare metal resources to the SCPM (140). By doing so, a VM and/or a composed IHS may be instantiated.

To prepare the computing resources of the hardware resource sets for presentation, the control resource set may employ, for example, virtualization, indirection, abstraction, and/or emulation. These management functionalities may be transparent to applications hosted by the resulting instantiated VMs and/or composed IHSs (e.g., thereby relieving those applications from workload overhead). Consequently, while unknown to components of a VM and/or of a composed IHS, the VM and/or the composed IHS may operate in accordance with any number of management models thereby providing for unified control and management of the VMs and/or the composed IHSs.

In one or more embodiments, the SCPM (140) may implement a management model to manage computing resources (e.g., computing resources provided by one or more hardware devices of IHSs) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the invention.

In one or more embodiments, in conjunction with the SCPM (140), a system control processor (SCP) of an IHS may cooperatively enable hardware resource sets of other IHSs to be prepared and presented as bare metal resources to VMs and/or composed IHSs. The SCP may be operably connected to external resources (not shown) over the network (130) so that the SCP may prepare and present the external resources as bare metal resources as well. In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

An IHS (e.g., 120A, 120B, etc.) may split up a request with another component of the system (100), coordinating its efforts to complete the request more efficiently than if the IHS had been responsible for completing the request. To provide computer-implemented services to one or more entities, the IHS may perform computations locally and/or remotely. By doing so, the IHS may utilize different computing devices that have different quantities of computing resources to provide a consistent experience to the entities. In one or more embodiments, the IHS may be a heterogeneous set, including different types of hardware components and/or different types of OSs.

In one or more embodiments, an IHS (e.g., 120A, 120B, etc.) may host any number of applications (and/or content accessible through the applications) that provide application services to the clients (110). Application services may include, for example (but not limited to): instant messaging services, file storage services, web-based services, desktop-based services, workload placement collaboration services, serving a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in the IHS (e.g., 120A, 120B, etc.). In one or more embodiments, applications may be logical entities executed using computing resources of the IHS. For example, applications may be implemented as computer instructions, e.g., computer code, stored on persistent storage of the IHS that when executed by the processor(s) of the IHS cause the IHS to provide the functionality of the applications described throughout the application.

In one or more embodiments, while performing, for example, one or more operations requested by a user of a client of the clients (110), applications installed on the IHS (e.g., 120A, 120B, etc.) may include functionality to request and use resources (e.g., data, computing resources, etc.) of the IHS. Applications may also perform other types of functionalities not listed above without departing from the scope of the invention. In one or more embodiments, while providing application services to a user, applications may store (temporarily or permanently) data that may be relevant to the user in persistent storage of the IHS.

In one or more embodiments, an IHS (e.g., 120A, 120B, etc.) may also include a production agent, which is configured to locally orchestrate the performance of data protection operations. For example, the production agent may perform a data protection operation under the direction of a client, in which the client sends instructions to the production agent regarding: (i) when one or more operations should be performed, (ii) where the resulting data backup(s) should be stored (temporarily or permanently), and (iii) when a VM should be restored to a previous state. Other instructions not listed above may also be sent without departing from the scope of the invention. In one or more embodiments, the production agent may be implemented using hardware, software, or any combination thereof.

As discussed above, an IHS (e.g., 120A, 120B, etc.) may provide any quantity and type of computer-implemented services. To provide the computer-implemented services, resources of the IHS (discussed above) may be used to instantiate one or more VMs and/or composed IHSs. The composed IHSs and/or VMs may provide the computer-implemented services. While an IHS (e.g., 120A, 120B, etc.) has been illustrated and described as including a limited number of specific components and/or hardware resources, the IHS may include additional, fewer, and/or different components without departing from the scope of the invention.

One of ordinary skill will appreciate that an IHS (e.g., 120A, 120B, etc.) may perform other functionalities without departing from the scope of the invention. In one or more embodiments, the IHS may be configured to perform all, or a portion, of the functionalities described in FIGS. 4.1-6.3. Additional details of the IHS are described below in reference to FIGS. 2.1 and 2.2.

Figure 7:
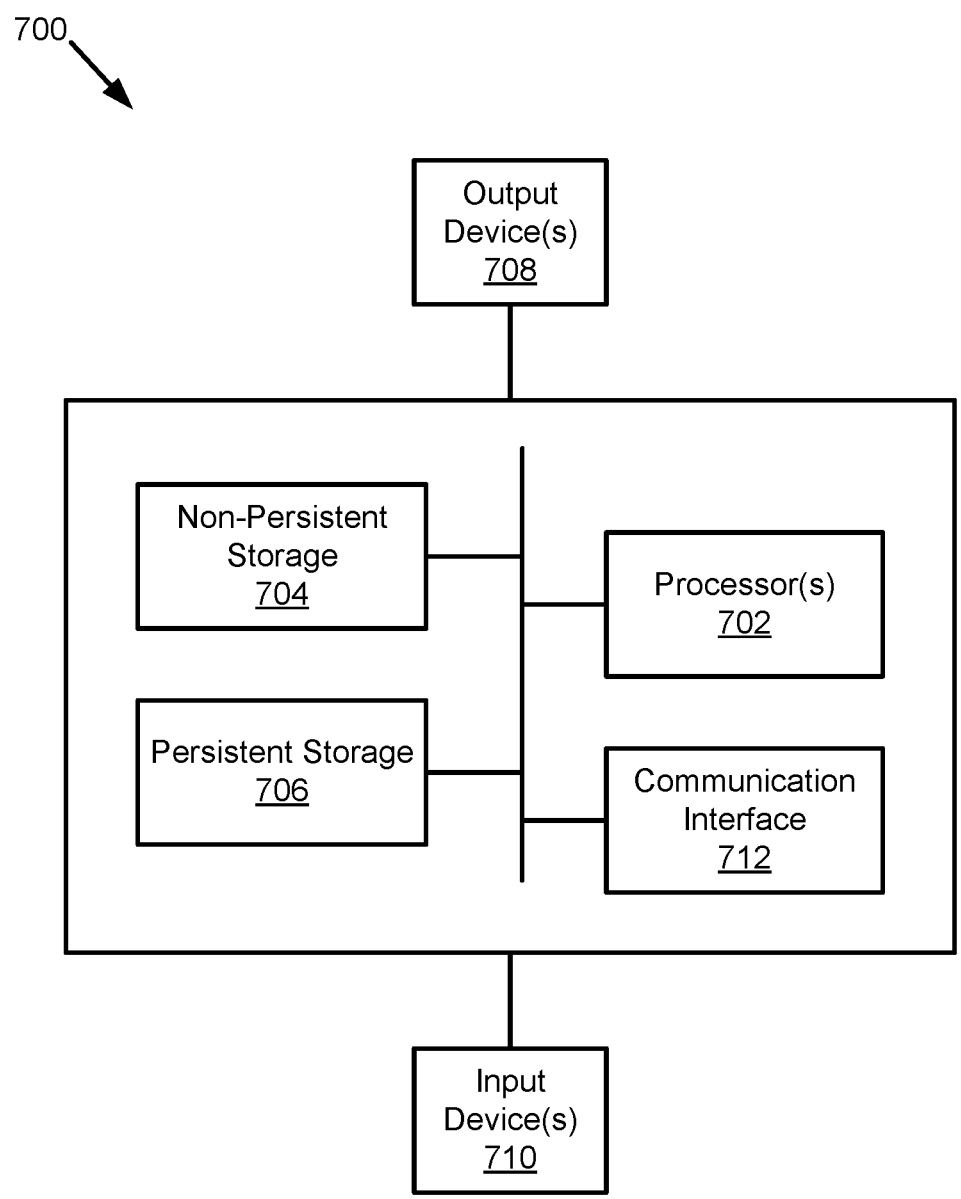
FIG. 7 shows a diagram of a computing device in accordance with one or more embodiments of the invention.

In one or more embodiments, an IHS (e.g., 120A, 120B, etc.) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, SSDs, etc.). The computing device may include instructions, stored in the persistent storage, that when executed by the processor(s) of the computing device cause the computing device to perform the functionality of the IHS described throughout this application. Alternatively, in one or more embodiments, the IHS may be implemented as a logical device. The logical device may utilize the computing resources of any number of computing devices to provide the functionality of the IHS described throughout this application.

In one or more embodiments, the clients (110) may be physical or logical computing devices configured for hosting one or more workloads, or for providing a computing environment whereon workloads may be implemented. The clients (110) may correspond to computing devices that one or more users use to interact with one or more components of the system (100).

In one or more embodiments, a client of the clients (110) may include any number of applications (and/or content accessible through the applications) that provide computer-implemented application services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

In one or more embodiments, while performing, for example, one or more operations requested by a user, applications installed on a client of the clients (110) may include functionality to request and use physical and logical components of the client. Applications may also include functionality to use data stored in storage/memory resources of the client. The applications may perform other types of functionalities not listed above without departing from the scope of the invention. In one or more embodiments, while providing application services to a user, applications may store data that may be relevant to the user in storage/memory resources of the client.

In one or more embodiments, the clients (110) may interact with the IHSs (e.g., 120A, 120B, etc.). For example, the clients may issue requests to the IHSs to receive responses and interact with various components of the IHSs. The clients may also request data from and/or send data to the IHSs. As yet another example, the clients may utilize application services provided by the IHSs. When the clients interact with the IHSs, data that is relevant to the clients may be stored (temporarily or permanently) in the IHSs.

In one or more embodiments, the clients (110) may provide computer-implemented services to users (and/or other computing devices such as, for example, other clients or other types of components). The clients may provide any quantity and any type of computer-implemented services (e.g., data storage services, electronic communication services, etc.). To provide computer-implemented services, each client may include a collection of physical components (described below) configured to perform operations of the client and/or otherwise execute a collection of logical components (described below) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a DPU, a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, a client of the clients (110) may include a memory management unit (MMU) (e.g., 270, FIG. 2.2), in which the MMU is configured to translate virtual addresses (e.g., those of a virtual address space (discussed below)) into physical addresses (e.g., those of memory). In one or more embodiments, the MMU may be operatively connected to the storage/memory resources, and the MMU may be the sole path to access the memory, as all data destined for the memory must first traverse the MMU prior to accessing the memory. Further, the MMU may be configured to: (i) provide memory protection (e.g., allowing only certain applications to access memory) and (ii) provide cache control and bus arbitration.

In one or more embodiments, while the clients (110) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (110) may enter into agreements (e.g., SLAs) with providers of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc. In one or more embodiments, a networking resource may provide capabilities to interface a client with external entities (e.g., other clients, the IHSs (e.g., 120A, 120B, etc.), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., TCP, UDP, RDMA, IEEE 801.11, etc.) for the transmission and receipt of data.

Further, a networking resource, when using a certain protocol or a variant thereof, may support streamlined access to storage/memory media of other clients. For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a vCPU, a virtual storage pool, etc. In one or more embodiments, a virtualization resource may include a hypervisor (e.g., an SCP), in which the hypervisor may be configured to orchestrate an operation of, for example, a VM by allocating computing resources of a client to the VM. In one or more embodiments, the hypervisor may include software and/or firmware generally operable to allow multiple OSs to run on a single IHS at the same time.

In one or more embodiments, the clients (110) may be implemented as computing devices (e.g., 700, FIG. 7). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the clients described throughout the application. Alternatively, in one or more embodiments, similar to the IHSs (e.g., 120A, 120B, etc. 122), the clients may also be implemented as logical devices.

In one or more embodiments, users (e.g., tenants) may interact with (or operate) the clients (110) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the "virtualization" technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, the GUI may be displayed on a display of a computing device (e.g., 700, FIG. 7) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read and parse) the listed information.

In one or more embodiments, the network (130) (or the "network environment") may represent a (decentralized or distributed) computing network and/or fabric configured for computing resource and/or messages exchange among registered computing devices (e.g., the clients (110), the IHSs (e.g., 120A, 120B, etc.), etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network may enable interactions between, for example, the clients and the IHSs through any number and type of wired and/or wireless network protocols (e.g., TCP, UDP, IPv4, etc.). Further, the network may be configured to perform all, or a portion, of the functionality described in FIGS. 2.3-2.5 and 4.1-6.3.

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network to distribute network traffic uniformly.

In one or more embodiments, the SCPM (140) may refer to an external control plane. The SCPM may include functionality to, e.g.,: (i) receive an intention request from a user via a client (e.g., the SCPM may receive a request to execute a certain application or functionality on a bare metal system or on a "composed" VM); (ii) analyze (through its intention handler) an intention specified in a request received from a user, for example, to compose and to decide where to put one or more VMs (e.g., 218, FIG. 2.1); (iii) provide a firmware stack (e.g., an integrated Dell remote access controller (iDRAC®) provided by Dell) to an IHS (e.g., 120A, 120B, etc.); (iv) develop and/or deploy standard baseboard management controller (BMC) firmware stacks to a BMC (e.g., 220, FIG. 2.1) of an IHS; (v) sign all of the firmware and/or software (e.g., a user's kernel, a user application, etc.) within an IHS so that, for example, a user may ensure that firmware and/or software executing on the IHS are the firmware and/or software that the user intended to load and execute on the IHS; (vi) provide, to an SCP of an IHS, a configuration template (CT) that is required to provision a VM on the IHS; (vii) being responsible for the management (e.g., including management of policy actions on an IHS) and placement of workloads on VMs; (viii) use/employ an SCP as a VM deployment/management conduit to deploy/execute/manage one or more VMs on the corresponding IHS based on available computing resources of the IHSs in the system (100); (ix) manage distribution or allocation of available computing resources (e.g., user subscriptions to available resources) against a particular VM on an IHS; (x) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) of VMs across all IHSs (by obtaining telemetry data and/or logs) to identify (a) which VM is a healthy VM (e.g., a VM that generates a response to a request) and (b) which VM is an unhealthy VM (e.g., a VM that does not generate a response to a request, an over-provisioned VM, a VM that is slowing down in terms of performance, a VM's resource utilization value is exceeding a predetermined maximum resource utilization value threshold, etc.); (xi) based on (x), manage health of each VM by implementing a policy (e.g., to manage an aggregate workload across the VMs, to manage SLA and QoS compliance as well as load balancing, etc.); (xii) identify health (e.g., a current status) of each VM based on average, minimum, and maximum resource utilization values; (xiii) provide identified health of each VM to other entities (e.g., administrators); (xiv) automatically react and generate alerts (e.g., a predictive alert, a proactive alert, a technical alert, etc.) if one of the predetermined maximum resource utilization value thresholds is exceeded; (xv) communicate with the corresponding SCP over the corresponding network interface (e.g., 230, FIG. 2.1); (xvi) add/remove resources (e.g., processing resources, memory resources, storages resources, etc.) of IHSs to one or more VMs so that the VMs may provide computer-implemented services to the corresponding tenants; (xvii) manage hardware resources of the IHSs and/or other resources (e.g., external resources) to provide computer-implemented services (e.g., where the resources of the IHSs may be managed by instantiating one or more VMs using resources of IHSs, external resources, and/or other types of hardware devices operably connected to the IHSs); (xviii) provide VM and/or composed IHS composition services; (xix) make sure that, as allowed by a complex multi-tenant policy, tenant interactions with their VM centric SLA and QoS parameters are permitted (e.g., the SCPM is responsible for all of the intent and policy actions within the system (100)); (xx) make sure that, as allowed by the complex multi-tenant policy, intent based generation of VMs and/or intent based resource configuration on a VM (e.g., based on a user intent, more resources may be assigned to the VM; based on a user intent, resource capability of already assigned resources may be increased; etc.) are permitted; (xxi) manage rotation and revocation of VMs (e.g., an expired VM may be flagged for removal or rotation (and then removed or rotated) when that VM reaches its maximum age (e.g., based a point of expiry, which may be decided by an administrator of the SCPM or a user of the VM, the VM may be removed (including all the related data) from its current IHS and a newer VM may be deployed to that IHS)); and/or (xxii) store (temporarily or permanently) the aforementioned data and/or the output(s) of the above-discussed processes in a database. One of ordinary skill will appreciate that the SCPM may perform other functionalities without departing from the scope of the invention.

In one or more embodiments, a CT may include (or specify), for example (but not limited to): a first hardware resource set of a first IHS, a second hardware resource set of a second IHS, a third hardware resource set of an external resource etc. In one or more embodiments, the first hardware resource set may include hardware resources that are distinct from a second hardware resource and/or a third hardware resource set.

In one or more embodiments, a BMC firmware stack may provide out-of-band monitoring and management of the hardware components of an IHS (e.g., 120A, 120B, etc.). Examples of monitoring functions that the BMC firmware stack may include, but not limited to, monitoring internal ambient temperatures and/or voltages in an IHS, along with network usage levels, and the like. Examples of management features may include installation of software including the base OS (of an IHS), managing operation of one or more environmental control components in an IHS, turning certain hardware components of an IHS on or off, and the like.

In one or more embodiments, information (e.g., resource utilization levels, logs, SLA and QoS compliance data from each VM, load balancing between VMs, key performance metrics related to the VMs, etc.) may be obtained as they become available or by the SCPM (140) polling the corresponding VMs and/or the SCP (that is managing those VMs) for new information. Based on receiving the API call from the SCPM, the corresponding VMs and/or the SCP may allow the SCPM to obtain the information.

In one or more embodiments, the aforementioned information may be obtained (or streamed) continuously (without affecting production workloads of the corresponding VMs and/or the SCP), as they generated, or they may be obtained in batches, for example, in scenarios where (i) the SCPM (140) receives a failure score calculation request (e.g., a health check request), (ii) the corresponding SCP accumulates the information and provides them to the SCPM at fixed time intervals, or (iii) the corresponding VMs and/or the corresponding SCP stores the information in its storage (or in an external entity) and notifies the SCPM to access the information from its storage or from the external entity. In one or more embodiments, the information may be access-protected for the transmission from the corresponding microvisor to the SCPM, e.g., using encryption.

In one or more embodiments, the SCPM (140) may monitor service performance and resource utilization of each VM (for, for example, troubleshooting and optimization) by obtaining telemetry data about each VM's technology stack (e.g., telemetry data about computing resources of each VM, composed system data, etc.) from the corresponding VMs and/or the SCP. In one example, the SCPM may: (i) monitor actions being performed, computation power being consumed, communications being sent or received, etc. by each VM, (ii) monitor communications being sent or received by each VM by intercepting them, (iii) based on the intercepted communications, determine utilization rates of one or more resources by a VM, and/or (iv) store (temporarily or permanently) the resource utilization rates (e.g., including estimates, measurements, etc.) in the database.

In one or more embodiments, while monitoring via the corresponding VMs, the SCPM (140) may need to, for example (but not limited to): inventory one or more components of each VM, obtain a type and a model of a component of a VM, obtain a version of firmware or other code executing on a VM, obtain information regarding a hardware component or a software component of an IHS (e.g., 120A, 120B, etc.) that may be allocated to a VM, obtain information specifying each VM's interaction with one another and/or with another component of an IHS, etc.

In one or more embodiments, in order to manage the health of VMs (in particular, the health of unhealthy VMs) and resolve bottlenecks without affecting the operation of the entire distributed computing architecture, the SCPM (140) may take one or more preventive (and proactive) actions. In one or more embodiments, a preventive action may be, for example (but not limited to): performing workload redistribution among VMs (e.g., high-performance load balancing) (for example, to prevent workload mismatch between VMs and to manage the overall operation of the architecture), reducing the quantity of unnecessary REST API calls (for example, to prevent unnecessary memory utilization and to improve the likelihood that the unhealthy VMs are healthy again), modifying (e.g., adding, removing, etc.) resources allocated to a VM (for example, to ensure highly available VMs), modifying a predetermined maximum resource utilization value threshold (e.g., increasing a predetermined maximum CPU utilization value threshold from 70% to 88% so that VM X may take more workloads), testing (in terms of resource utilization and workload assignment) a new VM that will be added into the an IHS before causing an impact on the IHS, etc.

Further, in one or more embodiments, the SCPM (140) may receive one or more composition requests (e.g., a VM composition request) from one or more users. A composition request may indicate a desired outcome such as, for example, execution of one or more application on a VM, providing of one or more services (e.g., by a VM), etc. The SCPM may translate the composition request into corresponding quantities of computing resources necessary to be allocated (e.g., to the VM) to satisfy the intent of the composition request.

Once the quantities of computing resources are obtained, the SCPM (140) may allocate resources of the IHSs (e.g., 120A, 120B, etc.) to meet the identified quantities of computing resources by instructing a processor(s) (e.g., an SCP) of the IHSs to prepare and present resources (e.g., hardware resource sets) of the IHSs to compute resource sets of the IHSs.

Additionally, the SCPM (140) may instruct the processor(s) to manage the hardware resources of the hardware resource sets in accordance with one or more models (e.g., data integrity, security, etc.). However, when the processors present these resources to the compute resource sets, the processors may present the resources as bare metal resources while managing them in more complex manners. By doing so, embodiments of the invention may provide a framework for unified security, manageability, resource management/composability, workload management, and distributed system management by use of processors of IHSs.

Managing computing resources of IHSs in this manner may enable the computing resources to be differentiated to provide different functionalities including, for example, server, storage, networking, data protection, mass storage, etc. Consequently, (i) VMs (e.g., 218, FIG. 2.1) having these desired functionalities may be efficiently instantiated and (ii) resources allocated to a VM may be tailored to the specific needs of the services that will be provided by the VM.

In one or more embodiments, VM and/or composed IHS composition services may include, at least, (i) obtaining composition requests for VMs and/or composed IHSs and (ii) aggregating computing resources from IHSs (e.g., 120A, 120B, etc.) and/or external resources using the corresponding processors to service the composition requests by instantiating VMs and/or composed IHSs in accordance with the requests. By doing so, instantiated VMs and/or composed IHSs may provide computer-implemented services in accordance with the composition requests.

As discussed above, computing resources of an IHS may be divided into three logical resource sets (e.g., a compute resource set, a control resource set, and a hardware resource set). By logically dividing the computing resources of an IHS into these resource sets, different quantities and types of computing resources may be allocated to each VM and/or composed IHS thereby enabling the resources allocated to the respective VM and/or IHS to match performed workloads. Further, dividing the computing resources in accordance with the three set model may enable different resource sets to be differentiated (e.g., given different personalities) to provide different functionalities. Consequently, VMs and/or IHSs may be composed on the basis of desired functionalities rather than just on the basis of aggregate resources to be included in the VMs and/or composed IHSs.

Additionally, by composing VMs and/or IHSs in this manner, the control resource set of each IHS may be used to consistently deploy management services across any number of VMs and/or composed IHSs. Consequently, embodiments of the invention may provide a framework for unified security, manageability, resource management/composability, workload management, and distributed system management by use of this three resource set model.

In one or more embodiments, composition requests may specify computing resource allocations using an intent based model (e.g., intent based requests). For example, rather than specifying specific hardware resources/devices (or portions thereof) to be allocated to a particular compute resource set to obtain a VM and/or a composed IHS, composition requests may only specify that a VM and/or a composed IHS is to be instantiated having predetermined characteristics, that a VM and/or a composed IHS will perform certain workloads or execute certain applications, and/or that the VM and/or composed IHS be able to perform one or more predetermined functionalities. In such a scenario, a composition manager of the corresponding processor (e.g., the SCP) may decide how to instantiate the VM and/or composed IHS (e.g., which resources to allocate, how to allocate the resources (e.g., virtualization, emulation, redundant workload performance, data integrity models to employ, etc.), etc.).

In one or more embodiments, composition requests may specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the VMs and/or composed IHSs, security models to be employed by the VMs and/or composed IHSs, communication models to be employed by the VMs and/or composed IHSs, services to be provided to the VMs and/or composed IHSs, user/entity access credentials for use of the VMs and/or composed IHSs, and/or other information usable to place the VMs and/or composed IHSs into states in which the VMs and/or composed IHSs provide desired computer-implemented services.

In one or more embodiments, to provide composition services, the SCPM (140) may include an infrastructure manager (not shown). Composition services may include, for example (but not limited to): obtaining composition requests for VMs and/or composed IHSs, determining the resources to allocate to instantiate VMs and/or IHSs, cooperating with the corresponding processors of IHSs to allocate identified resources, etc. By doing so, the infrastructure manager may cause any number of computer-implemented services to be provided using the VMs and/or IHSs.

To determine the resources to allocate to VMs and/or IHSs, the infrastructure manager may employ an intent based model that translates an intent expressed in a composition request to one or more allocations of computing resources. For example, the infrastructure manager may utilize an outcome based computing resource requirements lookup table to match an expressed intent to resources to be allocated to satisfy that intent. The outcome based computing resource requirements lookup table may specify the type, make, quantity, method of management, and/or other information regarding any number of computing resources that when aggregated will be able to satisfy a corresponding intent. The infrastructure manager may identify resources for allocation to satisfy composition requests via other methods without departing from the scope of the invention.

To cooperate with the corresponding processors, the infrastructure manager may obtain telemetry data regarding the computing resources of any number of IHSs and/or external resources that are available for allocation. The infrastructure manager may aggregate this data in a telemetry data map that may be subsequently used to identify resources of any number of IHSs and/or external resources to satisfy composition requests (e.g., instantiate one or more VMs and/or IHSs to meet the requirements of the composition requests).

When the infrastructure manager identifies the computing resources to be allocated, the infrastructure manager may communicate with the corresponding processors (of the IHSs) to implement the identified allocations. For example, the infrastructure manager may notify a processor of a control resource set that portions of a hardware resource set are to be allocated to a compute resource set to instantiate a VM and/or a composed IHS. The processor may then take action (e.g., prepare the portion of the hardware resource set for presentation to the compute resource set) in response to the notification.

As VMs and/or composed IHSs are instantiated, the infrastructure manager may add data reflecting the resources allocated to VMs and/or composed IHSs, the workloads being performed by the VMs and/or composed IHSs, and/or other types of data to a composed infrastructure map. The infrastructure manager may utilize this data to, for example, decide whether computing resources should be added to or removed from VMs and/or IHSs. Consequently, computing resources may be dynamically re-provisioned over to meet changing workloads imposed on VMs and/or IHSs.

In one or more embodiments, the SCPM (140) may include a deployment manager (not shown), in which the deployment manager may provide recomposition services. Recomposition services may include (i) monitoring the health of computing resources of VMs and/or composed IHSs, (ii) determining, based on the health of the computing resources, whether the computing resources are compromised, and/or (iii) initiating recomposition of computing resources that are compromised. By doing so, the deployment manager may improve the likelihood that computer-implemented services provided by VMs and/or composed IHSs meet user/tenant expectations. When providing the recomposition services, the deployment manager may maintain a health status repository that includes information reflecting the health of both allocated and unallocated computing resources. For example, the deployment manager may update the health status repository when it receives information regarding the health of various computing resources.

When providing recomposition services, the deployment manager may receive recomposition requests from the corresponding processors that have determined that at least some of the computing resources of a VM and/or a composed IHS have been compromised. In such a scenario, the deployment manager may elect to recompose the computing resources in response to the request or may delay recomposition to a later period of time. The deployment manager may make the aforementioned determination based on whether the compromised computing resources are likely to prevent the VM and/or composed IHS from providing desired computer-implemented services. If the compromised computing resources are unlikely to negatively impact the provided services, then the deployment manager may delay initiating recomposition of the computing resources (e.g., by generating and sending an appropriate request to the infrastructure manager). One of ordinary skill will appreciate that the infrastructure manager and deployment manager may perform other functionalities without departing from the scope of the invention. The infrastructure manager and deployment manager may be implemented using hardware, software, or any combination thereof.

In one or more embodiments, the database (discussed above) may also include a telemetry data map, a composed infrastructure map, an infrastructure utilization map, a health status repository, and a composable asset map. These data structures may be maintained by, for example, the infrastructure manager and/or the deployment manager. For example, the infrastructure manager and/or deployment manager may add, remove, and/or modify information included in these data structures to cause the information included in these data structures to reflect the state of any number of IHSs, external resources, and/or VMs and/or composed IHSs. Any of these data structures may be implemented using any combination and quantity of, for example, lists, tables, unstructured data, databases, etc. While illustrated as being stored locally, any of these data structures may be stored remotely and may be distributed across any number of devices without departing from the invention. While the SCPM (140) has been illustrated and described as including a limited number of specific components, the SCPM may include additional, fewer, and/or different components than those mentioned above without departing from the scope of the invention.

In one or more embodiments, the SCPM (140) may be implemented as a computing device (e.g., 700, FIG. 7). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the SCPM described throughout the application. Alternatively, in one or more embodiments, similar to the IHSs (e.g., 120A, 120B, etc. 122), the SCPM may also be implemented as a logical device.

Turning now to FIG. 2.1, FIG. 2.1 shows a diagram of an IHS (200) in accordance with one or more embodiments of the invention. The IHS (200) may be an example of an IHS discussed above in reference to FIG. 1. The IHS (200) may include (i) a host system (202) that hosts a storage/memory resource (204), a processor (208), a BIOS (210) (e.g., a UEFI BIOS), an SDXI hardware "component" (226), and a network interface (212); (ii) a BMC (220) that hosts a processor (not shown) and a network interface (not shown); and (iii) an SCP (not shown). The IHS (200) may include additional, fewer, and/or different components without departing from the scope of the invention. Each component may be operably connected to any of the other component via any combination of wired and/or wireless connections. Each component illustrated in FIG. 2.1 is discussed below.

In one or more embodiments, the processor (208) (e.g., a node processor, one or more processor cores, one or more processor micro-cores, etc.) may be communicatively coupled to the storage/memory resource (204), the BIOS (210), and the network interface (212) via any suitable interface, for example, a system interconnect including one or more system buses and/or peripheral component interconnect express (PCIe) bus/interface. In one or more embodiments, the processor (208) may be configured for executing machine-executable code like a CPU, a programmable logic array (PLA), an embedded device such as a System-on-a-Chip (SoC), or hardware/software control logic.

More specifically, the processor (208) may include any system, device, or apparatus configured to interpret and/or execute program instructions and/or process data, and may include, without limitation, a microprocessor, a microcontroller, a digital signal processor (DSP), an ASIC, or any other digital or analog circuitry configured to interpret and/or execute program instructions and/or process data. In one or more embodiments, the processor (208) may interpret and/or execute program instructions and/or process data stored in the storage/memory resource (204) and/or another component of IHS (200).

Further, the processor (208) may include a calling application (CA) (222) and an SDXI driver (224). In one or more embodiments, the CA represents an application program, a utility, a service, an API, or the like that provides service calls to prepare/manage data for storage, archiving, transmission, streaming, or other functions (e.g., upon receiving a request from a user of the IHS (200)). For example, when the CA intends to initiate a data movement operation (upon the user's data copy request), (i) the CA may initiate a connection establishment process between the IHS (200) and a second IHS, and (ii) may, through the SDXI driver (224), offload the copy request to the SDXI hardware (226).

More specifically, the CA (222), in conjunction with the SDXI driver (224), operates to (i) request that the data to be moved/migrated/copied (e.g., to a destination address space of or a destination buffer of a second IHS, see FIG. 2.3 or FIG. 2.4; a push-based data copy operation; etc.) is loaded into a source buffer (214), retrieved from other data storage component of the IHS (200), pointed to, or otherwise made available for movement by the SDXI hardware (226); (ii) request that the data to be retrieved/moved/copied (e.g., from a source address space of or a source buffer of a second IHS, see FIG. 2.5; a pull-based data copy operation; etc.) into a destination buffer (216); and/or (iii) initiate a TCP or an RDMA (or any other suitable) connection establishment process between the IHS (200) and a second IHS before invoking the SDXI hardware (226) to perform the data movement or retrieval operation (e.g., depending on the established connection type (e.g., TCP, RDMA, etc.)).

In one or more embodiments, the initiation of a connection establishment process may include, at least, (i) generation of a secure data transfer path (e.g., a secure/encrypted, point-to-point tunnel) across (or overlay on) the network (e.g., 130, FIG. 1) between the IHS (200) and a second IHS (e.g., 201, FIG. 2.2), where the IHS and the second IHS communicate over the secure data transfer path; and (ii) once needed, effectively terminating a secure data transfer path by managing the behavior of the secure data transfer path. In one or more embodiments, a secure data transfer path may be generated by employing a tunneling protocol (e.g., the GRE tunneling protocol, the IP-in-IP tunneling protocol, the SSH tunneling protocol, etc.) and by setting up efficient and secure connections (e.g., an SSL VPN connection, an IPSec based VPN connection, a TLS VPN connection, etc.) across the network.

In one or more embodiments, the CA (222) may include a workload (not shown) and a data pipeline API (not shown). The workload and data pipeline API may operate similarly to applications (described above in reference to FIG. 1), and may be components that perform one or more processing tasks assigned to the IHS (200). In particular, the workload may operate to perform various operations on data, and to move data between different storage and processing elements of the IHS (200), and may make various service calls to the data pipeline API to assist in such processing operations and data moves.

One of ordinary skill will appreciate that the processor (208) (and its components) may perform other functionalities without departing from the scope of the invention. When providing its functionalities, the processor (208) (and its components) may perform all, or a portion, of the methods illustrated in FIGS. 4.1-6.3. The processor (208) (and its components) may be implemented using hardware, software, or any combination thereof. In one or more embodiments, when two or more components are referred to as "coupled" to one another, such term indicates that such two or more components are in electronic communication or mechanical communication, as applicable, whether connected directly or indirectly, with or without intervening components.

In one or more embodiments, the storage/memory resource (204) may have or provide at least the functionalities and/or characteristics of the storage or memory resources described above in reference to FIG. 1. The storage/memory resource may include any instrumentality or aggregation of instrumentalities that may retain/retrieve data (e.g., operating system (206) data, tamper-protected data, application data, etc.), program instructions, applications, and/or firmware (temporarily or permanently, computer-readable media). In one or more embodiments, software and/or firmware stored within the storage/memory resource (204) may be loaded into the processor (208) and executed during operation of the IHS (200).

Further, the storage/memory resource (204) may include, without limitation, (i) the OS (206), a source buffer (214), a destination buffer (216), VMs (218), system physical address space, one or more address ranges, separately attached memory devices (e.g., storage class memory devices), MMIO devices, DRAM, memory architectures (e.g., compute express link (CXL) interface, Gen-Z memory interface, fabric-attached memory, etc.), storage media such as a direct access storage device (e.g., an HDD or a floppy disk), a sequential access storage device (e.g., a tape disk drive), compact disk, CD-ROM, DVD, RAM, read-only memory (ROM), electrically erasable programmable read-only memory (EEPROM), magnetic storage, opto-magnetic storage, and/or volatile or non-volatile memory (e.g., flash memory) that retains data after power to the IHS (200) is turned off; (ii) communications media such as wires, optical fibers, microwaves, radio waves, and other electromagnetic and/or optical carriers; and/or any combination of thereof. Although the storage/memory resource (204) is depicted as integral to the host system (202), in some embodiments, all or a portion of the storage/memory resource (204) may reside external to the host system (202).

In one or more embodiments, the OS (206) may include any program of executable instructions (or aggregation of programs of executable instructions) configured to manage and/or control the allocation and usage of hardware resources such as memory, processor time, disk space, and input/output devices, and provide an interface between such hardware resources and applications hosted by the OS (206). Further, the OS (206) may include all or a portion of a network stack for network communication via a network interface (e.g., the network interface (212) for communication over a data network (e.g., an in-band connection (230))).

In one or more embodiments, active portions of the OS (206) may be transferred to the storage/memory resource (204) for execution by the processor (208). Although the OS (206) is shown in FIG. 2.1 as stored in the storage/memory resource (204), in some embodiments, the OS (206) may be stored in external storage media accessible to the processor (208), and active portions of the OS (206) may be transferred from such external storage media to the storage/memory resource (204) for execution by the processor (208).

In one or more embodiments, the firmware stored in the storage/memory resource (204) may include power profile data and thermal profile data for certain hardware devices (e.g., the processor (208), the BIOS (210), the network interface (212), I/O controllers, etc.). Further, the storage/memory resource may include a UEFI interface for accessing the BIOS as well as updating the BIOS. In most cases, the UEFI interface may provide a software interface between the OS (206) and the BIOS, and may support remote diagnostics and repair of hardware devices, even with no OS is installed.

In one or more embodiments, the I/O controllers (not shown) may manage the operation(s) of one or more I/O device(s) (connected/coupled to the IHS (200)), for example (but not limited to): a keyboard, a mouse, a touch screen, a microphone, a monitor or a display device, a camera, an optical reader, a USB, a card reader, a personal computer memory card international association slot, a high-definition multimedia interface (HDMI), etc. In one or more embodiments, the storage/memory resource (204) may store data structures including, for example (but not limited to): composed system data, a resource map, a computing resource health repository, etc.

In one or more embodiments, the composed system data may be implemented using one or more data structures that includes information regarding VMs (218) and/or composed IHSs. For example, the composed system data may specify identifiers of VMs and/or composed IHSs, and resources that have been allocated to the VMs and/or composed IHSs. The composed system data may also include information regarding the operation of the VMs and/or composed IHSs. The information (which may be utilized to manage the operation of the VMs and/or composed IHSs) may include (or specify), for example (but not limited to): workload performance data, resource utilization rates over time, management models employed by the SCP, etc.

For example, the composed system data may include information regarding duplicative data stored for data integrity purposes, redundantly performed workloads to meet high-availability service requirements, encryption schemes utilized to prevent unauthorized access of data, etc. While illustrated as being stored locally, the composed system data may be stored remotely and may be distributed across any number of devices without departing from the scope of the invention.

In one or more embodiments, the resource map may be implemented using one or more data structures that include information regarding resources of the IHS (200) and/or other IHSs. For example, the resource map may specify the type and/or quantity of resources (e.g., hardware devices, virtualized devices, etc.) available for allocation and/or that are already allocated to VMs (218) and/or composed IHSs. The resource map may be used to provide data to management entities such as the SCPM (e.g., 140, FIG. 1). While illustrated as being stored locally, the resource map may be stored remotely and may be distributed across any number of devices without departing from the scope of the invention. The resource map may be maintained by, for example, the composition manager. For example, the composition manager may add, remove, and/or modify information included in the resource map to cause the information included in the resource map to reflect the state of the IHS (200) and/or other IHSs.

In one or more embodiments, the computing resource health repository may be implemented using one or more data structures that includes information regarding the health of hardware devices that provide computing resources to VMs and/or composed IHSs. For example, the computing resource health repository may specify operation errors, health state information, temperature, and/or other types of information indicative of the health of hardware devices.

The computing resource health repository may specify the health states of hardware devices via any method. For example, the computing resource health repository may indicate whether, based on the aggregated health information, that the hardware devices are or are not in compromised states. A compromised health state may indicate that the corresponding hardware device has already or is likely to, in the future, be no longer able to provide the computing resources that it has previously provided. The health state determination may be made via any method based on the aggregated health information without departing from the scope of the invention. For example, the health state determination may be made based on heuristic information regarding previously observed relationships between health information and future outcomes (e.g., current health information being predictive of whether a hardware device will be likely to provide computing resources in the future).

The computing resource health repository may be maintained by, for example, the composition manager. For example, the composition manager may add, remove, and/or modify information included in the computing resource health repository to cause the information included in the computing resource health repository to reflect the current health of the hardware devices that provide computing resources to VMs and/or composed IHSs. While illustrated as being stored locally, the computing resource health repository may be stored remotely and may be distributed across any number of devices without departing from the scope of the invention.

In one or more embodiments, the source buffer (214) (e.g., a type of a volatile or non-volatile memory buffer, a type of a local storage, a read buffer, etc.) may be (or may represent) user address space, kernel address space, and/or any other physical/virtual source address space that a function (e.g., 276, FIG. 2.2) of the SDXI hardware (226) addresses. The source buffer may include/cache/store source data (e.g., data bytes, words, chunks of data, read data of different sizes, etc.) that needs to be migrated/copied to a destination buffer of a second IHS (e.g., during a data movement operation by the SDXI hardware), in which the function may directly or indirectly obtain/receive the source data from the source buffer via one or more DMA reads/transactions.

In one or more embodiments, the destination buffer (216) (e.g., a type of a volatile or non-volatile memory buffer, a type of a local storage, a write buffer, etc.) may be (or may represent) user address space, kernel address space, and/or any other physical/virtual destination address space that a function (e.g., 276, FIG. 2.2) of the SDXI hardware (226) addresses. The destination buffer may include/cache/store destination data (e.g., data bytes, words, chunks of data, write data of different sizes, etc.) that may be obtained/ received (and then be written to persistent memory (e.g., an SSD) of the IHS (200)) from a source buffer of a second IHS (e.g., during a memory-to-memory data movement operation), in which the function may directly or indirectly obtain/receive the destination data from the source buffer of the second IHS over an RDMA connection.

In one or more embodiments, the source buffer (214) and the destination buffer (216) may be connected to the SDXI hardware (226) through a PCIe interface, that is, the SDXI hardware may perform read operations to the source buffer and the write operations to the destination buffer using a PCIe interface. One of ordinary skill will appreciate that the source buffer and the destination buffer may perform other functionalities without departing from the scope of the invention. When providing its functionalities, the source buffer and the destination buffer may perform all, or a portion, of the methods illustrated in FIGS. 4.1-6.3. The source buffer and the destination buffer may be implemented using hardware, software, or any combination thereof.

In one or more embodiments, the VMs (218) may be logical entities executed using physical and/or logical components of the IHS (200), or using computing resources of other computing devices connected to the IHS. As described above, the SCP may be configured to orchestrate the operation(s) of the VMs using, for example, virtualization technology. Additional details of the VMs are described below in reference to FIG. 2.2.

In one or more embodiments, the SDXI hardware (226) (or the SDXI data exchange architecture) may include functionality to, e.g.,: (i) offload I/O from compute CPU cycles, (ii) provide architectural stability and/or a better user experience, (iii) accelerate data movement operations among applications and/or VMs (exist within the same or different IHSs), (iv) enable scalable, address-space to address-space data movement (e.g., including user/memory address spaces (e.g., guest virtual addresses, guest physical addresses, host physical addresses, host virtual addresses, etc.) both within and/or across VMs, newer address spaces that get defined, etc.) while being extensible, forward-compatible, and/or independent of I/O interconnect technology, (v) enable real-time workload and/or VM migration between IHSs, (vi) enable forwards and backwards compatibility to provide interoperability between different software and/or hardware, (vii) satisfy a concurrent DMA model, (viii) reduce a number of required memory buffer copies, (ix) enable hardware-based offloaded memory copies, (x) when performing a data movement operation and/or interacting with other applications, eliminate software context isolation layers and allow direct user-mode access, (xi) enable a method to extend SDXI data structures and the corresponding APIs in such a way that an SDXI producer may specify a remote IHS' IP address for memory access, (xii) enable an SDXI function (in conjunction with the processor (208)) to implement a TCP connection and/or an RDMA connection to perform a data transfer operation, (xiii) make IP-based addressing available in SDXI descriptors (see FIG. 3.7), (xiv) without dealing with so many APIs, provide a simplified SDXI API to allow specifying source IHS' IP address and/or destination IHS' IP address for a data movement operation to provide a better user experience, (xv) provide a method to simplify SDXI APIs and to offload IP address based data movement establishment and management, (xvi) enable a standard interface for privileged software to control a data mover including connection management and data movement between multiple/different address spaces (e.g., of different applications, different VMs, different IHSs, etc.), (xvii) enable a standard interface that can be virtualized by privileged software to allow greater compatibility of workloads or VMs across different IHSs, (xviii) expand and standardize data movement protocols and hardware accelerator interfaces for at least data movement operations (e.g., as such, the IHS (200) broadens the scope of data exchanges on both the hardware side and memory side), (xix) provide enhanced data pipelining operations (e.g., providing data movement between: different locations in memory, to and from the memory and a network connected to a NIC, to and from the memory and NVMe SSD, between different locations in the NVMe SSD, etc.), (xx) provide a granular control over address space identifiers used when accessing, for example, an SDXI descriptor ring and each data buffer (e.g., in this manner, a single SDXI operation may reference multiple address spaces so that a data movement operation from one address space to another may occur), and/or (xxi) store (temporarily or permanently) the aforementioned data and/or the output(s) of the above-discussed processes in a database.

One of ordinary skill will appreciate that the SDXI hardware (226) may perform other functionalities without departing from the scope of the invention. When providing its functionalities, the SDXI hardware (226) may perform all, or a portion, of the methods illustrated in FIGS. 4.1-6.3. The SDXI hardware (226) may be implemented using hardware (e.g., in an FPGA device, in an ASIC, etc.), software, or any combination thereof.

In one or more embodiments, the BIOS (210) may refer to any system, device, or apparatus configured to (i) identify, test, and/or initialize information handling resources (e.g., the network interface (212), other hardware components of the IHS (200), etc.) of the IHS (200) (typically during boot up or power on of the IHS (200)), and/or initialize interoperation of the IHS (200) with other IHSs, and (ii) load a boot loader or an OS (e.g., the OS (206) from a mass storage device). The BIOS (210) may be implemented as a program of instructions (e.g., firmware, a firmware image, etc.) that may be read by and executed on the processor (208) to perform the functionalities of the BIOS (210).

In one or more embodiments, the BIOS (210) may include boot firmware configured to be the first code executed by the processor (208) when the IHS (200) is booted and/or powered on. As part of its initialization functionality, the boot firmware may be configured to set hardware components of the IHS (200) into a known state, so that one or more applications (e.g., the OS (206) or other applications) stored on the storage/memory resource (204) may be executed by the processor (208) to provide computer-implemented services to one or more users of the clients (e.g., 110, FIG. 1). Further, the BIOS (210) may provide an abstraction layer for some of the hardware components of the IHS (200), such as a consistent way for applications and OSs to interact with a keyboard, a display, and other I/O components.

One of ordinary skill will appreciate that the BIOS (210) may perform other functionalities without departing from the scope of the invention. When providing its functionalities, the BIOS may perform all, or a portion, of the methods illustrated in FIGS. 4.1, 5.1, and 6.1. The BIOS may be implemented using hardware, software, or any combination thereof.

In one or more embodiments, as being an in-band network interface, the network interface (212) may include one or more systems, apparatuses, or devices that enable the host system (202) to communicate and/or interface with other devices, services, and components that are located externally to the IHS (200). These devices, services, and components, such as a system management module (not shown), may interface with the host system (202) via an external network (e.g., a shared network, a data network, an in-band network, etc.), such as the in-band connection (230) (that provides in-band access), which may include a LAN, a WAN, a PAN, the Internet, etc.

In one or more embodiments, the network interface (212) may enable the host system (202) to communicate using any suitable transmission protocol and/or standard. The network interface (212) may include, for example (but not limited to): a NIC, a 20 gigabit Ethernet network interface, etc. In one or more embodiments, the network interface (212) may be enabled as a LAN-on-motherboard (LOM) card.

One of ordinary skill will appreciate that the network interface (212) may perform other functionalities without departing from the scope of the invention. When providing its functionalities, the network interface (212) may perform all, or a portion, of the methods illustrated in FIGS. 4.1-6.3. The network interface (212) may be implemented using hardware, software, or any combination thereof.

In one or more embodiments, as being a specialized processing unit (if, for example, the IHS (200) is a server) or an embedded controller (if, for example, IHS (200) is a user-level device) different form a CPU (e.g., the processor (208)), the BMC (220) may be configured to provide management/monitoring functionalities (e.g., power management, cooling management, etc.) for the management of the IHS (200) (e.g., the hardware components and firmware in the IHS (200), such as the BIOS firmware, the UEFI firmware, etc.). Such management may be made even if the IHS (200) is powered off or powered down to a standby state. The BMC (220) may also (i) determine when one or more computing components are powered up, (ii) be programmed using a firmware stack (e.g., an iDRAC® firmware stack) that configures the BMC (220) for performing out-of-band (e.g., external to the BIOS (210)) hardware management tasks, and (iii) collectively provide a system for monitoring the operations of the IHS (200) as well as controlling certain aspects of the IHS (200) for ensuring its proper operation.

In one or more embodiments, the BMC (220) may include (or may be an integral part of), for example (but not limited to): a remote access controller (e.g., a DRAC® or an iDRAC®), one-time programmable (OTP) memory (e.g., special non-volatile memory that permits the one-time write of data therein-thereby enabling immutable data storage), a boot loader (e.g., a boot manager, a boot program, an initial program loader (IPL), a vendor-proprietary image, etc.), etc. The BMC (220) may be accessed by an administrator of the IHS (200) via a dedicated network connection (i.e., an out-of-band connection (232)) or a shared network connection (i.e., the in-band connection (230)).

In one or more embodiments, the BMC (220) may be a part of an integrated circuit or a chipset within the IHS (200). Separately, the BMC may operate on a separate power plane from other components in the IHS (200). Thus, the BMC may communicate with the corresponding management system via the corresponding network interface while the resources/components of the IHS (200) are powered off.

In one or more embodiments, the storage/memory resource (204), the processor (208), the BIOS (210), the network interface (212), the SDXI hardware (226), the BMC (220), and the SCP may be utilized in isolation and/or in combination to provide the above-discussed functionalities. These functionalities may be invoked using any communication model including, for example, message passing, state sharing, memory sharing, etc. By doing so, the IHS (200) may address issues related to data security, integrity, and availability proactively. Further, some of the above-discussed functionalities may be performed using available resources or when resources of the HIS are not otherwise being consumed. By performing these functionalities when resources are available, these functionalities may not be burdensome on the resources of the IHS and may not interfere with more primary workloads performed by the IHS.

Turning now to FIG. 2.2, FIG. 2.2 shows a diagram including multiple IHSs in accordance with one or more embodiments of the invention. The IHS (200) may be an example of the IHS discussed above in reference to FIG. 2.1. FIG. 2.2 may represent a VM to VM data movement operation between different user spaces located in different IHSs. The IHS (200) may include one or more VMs (e.g., VM 0 (240), VM 1 (250), etc.), an IOMMU (270), an SDXI hardware (272), and a NIC (e.g., NIC A (280A)). Similarly, a second IHS (e.g., the IHS (201)) in the system (e.g., 100, FIG. 1) may include a VM (e.g., VM 2 (260)) and a NIC (e.g., NIC B (280B)). The IHS (200) and the IHS (201) may include additional, fewer, and/or different components without departing from the scope of the invention. Each component may be operably connected to any of the other component via any combination of wired and/or wireless connections.

In one or more embodiments, VM 0 (240) and VM 1 (250) may be logical entities (e.g., logical intelligence that support virtualized application environments and/or provide virtualized application services, a logical entity that represents a host for a guest OS, etc.) executed using the physical and logical components of the IHS (200), or using computing resources of other computing devices connected to the IHS. Similarly, VM 2 (260) may be a logical entity executed using the physical and logical components of the IHS (201), or using computing resources of other computing devices connected to the IHS. Each of the VMs may perform similar or different processes. In one or more embodiments, VM 0, VM 1, and VM 2 (and applications hosted by them) may generate data (e.g., VM data) that may reflect a state of a VM.

Referring to FIG. 2.2, the SDXI hardware (272) may include multiple SDXI functions (e.g., a controller SDXI function, a source SDXI function, a physical function, a virtual function, etc.). In one or more embodiments, SDXI Function (276) may be mapped to VM 0 or VM 1, and the NIC (280B) may be mapped to VM 2. For example, SDXI Function (276) may be executing descriptors from a user process in VM 0 and may be instructed to perform a data movement operation using NIC Function A (278A) to the corresponding destination buffer (via NIC Function B (278B)). Further, data buffers (e.g., source buffers, destination buffers, etc.) may be located in kernel space or user space within each of the VMs.

Referring to FIG. 2.2, VM 0 (240) may include one or more user/address spaces (e.g., User Space A (242A), User Space B (242B), etc.) and a kernel space (e.g., Kernel Space 0 (247)). User Space A (242A) may include, at least, User Context A (244A) (including, for example, an SDXI descriptor ring) and User Space Data A (246A). Similarly, User Space B (242B) may include, at least, User Context B (244B) (including, for example, an SDXI descriptor ring) and User Space Data B (246B). Further, Kernel Space 0 (247) may include, at least, function level control structures (248) (including, for example, an RKey table, a context level 2 table, etc.) and a kernel context (249) (including, for example, context control and state, an AKey table, etc.).

In one or more embodiments, VM 1 (250) and VM 2 (260) (and their components) may provide less, the same, or more functionalities and/or services comparing to the VM 0 (240). One of ordinary skill will appreciate that the VMs may perform other functionalities without departing from the scope of the invention.

In one or more embodiments, the IOMMU (270) may isolate memory regions used by I/O devices (e.g., the SDXI hardware (272)) by mapping specific memory regions to the I/O devices using system software for exclusive access. The IOMMU (270) may also support a DMA via a DMA remapping hardware unit (not shown). Upon receiving a request from the SDXI DMA engine (274), the IOMMU may perform address (e.g., a guest/VM virtual address, a guest physical address, a host/IHS physical address, a host virtual address, etc.) translations for data transfers (e.g., translating a virtual disk block address to a physical disk block address), in which the SDXI DMA engine (274) may cache these addresses for performance purposes. Further, the IOMMU (270) may maintain a local address translation cache and may resolve addresses from certain memory spaces (e.g., the IOMMU (270) for an address space (e.g., 242A) may have a mapping of SDXI Function (276) so that it may access the address space).

One of ordinary skill will appreciate that the IOMMU (270) may perform other functionalities without departing from the scope of the invention. When providing its functionalities, the IOMMU (270) may perform all, or a portion, of the methods illustrated in FIGS. 4.1-6.3. The IOMMU (270) may be implemented using hardware, software, or any combination thereof.

In one or more embodiments, the SDXI hardware (272) may be an example of the SDXI hardware discussed above in reference to FIG. 2.1. The SDXI hardware (272) may include the SDXI DMA engine (274) and one or more smart data accelerators (e.g., SDXI Function (276), in which the function may support one or more contexts with each context having a single descriptor ring). The SDXI hardware (272) may include additional, fewer, and/or different components without departing from the scope of the invention. Each component may be operably connected to any of the other components via any combination of wired and/or wireless connections.

In one or more embodiments, the SDXI DMA engine (274) may be a multi-queue DMA engine. Each component of the SDXI hardware (272) may be connected to the SDXI DMA engine to receive data instructions from the SDXI DMA engine, and to provide data and control information to a data bridge (e.g., a bridge that receives data flows from SDXI hardware components and communicates the data flows via the corresponding interface to the storage/memory resource (e.g., 204, FIG. 2.1)). The SDXI DMA engine may provide dynamic allocation of parallel data flows to one or more SDXI hardware components (including functions), as needed by the processing tasks operating on the IHS (200). For example, the SDXI DMA engine may allocate data flows based upon the resource loading or availability of each of the SDXI hardware components, the power level or power state of each of the SDXI hardware components, or other factors not directly related to the type of the SDXI hardware components, as needed or desired. The SDXI DMA engine may also perform programming of the IOMMU (270) and support scatter-gather or memory-to-memory type of access (e.g., that involves the transfer of data to/from system memory) without major involvement by the processor (e.g., 208, FIG. 1), thereby improving data throughput and reducing a workload burden of the processor.

In one or more embodiments, SDXI Function (276) may generate DMA requests with address space identifiers that allow the IOMMU (270) to map the associated addresses, in which the "DMA" addresses may be considered as guest virtual addresses, guest physical addresses, or IHS/host physical addresses for address translation purposes.

In one or more embodiments, SDXI Function (276) (e.g., a hardware function or a software emulated function) may infer data source details (e.g., details of the source buffer (e.g., 214, FIG. 2.1)) and data destination details (e.g., details of a destination buffer/memory of a second/target IHS) of a fetched SDXI descriptor (e.g., the SDXI descriptor may be fetched by SDXI Function (276)). Based on the data destination details, SDXI Function (276) may determine whether the destination memory of the target IHS includes persistent memory. For example, a destination memory address range from the data destination details may indicate that the destination memory includes one or more physical regions of persistent memory.

Further, SDXI Function (276) may be in control of its RKey table, in which a requesting function may pass an "rkey" index/value to SDXI Function (276) and based on the rkey index, SDXI Function (276) may determine whether or not the requesting function is allowed to access the corresponding source buffer (or source address space) (see, e.g., FIG. 3.3). SDXI Function (276) may also provide a general data processing functionality (in conjunction with the processor (e.g., 303, FIG. 3.1)) that includes processing of data during data transfer operations and having access to the storage/memory resource (e.g., 204, FIG. 2).

In one or more embodiments, after a data movement/write/transfer operation from a first IHS' memory/data buffer to second IHS' memory buffer is performed, NIC Function A (278A) may send a completion status (e.g., 334, FIG. 3.1) to SDXI Function (276). The completion status may indicate that the data movement operation has been fully completed and no data are retained in the corresponding memory buffer(s). From the point of view of the SDXI hardware (272), the completion status may indicate that the data movement operation has been fully implemented (e.g., 100% of the operation was completed within a predetermined window) or partially implemented (e.g., 70% of the operation was completed and 30% of the operation was not completed). In one or more embodiments, the predetermined window may be a period of time, with a define start and end, within which a data movement operation is set to be completed.

In one or more embodiments, NIC Function A (278A) (e.g., a hardware function or a software emulated function) may include an SDXI API (e.g., an SDXI agent, an SDXI utility, etc., not shown) that manages one or more API configurations configured to provide additional functionalities to the SDXI hardware (272). The API configurations may include, for example (but not limited to): copy (source memory address (src_addr), destination memory/buffer address (dest_addr)), send_data (local memory address (local_address), destination/remote IHS' IP address (dest_IP)), copy_to_remote_host (local buffer address (local_buffer_address), destination buffer address (dest_address), dest_IP), copy_from_remote_host (local_buffer_address, remote buffer address (remote_buffer_address), remote IHS' IP address (remote_IP)), etc.

As used herein, "local" may correspond to an SDXI function hosting the context and descriptor. Further, "remote" may be used (i) by an SDXI function owning a target resource to refer to a separate requesting SDXI function and/or (ii) by a requesting SDXI function to refer to a target resource owned by a different SDXI function.

In one or more embodiments, the CA (e.g., 222, FIG. 2.1) (through its workload or data pipeline API) may invoke the SDXI API for various data movement operations so that the SDXI hardware (272) performs one or more of the invoked operations, as needed or desired. To this end, the CA (e.g., 222, FIG. 2.1), the SDXI driver (e.g., 224, FIG. 2.1), and the SDXI hardware (272) are closely associated with each other (for example, the SDXI hardware (272) (i) may communicate with the storage/memory resource (e.g., 204, FIG. 2.1) over a DMA connection and (ii) may communicate with the processor (e.g., 208, FIG. 2.1) over a PCIe connection).

In one or more embodiments, NIC A (280A) may include NIC Function A (278A). NIC A (280A) (and its components) may provide less, the same, or more functionalities and/or services comparing to the network interface (e.g., 212, FIG. 2.1). One of ordinary skill will appreciate that NIC A (280) may perform other functionalities without departing from the scope of the invention.

In one or more embodiments, NIC B (280B) (and its components) may provide less, the same, or more functionalities and/or services comparing to NIC A (280A). One of ordinary skill will appreciate that NIC B (280A) may perform other functionalities without departing from the scope of the invention.

In one or more embodiments, the IHS (201) is demonstrated without including an SDXI function; however, embodiments herein are not limited as such. The IHS (201) may also include an SDXI function (and the corresponding SDXI hardware) for its address space to perform a data movement operation.

For example, a data movement operation may be performed as follows: an application/VM (of IHS (200))↔an SDXI function (of IHS (200))↔a glue logic component↔a NIC function (of IHS (200))↔a network fabric (e.g., 130, FIG. 1)↔a NIC function (of IHS (201))↔a glue logic component↔an SDXI function (of IHS (201))↔an application/VM (of IHS (201)), in which (i) each VM may have (or communicate with) an SDXI function and (ii) each SDXI function may own an SDXI descriptor ring and use that to move data to/from their corresponding address space. In one or more embodiments, NIC functions between the corresponding SDXI functions may be transparent to the application that enqueues a work into its respective SDXI function.

Turning now to FIG. 2.3. FIG. 2.3 shows a memory-to-memory data movement operation using a simplified API configuration in accordance with one or more embodiments of the invention. The IHS (200) may be an example of the IHS (left side) discussed above in reference to FIG. 2.2 and the IHS (201) may be an example of the IHS (right side) discussed above in reference to FIG. 2.2. FIG. 2.3 may represent a data movement operation over a TCP connection between different user spaces (e.g., the source buffer (214) and the destination buffer (282)) located in different IHSs.

A user of the IHS (200) may request data to be moved from the source buffer (214) of the IHS (200) to the destination buffer (282) of the IHS (201) (e.g., a push-based data movement operation). To this end, in conjunction with the CA (e.g., 222, FIG. 2.1), the SDXI API (of NIC A (278A)) initiates a TCP connection establishment process between the IHS (200) and the IHS (201). After the TCP connection establishment process is completed (e.g., after TCP/IP offload over the network or I/O fabric (295) is completed), NIC Function A (of NIC A (278A)) invokes SDXI Function (276) to perform the data movement operation over the TCP connection. Based on that and the back-end protocol (API configuration 1 (send_data (local_address, dest_IP))) suitable for both IHSs, NIC Function A moves the data from the source buffer (214) to the destination buffer (282) with the help of the IOMMU (270), SDXI Function (276), NIC B (278B), and the TCP connection. Additional details of the TCP connection based data movement operation are described below in reference to FIGS. 4.2 and 4.3.

Turning now to FIG. 2.4, FIG. 2.4 shows a memory-to-memory data movement operation using a simplified API configuration in accordance with one or more embodiments of the invention. FIG. 2.4 may represent a data movement operation over an RDMA connection between different user spaces located in different IHSs.

Similar to FIG. 2.3, the user of the IHS (200) may request data to be moved from the source buffer (214) of the IHS (200) to the destination buffer (282) of the IHS (201) (e.g., a push-based data movement operation). To this end, in conjunction with the CA (e.g., 222, FIG. 2.1), the SDXI API (of NIC A (278A)) initiates an RDMA connection establishment process between the IHS (200) and the IHS (201). After the RDMA connection establishment process is completed (e.g., after RDMA offload over the network (295) is completed), NIC Function A (of NIC A (278A)) invokes SDXI Function (276) to perform the data movement operation over the RDMA connection. Based on that and the back-end protocol (API configuration 2 (copy_to_remote_host (local_buffer_address, dest_address, dest_IP))) suitable for both IHSs, NIC Function A moves the data from the source buffer to the destination buffer with the help of the IOMMU (270), SDXI Function (276), NIC B (278B), and the RDMA connection. Additional details of the RDMA connection based data movement operation are described below in reference to FIGS. 5.2 and 5.3.

Turning now to FIG. 2.5, FIG. 2.5 shows a memory-to-memory data retrieval operation using a simplified API configuration in accordance with one or more embodiments of the invention. FIG. 2.5 may represent a data retrieval operation over an RDMA connection between different user spaces located in different IHSs.

The user of the IHS (200) may request data to be retrieved from a source buffer (284) of the IHS (201) to the destination buffer (216) of the IHS (200) (e.g., a pull-based data movement operation). To this end, in conjunction with the CA (e.g., 222, FIG. 2.1), the SDXI API (of NIC A (278A)) initiates an RDMA connection establishment process between the IHS (200) and the IHS (201). After the RDMA connection establishment process is completed (e.g., after RDMA offload over the network (295) is completed), NIC Function A (of NIC A (278A)) invokes SDXI Function (276) to perform the data retrieval operation over the RDMA connection. Based on that and the back-end protocol (API configuration 3 (copy_from_remote_host (local_ buffer_address, remote_buffer_address, remote_IP))) suitable for both IHSs, NIC Function A retrieves the data from the source buffer (284) to the destination buffer (216) with the help of the IOMMU (270), SDXI Function (276), NIC B (278B), and the RDMA connection. Additional details of the RDMA connection based data movement operation are described below in reference to FIGS. 6.2 and 6.3.

As discussed above, the SDXI hardware/architecture is independent of the underlying I/O interconnect. The following figure (i.e., FIG. 3.1) shows one or more memory-addressed data structures used by an SDXI function (e.g., 302). In order to facilitate efficient software-based virtualization, most of the SDXI function's state may reside in the storage/memory resource (e.g., 204, FIG. 2.1). The remaining state may reside in MMIO control registers. The layout provided in FIG. 3.1 is designed to facilitate selective trapping by privileged software.

Turning now to FIG. 3.1, FIG. 3.1 shows a layout including SDXI hardware (300) and memory-addressed (or memory-mapped) data structures in accordance with one or more embodiments of the invention. The SDXI hardware (300) includes an SDXI function (302), a processor (303), a function MMIO (304), accelerator blocks (306), and an SDXI DMA engine (308). The SDXI DMA engine (308) may be an example of an SDXI DMA engine discussed above in reference to FIG. 2.2. The data structures include context tables (310), an RKey table (312), an IP address table (314), an error log (316), an AKey table (318), context control and state (320), a read index (322), a write index (324), a doorbell (326), an SDXI descriptor ring (328), Buffer 0 (330), Buffer 1 (332), and a completion status (334). The layout may include additional, fewer, and/or different components without departing from the scope of the invention. Each component may be operably connected to any of the other component via any combination of wired and/or wireless connections. Each component illustrated in FIG. 3.1 is discussed below.

In one or more embodiments, the SDXI hardware (300) may represent a wide variety of different types of hardware that may be utilized to perform one or more SDXI operations. The SDXI hardware (300) may be an example of an SDXI hardware discussed above in reference to FIG. 2.2.

In one or more embodiments, when executing a descriptor operation, the SDXI function (302) may determine an address space for each specified data buffer (or interrupt target) by using the associated AKey value to reference the AKey table entry (see, e.g., FIG. 3.3). The SDXI function (302) may provide programmed-data acceleration by reading and executing a series of memory-based, naturally-aligned, 64-byte "SDXI descriptors". Each descriptor's "opcode" field (e.g., 0x003 in FIG. 3.7) may encode a requested operation and the remainder of the descriptor specifies additional parameters.

The SDXI function (302) may generate DMA requests with a process address space identifier (PASID) when accessing non-context data structures, as well as context control entities and AKey table entries. The SDXI function (302) may also generate DMA requests with a PASID when accessing a context's descriptor ring, write index, and completion status block data structures. Further, SDXI function (302) may generate DMA requests with a PASID when accessing data buffers.

In one or more embodiments, the processor (303) (e.g., an offload processor) may, for example, (i) autonomously transfer data (in conjunction with the SDXI function (302)) from one memory location to another memory location (e.g., within the IHS or between different IHSs) so as to not to burden the processor (e.g., 208, FIG. 2.1) from performing data movement or retrieval operations, and (ii) oversee each SDXI hardware component's operations. Further, the processor (303), in conjunction with the accelerator blocks (306), may provide (or perform) enhanced data transformation operations on data, for example (but not limited to): data compression/decompression, data encryption/decryption, data checksums, hash functions (e.g., a SHA-256 function and the like), hash calculations for data deduplication, RAID functions, erasure coding, compression ratio and block size optimization, data operation chaining, multi-point data movement, query analytics, cyclic redundancy check (CRC) calculation, maintaining a local address translation cache, using an IOMMU to resolve addresses from certain memory spaces, etc.

In one or more embodiments, the function MMIO (304) may implement one or more basic minimum registers, in which some of these registers may point to, for example, the context tables (310) (where a context table further points to the AKey table (318) and the context control and state (320)), the RKey table (312), the IP address table (314), and the error log (316).

In one or more embodiments, the accelerator blocks (306) may represent hardware accelerators, logic-based or state-based accelerators, or other configurable or pre-configured accelerator functions. For example, an accelerator block may represent a general purpose processor or a processor family (e.g., a CPU or the like), a purpose specific processor (e.g., a GPU or the like), a logic-based device or a state-based device (e.g., a complex programmable logic device (CPLD) or the like), a smart I/O device that provides in-line data processing in the course of I/O operations (e.g., such as a smart NIC, a Host Bus Adapter (HBA), a storage controller such as a RAID controller, a NAS device, a SAN controller, or the like), or another processing device, as needed or desired.

In one or more embodiments, a context (or an SDXI context) represents memory structures needed to directly control the operation of the SDXI descriptor ring (328). A context may include, at least, the AKey table (318), the context control and state (320), the SDXI descriptor ring (328), the read index (322), and the write index (324). As indicated, memory buffers and completion signals that the SDXI descriptor ring (328) operate upon are not considered part of the context. In one or more embodiments, contexts may be classified into two types: (i) "unprivileged" contexts used directly by user applications for data movement and (ii) "administrative" contexts used by privileged software to control all contexts supported by the SDXI function (302).

In one or more embodiments, the context tables (310) may describe 2-level hierarchy of context tables (e.g., context table level 2 and context table level 1) to enumerate the components of a context, which are managed by privilege software (e.g., software that may operate both in kernel space and user space). The context tables (310) may point to various contexts (but are not themselves part of the contexts) that are being managed by the SDXI function (302), in which these contexts may be managed/controlled individually and they may have their own states (e.g., which may available under the context control and state (320)). In one or more embodiments, these contexts point to the SDXI descriptor ring (328) (e.g., through the context control and state (320)), in which the SDXI producer (e.g., 224, FIG. 2.1) may enqueue/insert a work for the SDXI function (302) to make sure that the SDXI producer and the SDXI function (302) are in sync (e.g., where the work may be managed by using the read index (322) and the write index (324)).

In one or more embodiments, the RKey table (312) may be any power-of-2 size from 4-Kbytes up to 1-Mbyte, aligned contiguous memory structure including one or more RKey table entries (see FIG. 3.4). Software of the storage/memory resource (e.g., 204, FIG. 2.1) may control the size of the RKey table (312) through the MMIO RKey data structure. The RKey table (312) may manage the resources that remote or other functions may access on the local memory (e.g., memory of the IHS (200)). In this manner, unauthorized access to the local memory may be prevented (e.g., enabling the way of controlling access to local memory resources from remote functions). In one or more embodiments, the SDXI function (302) may have access to the RKey table (312). Additional details of an RKey table entry are described below in reference to FIG. 3.4.

In one or more embodiments, the IP address table (314) may include (or specify) an IP address of each IHS exists in a private network (e.g., 130, FIG. 1). In this manner, a user may exactly specify which IP addresses (e.g., a source IHS' IP address, a destination IHS' IP address, etc.) are targeted to perform a data movement operation between different IHSs. Comparing to Embodiment B presented in FIG. 3.2, in Embodiment A, the corresponding AKey table entries and RKey table entries may include an index/pointer (e.g., ipaddrkey, see FIGS. 3.3. and 3.4, respectively) to the IP address table (314) that indicates which IP address is the IP address of interest (e.g., without specifying/embedding any IP address into the corresponding AKey table entries, RKey table entries, and/or descriptor)).

For example, if akey0's (e.g., an AKey table entry in the AKey table (318)) ipaddrkey equals to 0, "IP Address 0" of the IP address table (314) may need to be used (e.g., because "ipaddrkey=0" refers to "IP Address 0"). As yet another example, if akey1's ipaddrkey equals to 2, "IP Address 2" of the IP address table (314) may need to be used (e.g., because "ipaddrkey=2" refers to "IP Address 2"). In one or more embodiments, "akey0" may indicate/specify a source IHS' address space and "akey1" may indicate a destination IHS' address space.

As indicated above and comparing to Embodiment B. Embodiment A may require lesser hardware implementation (e.g., because no IP address is embedded into the corresponding AKey table entries, RKey table entries, and/or descriptor) and a user may simply use/implement "copy (src_addr, dest_addr)" API to perform a data movement operation between, for example, different IHSs.

In one or more embodiments, whenever the SDXI function (302) detects a function-wide or context-specific error, the SDXI function (302) may perform one or more actions, for example (but not limited to): reporting the error to the corresponding entity (e.g., an application, an administrator/user, etc.) in the function's error log (316), signaling the error in an associated descriptor's completion status block if relevant, etc.

In one or more embodiments, a type of an error, its logging, and its associated error containment actions may include (or specify), for example (but not limited to): an invalid context (e.g., after evaluating a context that is in invalid state, the SDXI function (302) may skip further operation on the context; unless explicitly specified by a policy, the function may suppress signaling errors), logging a context error (e.g., the function may generate an error log entry when the function detects a context error, in which after the error log entry becomes visible, the function may signal an interrupt), stopping a context due to error (e.g., when an invalid context is indicated, the function may initiate a background context stop action, in which the stop action may terminate processing of new descriptors and waits for existing ones to complete), a function-wide error (e.g., the function may initiate an error halt action in response to an uncorrectable error (e.g., detection of invalid configuration of MMIO registers, internal logic errors occurred insides the function, etc.) that prevents further safe operation of the function across all of its associated contexts), logging a function error (e.g., the function may attempt to generate an error log entry when an error halt action is initiated), etc.

In one or more embodiments, the AKey table (318) may be any power-of-2 size from 4-Kbytes up to 1-Mbyte, aligned contiguous memory structure including one or more AKey table entries (see FIG. 3.3). Software (e.g., privileged software) may control the size of the AKey table (318) through a context table level 1 entry structure. In one or more embodiments, the AKey table (318) may identify the targeted address spaces for a memory-to-memory data movement (e.g., enabling per-context access to target address spaces), in which the SDXI function (302) may have access to the AKey table (318). Additional details of an AKey table entry are described below in reference to FIG. 3.3.

In one or more embodiments, the context control and state (320) may include control and status information for the SDXI descriptor ring (328). Software (e.g., privileged software) may expose the memory containing the context control (of the context control and state (320)) as readable to the SDXI function (302) hosting the context. Further, the privileged software may expose the context status (of the context control and state (320)) to non-privileged software as a read-only structure. When generating the context, the privileged software may initialize a status entry to zero prior to making the context valid. The privileged software may also expose the memory containing the context status as read-write to the SDXI function (302) using the context address space. One of ordinary skill will appreciate that the context control and state (320) may provide other information without departing from the scope of the invention.

In one or more embodiments, when the SDXI producer inserts a work/descriptor into the SDXI descriptor ring (328), the write index (324) (or a write index pointer) may be incremented. Then, when the SDXI function (302) processes the inserted SDXI descriptor (e.g., when the descriptor has been fetched by the SDXI function, the read index (322) will updated), the read index (322) (or a read index pointer) may be incremented. In one or more embodiments, the descriptor may point to buffers (e.g., the Buffer 0 (330) such as the source memory address in the descriptor, the Buffer 1 (332) such as the destination memory address in the descriptor, etc.) on which a memory-to-memory data movement operation should occur. The descriptor may also point to a completion status block (e.g., the completion status (334), see below, which may be shared across multiple descriptors) when the SDXI function (302) finished the operation.

In one or more embodiments, the doorbell (326) may indicate presence of a descriptor in a submission queue slot of the SDXI descriptor ring (328). The submission queue slot may be a circular buffer with a fixed slot size that the SDXI producer may use to submit the descriptor. In one or more embodiments, the doorbell (326) may use the doorbell (326) to notify the SDXI function (302) about a new work queued in the SDXI descriptor ring (328).

In one or more embodiments, an SDXI descriptor is a naturally aligned, 64-byte entry that instructs the SDXI function (302) to perform a given operation (e.g., a data movement operation), in which the given operation may require a particular descriptor format to indicate parameters for the operation. One or more descriptors may be placed in a circular ring (e.g., the SDXI descriptor ring (328)) that starts at a specified address. The SDXI descriptor ring (328) may be contiguous at the translation level configured for the SDXI function (302) and may be configured to contain a given number of descriptor ring entries.

The SDXI descriptor ring (328) (and all of its related system memory data structures) include a context. A context may refer to a descriptor ring used for executing operations, along with all associated memory data structures such as control and status information. The SDXI descriptor ring (328) may require "start" and "end" indicators. Rather than using memory pointers to track these, the SDXI descriptor ring (328) may use 64-bit "unsigned" logical indices to indicate the start (e.g., the read index (322), in which the SDXI function (302) may start reading enqueued entries) and end (e.g., the write index (324), where (i) the producer may start enqueuing more entries and (ii) "write index"−1 may be an index of the last enqueued entry to be read by the SDXI function (302)) of the ring, which may simplify various computations.

From the perspective of software, there may be two types of descriptor rings: (a) a software producer ring and (b) software consumer ring. For the software producer ring, a producer/software: (i) may write descriptors on the SDXI descriptor ring (328), (ii) may increment the write index (324), and (iii) may write to (or ring) to the doorbell (326) (where the doorbell ensures new descriptors are recognized) to single the SDXI function that a new descriptor has been written. Thereafter, the SDXI function (302) may read from the SDXI descriptor ring, increment the read index (322), and perform the requested operation. For the software consumer ring, the SDXI function (302): (i) may write log messages (using the descriptor format) on to the SDXI descriptor ring. (ii) may increment the write index (324), and (iii) may be configured to generate an interrupt signal that a new message has been written. Thereafter, the producer may read from the ring (e.g., the error log (316)), increment the read index (322), and process the requested message. Additional details of the descriptor format are described below in reference to FIG. 3.7.

In one or more embodiments, if the write index (324) equals to the read index (322), the SDXI function (302) may not process more entries of the corresponding context until the write index (324) and the context's doorbell value are updated beyond the read index (322). The SDXI function (302) may stop processing entries when the read index (322) equals to the write index (324) or the read index points to an invalid entry. The SDXI function (302) may never process the entry pointed to by the write index (324) or any entry that is logically past the write index. In one or more embodiments, descriptors may be processed/issued in-order and may be executed out-of-order by the SDXI function (302), in which the read index (322) may be incremented after each issue step. In order to improve performance (e.g., to reach maximum parallelism), the SDXI function (302) may aggressively read valid descriptors between the read index (322) and the write index (324) without waiting for a doorbell signal from the producer.

In one or more embodiments, each SDXI descriptor operation may specify a completion status block/pointer (or simply, the completion status (334)) whose fields may be used by the SDXI function (302) to modify the corresponding descriptor operation's completion status and/or report relevant errors. When an SDXI descriptor's "no_pointer" field is 0, the descriptor's "completion pointer" (CompletionPtr, see FIG. 3.7) field points to the completion status whose fields are used by the corresponding SDXI function to update/modify the descriptor's completion status and/or relevant errors. When a descriptor's "no_pointer" field is 1, the completion status may not need to be updated and the CompletionPtr may be ignored. A producer (e.g., an SDXI producer, the SDXI driver (e.g., 224, FIG. 2.1), etc.) of the descriptor may initialize the completion status before, for example, submitting the descriptor (e.g., before enqueuing a work into the SDXI descriptor ring (328)). In one or more embodiments, the producer may be configured to run software, program, or application that generates a descriptor (e.g., a move operation descriptor) that may be stored in the storage/memory resource (e.g., 204, FIG. 2.1).

In one or more embodiments, the producer (or privileged software) may require or be required to use one of two producer completion modification modes (e.g., 0=atomic completion status mode and 1=simple completion status) for a context with respect to modification of the completion status, in which the producer complies to and specifies the mode to the SDXI function by setting the descriptor's "completion status requirement" field. When a completion signal/notification is received, the producer may conclude that the associated descriptor(s) have finished and may rely upon the other completion status block to determine success, failure, or other associated information.

Referring to FIG. 3.1, the components that may be managed by user-level software (e.g., without the need for privileged software) are indicated with the "user or kernel space" dashed line region. In this manner, the components that are part of the "user or kernel space" dashed line region may be mapped directly to user spaces (e.g., User Space A, User Space B, etc., FIG. 2.2) and the producer may directly send a work to the SDXI function (302) without passing through multiple context isolation layers. Further, the components that may be managed by privileged software are indicated with the "kernel space" dashed line region (e.g., the AKey table (318), the RKey table (312), and the error log (316)) are managed by the privileged software).

Turning now to FIG. 3.2, FIG. 3.2 shows a layout including the SDXI hardware (300) and memory-addressed data structures in accordance with one or more embodiments of the invention. Details of the SDXI hardware (300) and memory-based data structures (except an AKey table (340) and an RKey table (342)) are described above in reference to FIG. 3.1. Comparing to Embodiment A presented in FIG. 3.1, as indicated in Embodiment B, the basic minimum registers of the function MMIO (304) points to, the context tables (310) (where a context table further points to the AKey table (340) and the context control and state (320)), the RKey table (342), and the error log (316).

In one or more embodiments, the AKey table (340) may be any power-of-2 size from 4-Kbytes up to 1-Mbyte, aligned contiguous memory structure including one or more AKey table entries (see FIG. 3.5). Software (e.g., privileged software) may control the size of the AKey table (340) through a context table level 1 entry structure. In one or more embodiments, the AKey table (340) may identify the targeted address spaces for a memory-to-memory data movement (e.g., enabling per-context access to target address spaces), in which the SDXI function (302) may have access to the AKey table (340). Additional details of an AKey table entry are described below in reference to FIG. 3.5.

In one or more embodiments, the RKey table (342) may be any power-of-2 size from 4-Kbytes up to 1-Mbyte, aligned contiguous memory structure including one or more RKey table entries (see FIG. 3.6). Software of the storage/memory resource (e.g., 204, FIG. 2.1) may control the size of the RKey table (342) through the MMIO RKey data structure. The RKey table (342) may manage the resources that remote or other functions may access on the local memory (e.g., memory of the IHS (200)). In this manner, unauthorized access to the local memory may be prevented (e.g., enabling the way of controlling access to local memory resources from remote functions). In one or more embodiments, the SDXI function (302) may have access to the RKey table (342). Additional details of an RKey table entry are described below in reference to FIG. 3.6.

Further, comparing to Embodiment A, a 32-bit IP address may be embedded into the corresponding AKey table entries, RKey table entries, and/or descriptor as "ipaddr_lower16" and "ipaddr_upper16" (see FIGS. 3.5 and 3.6) so that the need for having a separate IP address table (e.g., 314, FIG. 3.1) is eliminated. Embodiment B may require lesser IP address management, but may require more hardware/connection management. For example, when a corresponding IP address is changed, the embedded IP address section of the corresponding data structures may need to be updated.

Turning now to FIG. 3.3, FIG. 3.3 shows an AKey table entry of the AKey table (e.g., 318, shown in Embodiment A) in accordance with one or more embodiments of the invention. A descriptor may reference any AKey associated with the same SDXI descriptor ring context (so, all the locations that an SDXI function can access on behalf of software/producer submitting work may be captured in the AKey table). One or more AKey table entries may encode/include various valid/allowed address spaces, PASIDs (in which DMA request may be generated with a PASID value or without a PASID value), and interrupts available to the context/producer (or to the requesting function in order to target different address spaces in different IHSs).

In one or more embodiments, a location of the memory buffer (e.g., the destination buffer located in a remote IHS) may be specified using one or more AKey identifiers/entries (e.g., address space identifiers, which may specify a data transfer operation in terms of which asset/data that a user wants to transfer and which source/destination memory buffers that the user wants to target). The AKey table entry may also encode an rkey identifier/value that may be provided to the SDXI function. In one or more embodiments, the NIC function may use the provided/supplied rkey value to check data movement access (or remote memory access) of the SDXI function. If the rkey value is not valid, the access of the SDXI function may be aborted. Otherwise, the access of the SDXI function may be allowed.

In one or more embodiments, the SDXI hardware (e.g., 300, FIG. 3.1) may provide control over an address space identifier used when accessing a function level control structure (e.g., 248, FIG. 2.2). Specifically, depending on the structure, a portion of the PASID may be controlled through either an MMIO register or a memory data structure (e.g., context table level 1 entry). Further, the SDXI hardware may determine address space of each data buffer (e.g., a source buffer, a destination buffer, etc.) using an AKey value/entry provided in the corresponding descriptor (e.g., srcAKey, dstAKey, see FIG. 3.7), which is used to look up an AKey table entry in memory.

In one or more embodiments, an AKey table entry (of the AKey table shown in Embodiment A) may specify one or more fields, for example (but not limited to): a valid (vl) field at bits 000 (e.g., when 1, indicates the other bits in this data structure are valid; when 0, all other bits in this data structure should be ignored), an interrupt valid (iv) field at bits 001 (e.g., when 1 and tgt_sfunc=0, the intr_num filed is valid; when tgt_sfunc≠0, it is reserved and must be set to 0), a PASID valid (pv) field at bits 002 (e.g., when 1 and tgt_sfunc=0, the PASID field includes valid information; when tgt_sfunc≠0, it is reserved and must be set to 0), a steering enable (ste) field at bits 003 (e.g., when 1 and tgt_sfunc=0, memory requests referencing this AKey table entry are enabled to include data steering hint (DSH) information when requested through the corresponding descriptor; when 0 and tgt_sfunc=0, DSH is disabled for memory requests referencing this AKey table entry even when requested through the corresponding descriptor; when tgt_sfunc≠0, it is reserved and must be set to 0), an intr_num field at bits 014:004 (e.g., interrupts generated using this AKey table entry are issued using the message signaled interrupts (MSI) entry corresponding to intr_num; when tgt_sfunc≠0, it is reserved), a reserve (rsv) field at bits 015 (e.g., this field should be set to 0), a tgt_sfunc field at bits 031:016 (described below), a pasid field at bits 051:032 (e.g., a PASID value used for requests using this AKey table entry), a rsv field at bits 061:052 (e.g., this field should be set to 0), a processing hint (ph) field at bits 063:062 (e.g., when ste=1 and tgt_sfunc=0, this field supplies information used as part of DSH; when tgt_sfunc≠0, it is reserved and must be set to 0), a steering tag (stag) field at bits 079:064 (e.g., when ste=1 and tgt_sfunc=0, this field supplies information used as part of DSH; when tgt_sfunc≠0, it is reserved and must be set to 0), a rsv field at bits 095:080 (e.g., this field should be set to 0), an rkey field at bits 111:096 (e.g., specifies the rkey value used to access another function's data buffer or interrupt (in order to perform a data transfer); this field is only valid if tgt_sfunc≠0), an ipaddrkey field at bits 127:112 (described above), etc.

In one or more embodiments, the pasid field and tgt_sfunc field may help to form an address space identifier used to access a data buffer. A data movement operation may utilize rkey field to authorize a data buffer access request made by the corresponding function.

In one or more embodiments, when performing a data transfer, the tgt_sfunc field may specify a target function within the SDXI hardware which owns data buffers and interrupts associated with the AKey table entry (e.g., a tgt_sfunc value may be a mechanism to access a data buffer owned by a different SDXI function than the one executing the corresponding descriptor, in the case of a data movement operation that involves two or more functions to perform a data movement operation from one VM to another). The tgt_sfunc encoding of 0 may indicate the target resource belongs to the same function executing the corresponding descriptor, in which only the 0 encoding may be used to access local resources. When the tgt_sfunc field is non-zero, the target resource may belong to a remote function whose sfunc register value matches tgt_sfunc.

Turning now to FIG. 3.4, FIG. 3.4 shows an RKey table entry of the RKey table (e.g., 312, shown in Embodiment A) in accordance with one or more embodiments of the invention. A "local/source" SDXI function may use RKey table entries to manage remote or other requesting functions' access to local function resources (e.g., memory, interrupts, etc.). Software (e.g., privileged software) may use RKey table entries (in combination with an IOMMU table(s)) to selectively expose data buffers and/or interrupts to different requesting functions.

In one or more embodiments, each RKey table entry is an aligned, for example, 16-byte structure. An RKey table entry (of the RKey table shown in Embodiment A) may specify one or more fields, for example (but not limited to): a valid (vl) field at bits 000 (e.g., when 1, indicates the other bits in this data structure are valid; when 0, all other bits in this data structure should be ignored and remote or other requesting functions may not use the RKey value associated with this entry to access data buffers or issue interrupts owned by the local SDXI function), an interrupt valid (iv) field at bits 001 (e.g., when 1, requesting functions referencing this RKey table entry are permitted to generate interrupt requests via the local SDXI function; when 0, interrupt requests generated by referencing this RKey table entry are aborted), a PASID valid (pv) field at bits 002 (e.g., when 1, the PASID field includes valid information), a steering enable (ste) field at bits 003 (e.g., when 1, memory requests referencing this RKey table entry are enabled to include DSH information when requested through the corresponding descriptor; when 0, DSH is disabled for memory requests referencing this RKey table entry even when requested through the corresponding descriptor), an intr_num field at bits 014:004 (e.g., interrupts generated using this RKey table entry are issued using the MSI entry corresponding to intr_num), a rsv field at bits 015 (e.g., this field should be set to 0), a req_sfunc field at bits 031:016 (e.g., req_sfunc specifies the sfunc value of the remote or other requesting function expected to reference this RKey table entry), a pasid field at bits 051:032 (e.g., a PASID value used to access data buffers using this RKey table entry), a rsv field at bits 061:052 (e.g., this field should be set to 0), a processing hint (ph) field at bits 063:062 (e.g., when ste=1, this field supplies information used as part of DSH; when ste=0, this field is reserved), a steering tag (stag) field at bits 079:064 (e.g., when ste=1, this field supplies information used as part of DSH; when ste=0, this field is reserved), a rsv field at bits 111:080 (e.g., this field should be set to 0), an ipaddrkey field at bits 127:112 (described above), etc.

Turning now to FIG. 3.5, FIG. 3.5 shows an AKey table entry of the AKey table (e.g., 340, shown in Embodiment B) in accordance with one or more embodiments of the invention. Certain details of the AKey table entry are described above in reference to FIG. 3.3.

In one or more embodiments, an AKey table entry (of the AKey table shown in Embodiment B) may specify one or more fields, for example (but not limited to): a valid (vl) field at bits 000, an interrupt valid (iv) field at bits 001, a PASID valid (pv) field at bits 002, a steering enable (ste) field at bits 003, an intr_num field at bits 014:004, a rsv field at bits 015, a tgt_sfunc field at bits 031:016, a pasid field at bits 051:032, a rsv field at bits 061:052, a processing hint (ph) field at bits 063:062, a steering tag (stag) field at bits 079:064, an ipaddr_lower16 field at bits 095:080 (described above), an rkey field at bits 111:096, an ipaddr_upper16 field at bits 127:112 (described above), etc.

Turning now to FIG. 3.6, FIG. 3.6 shows an RKey table entry of the RKey table (e.g., 342, shown in Embodiment B) in accordance with one or more embodiments of the invention. Certain details of the RKey table entry are described above in reference to FIG. 3.4.

In one or more embodiments, an RKey table entry (of the RKey table shown in Embodiment B) may specify one or more fields, for example (but not limited to): a valid (vl) field at bits 000, an interrupt valid (iv) field at bits 001, a PASID valid (pv) field at bits 002, a steering enable (ste) field at bits 003, an intr_num field at bits 014:004, a rsv field at bits 015, a req_sfunc field at bits 031:016, a pasid field at bits 051:032, a rsv field at bits 061:052, a processing hint (ph) field at bits 063:062, a steering tag (stag) field at bits 079:064, an ipaddr_lower16 field at bits 111:080 (described above), an ipaddr_upper16 field at bits 127:112 (described above), etc.

Turning now to FIG. 3.7, FIG. 3.7 shows a descriptor format in accordance with one or more embodiments of the invention. The descriptor format (e.g., of the corresponding descriptor) shows a data movement/copy operation from a source data buffer (or source address space) to a destination data buffer (or destination address space/persistent memory). The descriptor format (and its components) may define how the operation needs to occur.

In one or more embodiments, the descriptor format may specify one or more fields, for example (but not limited to): a valid (vl) field at bits double word 0 (DWORD0) 000 (e.g., 1=descriptor is valid, all fields may be processed; 0=descriptor is invalid, all other fields within the descriptor should be ignored), a sequential consistency (se) field at bits DWORD0 001 (e.g., 1=operation writes are sequentially consistent; 0=operation writes are not required to be sequentially consistent), a fence (fe) field at bits DWORD0 002 (e.g., 1=all prior descriptor operations should complete before executing this descriptor's operation; 0=execution of this descriptor's operation is permitted prior to the completion of prior descriptor operations), a chain (ch) field at bits DWORD0 003 (e.g., 1=start or middle of a set of chained descriptors; 0=end of a chain, or non-chained descriptor), a completion status mode requirement for the descriptor (csr) field at bits DWORD0 004 (e.g., 1=simple completion status mode should be used; 0=atomic completion status mode should be used), a rsv field at bits DWORD0 007:005 (e.g., this field should be set to 0), a subtype field at bits DWORD0 015:008 (e.g., subtype=0x003 specifies the corresponding operation group), a type field at bits DWORD0 026:016 (e.g., type=0x001 specifies the corresponding operation group), a rsv field at bits DWORD0 031:027 (e.g., this field should be set to 0), a size field at bits DWORD1 031:000 (e.g., this field specifies the number of bytes to write minus 1), a source buffer attribute (attr_src) field at bits DWORD2 003:000 (see below), a destination buffer attribute (attr_dst) field at bits DWORD2 007:004 (see below), a rsv field at bits DWORD2 031:008 (e.g., this field should be set to 0), a source buffer AKey (akey0) field at bits DWORD3 015:000 (e.g., akey0 may specify a source buffer for data to be copied), a destination buffer AKey (akey1) field at bits DWORD3 031:016 (e.g., akey1 may specify a destination buffer for the data to be copied), a source buffer starting address (srcAddress) field at bits DWORD4 031:000 (e.g., an srcAddress may specify a particular address within a source buffer as being the source address of the data to be operated upon), an ending srcAddress field at bits DWORD5 063:032, a destination buffer starting address (dstAddress) field at bits DWORD6 031:000 (e.g., a dstAddress may specify a particular address within a destination buffer as being the destination address of the data after being operated upon), an ending dstAddress field at bits DWORD7 063:032, a source buffer IP address (src IP Address) field at bits DWORD8 031:000 (e.g., an src IP Address may specify an IP address of a source IHS), a destination buffer IP address (dest IP Address) field at bits DWORD9 031:000 (e.g., a dest IP Address may specify an IP address of a destination IHS), a rsv field at bits DWORD10-DWORD13 031:000 (e.g., this field should be set to 0), a rsv field at bits DWORD14 004:000 (e.g., this field should be set to 0), a completion status block pointer (CompletionPtr) field at bits DWORD14 031:004 (e.g., a pointer to a region of memory including the completion status (e.g., 334, FIG. 3.1), where an invalid pointer may result in an error), a CompletionPtr field at bits DWORD15 063:032, etc.

In one or more embodiments, when vl=0, the SDXI function (e.g., 302, FIG. 3.1) may poll the corresponding descriptor until it becomes valid or until a predetermined implementation timeout period has expired at which point, an error is logged in the error log (e.g., 316, FIG. 3.1). In one or more embodiments, the producer (e.g., 224, FIG. 2.1) may store one AKey value in the dstAKey field and a different AKey value in the srcAKey field of the descriptor to specify different address spaces for a source buffer of the first IHS (e.g., 200, FIG. 2.3) and a destination buffer of a second IHS (e.g., 201, FIG. 2.3). Similarly, the producer may store an IP address of the first IHS in the src IP Address field and an IP address of the second IHS in the dest IP Address field of the descriptor to specify the IP address of the source buffer of the first IHS and the IP address of the second IHS.

In one or more embodiments, the attribute field may control features related to accessing a specific memory/data buffer (e.g., the attr_src, the attr_dst, a 64-bit host virtual address, a guest physical address, etc.). Referring to FIG. 3.7, the attr_src field or the attr_dst field may include 4 bits, in which (i) bits 1:0 show information related to a coherency control (e.g., the associated memory location is accessed as I/O coherent, the associated memory location is accessed as non-coherent, etc.), (ii) bit 2 is reserved (which may set to 0), and (iii) bit 3 shows information related to MMIO (e.g., the referenced memory buffer may be located in either system memory or MMIO space).

As indicated above, the descriptor format includes one or more descriptor commands and other information that may be mapped to a specific PCIe drive or device. A descriptor command may include, for example, reading of the data range to a source buffer (e.g., 214, FIG. 2.1) of a first IHS and writing of the read data range to a destination buffer of a second IHS. The other information of the descriptor format may include, for example (but not limited to): a source data range/details (that may be specific to a descriptor operation or command such as a source address range of data to be copied, a source memory identification, etc.), a write data destination range/details (that may be specific to a descriptor operation or command such as a destination memory address range, a destination memory identification, etc.), reserved bits, a header, a footer, PCIe protocol attributes, etc., that may be used for a data movement/transfer operation from source buffer/memory to destination buffer/memory.

FIG. 4.1 shows a TCP connection establishment process between a first IHS (e.g., 200, FIG. 2.3) and a second IHS (e.g., 201, FIG. 2.3) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be executed by, for example, the above-discussed CA (e.g., 222, FIG. 2.1), SDXI API, and a processor of the second IHS. Other components of the system (100) illustrated in FIG. 1 may also execute all or part of the method shown in FIG. 4.1 without departing from the scope of the invention.

In Step 400, a processor of the BMC (e.g., 220, FIG. 2.1) detects that the first IHS is powered on by a user (via, for example, an AC or DC event). This detection may trigger the processor of the BMC to perform one or more steps (e.g., when power is first applied to the first IHS, the processor of the BMC (in conjunction with the corresponding BIOS (e.g., 210, FIG. 2.1)) starts a sequence of initialization procedures (e.g., a root of trust sequence for the first IHS resources/components)). For example, an AC event may refer to coupling or "plugging in" the first IHS to a power source (e.g., a power supply). As yet another example, a DC event may refer to an interaction by the user (or other stimulus) indicating a desire to enable a main power supply and execute the host system of the first IHS.

Thereafter, the processor of the BMC (in conjunction with a boot loader (or a "bootstrap loader")) initiates (or allows) the "secure" booting process of the first IHS (so that the first IHS will be ready to interact with the user (e.g., the first IHS will be enabled for operation, device drivers will be installed, OS data will be loaded into the main memory of the first IHS, etc.) (or the OS will be capable of executing system applications) when the booting process is completed. After the booting process is completed, the user may send (via the corresponding client) a data movement/copy request to the CA for a block of data to be moved from a source buffer (e.g., source user/address space, a first memory location, etc.) of the first IHS to a destination buffer (e.g., destination user/address space, a second memory location, etc.) of the second IHS (e.g., a push-based data movement operation).

Upon receiving the request and in conjunction with the SDXI API, the CA may initiate a data movement operation by initiating a TCP connection establishment process between the first IHS and second IHS. To this end, the CA may send a "synchronize sequence numbers" (SYN) segment to the processor of the second IHS, which may be a connection request to the processor to synchronize the sequence numbers.

In Step 402, in response to sending the SYN segment, the CA receives an "acknowledgment field significant" (ACK) and SYN segment from the processor of the second IHS. By sending the ACK and SYN segment, the processor is acknowledging the connection request for synchronization. Meanwhile, the processor may also send its connection request to the CA for synchronization of its sequence numbers.

In Step 404, in response to receiving the ACK and SYN segment, the CA sends an ACK segment to the processor of the second IHS to complete the TCP connection establishment process (e.g., to complete a trust establishment process). In this segment, the CA is acknowledging the communication request from the second IHS for synchronization. In one or more embodiments, the TCP connection establishment process may be required in order to allow the SDXI hardware (e.g., 272, FIG. 2.2) to manage/perform the data movement operation over the TCP connection.

In Step 406, once the TCP connection establishment process is completed, the CA may initiate notification of an SDXI function (e.g., 276, FIG. 2.2) about the completed TCP connection establishment process.

In Step 408, upon initiating notification of the SDXI function (in Step 406), the CA receives a notification from the SDXI function indicating that an AKey table (e.g., 318. FIG. 3.1) and an IP address table (e.g., 314, FIG. 3.1) are updated to reflect one or more details of the completed TCP connection establishment process. For example, the SDXI function (i) may update the IP address table by inputting an IP address of the first IHS and an IP address of the second IHS, and (ii) may update the corresponding AKey table entries (e.g., a source AKey table entry, a destination AKey table entry, etc.) of the AKey table (and the corresponding RKey table entries of an RKey table (e.g., 312, FIG. 3.1)) by inputting an "ipaddrkey" index/pointer to the IP address table.

In one or more embodiments, the pointer may indicate which IP address(es) (e.g., the IP address of the first IHS, the IP address of the second IHS, etc.) are the IP addresses of interest (without embedding any IP address into the corresponding AKey table entries, RKey table entries, and/or descriptor). The updated version of the AKey table, RKey table, and IP address table may be used at a later point-in-time when to perform the data movement operation. In one or more embodiments, the method may end following Step 408.

FIGS. 4.2 and 4.3 show a memory-to-memory data movement operation using the TCP connection in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.2, the method shown in FIG. 4.2 may be executed by, for example, the above-discussed SDXI hardware and an "SDXI" producer (e.g., 224, FIG. 2.1) of the first IHS. Other components of the system (100) illustrated in FIG. 1 may also execute all or part of the method shown in FIG. 4.2 without departing from the scope of the invention.

In Step 410, at a later point-in-time (e.g., after the TCP connection establishment process is completed and the notification is received from the SDXI function, after the TCP/IP offload over the network (e.g., 130, FIG. 1) is completed, etc.), the CA starts to implement the request received in Step 400 of FIG. 4.1. To this end, the CA may send a "send_data (local address, dest_IP)" API (e.g., API configuration 1 to initiate implementation of the associated back-end protocol) to the producer.

In Step 412, upon receiving the API (in Step 410) and in order to offload the request received in Step 400 of FIG. 4.1 to the SDXI function, the producer enqueues/issues/generates a work (e.g., a "data movement operation" job that has been initiated by the user, a work descriptor for the block of data, a descriptor for the data movement operation, etc.) into an SDXI descriptor ring (e.g., 328, FIG. 3.1). In one or more embodiments, the work descriptor (or simply the "descriptor") may include any suitable information for the data within the source buffer (i.e., the data that needs to be moved to the second IHS). For example, the descriptor may include, for example (but not limited to): a descriptor type (e.g., a data copy descriptor), an attribute of the data (e.g., uncompressed, compressed, etc.), a destination AKey (dstAKey, which targets address space of the destination buffer), a source AKey (srcAKey, which targets address space of the source buffer), a source address (srcAddress), a destination address (dstAddress), a source IP address (src IP Address, which may be IP address of the first IHS), a destination IP address (dest IP Address, which may be IP address of the second IHS), a completion signal indicator (CompletionPtr), etc. As indicated, IP-based addressing is available in the descriptor.

In one or more embodiments, in order to enqueue the "SDXI" descriptor to the SDXI descriptor ring, the producer may, at least: (i) check for sufficient space in the SDXI descriptor ring by reading the read index (e.g., 322, FIG. 3.1), the write index (e.g., 324, FIG. 3.1), and ring size; (ii) reserve space in the SDXI descriptor ring by adding a value to the write index in memory corresponding to the number of descriptors to be enqueued; and/or (iii) once the descriptor is written, write the updated write index value to the a doorbell register. The producer may enqueue/insert the descriptor for the SDXI function to make sure that the producer and SDXI function are in sync.

In Step 414, after the producer generates the descriptor in memory (or after the producer enqueues the work in Step 412), the producer notifies the SDXI hardware about the presence of the work (e.g., invokes the SDXI hardware to perform the data movement operation). More specifically, the producer may notify the SDXI function about the "new" work that needs to be performed by ringing/sending the doorbell (e.g., 326, FIG. 3.1) (or by any other manner such as sending a doorbell signal to the SDXI function).

In Step 416, in response to receiving the notification/doorbell in (Step 414), the SDXI function fetches (e.g., using a fetch command and via the IOMMU (e.g., 270, FIG. 2.2)) the corresponding descriptor(s) (e.g., for the data to be moved/copied, for the actual operation in interest, etc.) from the SDXI descriptor ring via DMA read (e.g., by acting as a DMA hardware to read the descriptor to determine, at least, whether (i) it includes a write operation to persistent memory, (ii) the memory buffer includes one or more physical regions of persistent memory, and/or (iii) targeted source address space, destination address space, a source IP address, and/or a destination IP address are specified to perform the data movement operation).

In Step 418, the SDXI function analyzes the "fetched" descriptor to infer a source AKey table entry (e.g., akey0, srcAKey, an AKey table entry for the source address space, etc.) and a destination AKey table entry (e.g., akey1, dstAKey, an AKey table entry for the destination address space, etc.) that need to be checked to initiate the performance of the requested data movement operation. For example, based on the analysis, the SDXI function may infer, at least, (i) the targeted address spaces in the source buffer and destination buffer (e.g., may infer details of the source buffer and destination buffer, may infer size of the data that needs to be moved, etc.) and (ii) how the operation needs to occur (e.g., AKey entries or address space identifiers may specify the memory-to-memory data movement operation in terms of which asset/data that the user wants to transfer and which source/destination memory buffers that the user wants to target).

In Step 420, the SDXI function analyzes the source AKey table entry to infer an RKey index (see, e.g., FIG. 3.3) and a source IP address index. In one or more embodiments, the SDXI function may then send the RKey index/value to a NIC function of the first IHS for verification purposes (see Step 424 of FIG. 4.3). For example, the NIC function may use the provided/supplied RKey value to check data movement access of the SDXI function. If the RKey value is not valid, the access of the SDXI function may be aborted. Otherwise, the access of the SDXI function may be allowed.

As indicated above, an IP address is a useful parameter to distinguish different hosts/IHSs within the network (and their related memory address spaces such as source address space and destination address space for the data movement operation). With the help of the IP addresses of both first and second IHSs, instead of just stating/using a copy operation based API (e.g., copy (src_addr, dest_addr)), one may state/use more functional/sophisticated yet simple API (e.g., API configuration 1) to perform the data movement operation between different IHSs with a better user experience and performance. For example, if the source IP address index/pointer (e.g., the ipaddrkey field of the source AKey table)

equals to 0, "IP Address 0" of the IP address table may need to be used as the IP address of the first IHS (e.g., because "ipaddrkey=0" refers to "IP Address 0").

In Step 422, the SDXI function analyzes the destination AKey table entry to infer a destination IP address index. For example, if the destination IP address index (e.g., the ipaddrkey field of the destination AKey table) equals to 2, "IP Address 2" of the IP address table may need to be used as the IP address of the second IHS (e.g., because "ipaddrkey=2" refers to "IP Address 2").

Turning now to FIG. 4.3, the method shown in FIG. 4.3 may be executed by, for example, the above-discussed SDXI hardware. Other components of the system (100) illustrated in FIG. 1 may also execute all or part of the method shown in FIG. 4.3 without departing from the scope of the invention.

In Step 424, based on the RKey index (which may specify information related to the SDXI function) received in Step 420 of FIG. 4.2 as an input (e.g., which basically controls which functions are allowed to perform a data movement operation), the NIC function (of the first IHS) reads and verifies that the SDXI function is allowed to perform the operation. Based on that, the NIC function may invoke (e.g., by sending an instruction or a command) the SDXI function to perform the requested data movement operation over the TCP connection.

In Step 426, upon verification in Step 424 and in response to the NIC function's command, the SDXI function directly or indirectly obtains/receives (via a DMA read/transaction over the IOMMU) the data from the source buffer (e.g., the source address space) based on the source IP address index (and the source AKey table entry). In one or more embodiments, the source buffer may include/cache/store source data that needs to be migrated/copied to the destination buffer of the second IHS. Thereafter, the SDXI function may provide the data to the NIC function so that the NIC function performs the data movement operation.

In Step 428, based on the destination IP address index (e.g., based on the SDXI IP extensions shown in the AKey table) and API configuration 1, the NIC function moves/transfers/writes the data from the source buffer of the first IHS to the destination buffer of the second IHS with the help of the TCP connection, SDXI function, and NIC function of the second IHS (e.g., to access the destination buffer over the IOMMU of the second IHS). Thereafter, the processor of the second IHS may store the data to persistent storage/database of the second IHS for further or later use.

In Step 430, after receiving a feedback from the processor of the second IHS with respect to the completed data movement operation (e.g., after the date movement operation is successfully performed), the NIC function may initiate notification of the SDXI function about the completed data movement operation.

In Step 432, upon receiving the notification from the NIC function, the SDXI function may initiate notification of the producer about the completed data movement operation. In one or more embodiments, upon receiving the notification, the SDXI function may send a completion status signal (e.g., which may indicate that the data movement operation has been fully completed and no data are retained in the corresponding memory buffers) to the completion status component/block (e.g., 334, FIG. 3.1). Based on that, the producer may also conclude that the SDXI function has completed the work and may rely upon the other completion status block to determine success, failure, or other associated information. In one or more embodiments, the method may end following Step 432.

FIG. 5.1 shows an RDMA connection establishment process between a first IHS (e.g., 200, FIG. 2.3) and a second IHS (e.g., 201, FIG. 2.3) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 5.1, the method shown in FIG. 5.1 may be executed by, for example, the above-discussed CA, SDXI API, and a processor of the second IHS. Other components of the system (100) illustrated in FIG. 1 may also execute all or part of the method shown in FIG. 5.1 without departing from the scope of the invention.

In Step 500, a processor of the BMC detects that the first IHS is powered on by a user. This detection may trigger the processor of the BMC to perform one or more steps (see Step 400 of FIG. 4.1). Thereafter, the processor of the BMC (in conjunction with a boot loader) initiates the secure booting process of the first IHS when the booting process is completed. After the booting process is completed, the user may send (via the corresponding client) a data movement request to the CA for a block of data to be moved from a source buffer of the first IHS to a destination buffer of the second IHS (e.g., a push-based data movement operation).

Upon receiving the request and in conjunction with the SDXI API, the CA may initiate a data movement operation by initiating an RDMA connection establishment process between the first IHS and second IHS. To this end, the CA may send a first vendor key (assigned to the first IHS) to the processor of the second IHS.

In Step 502, in response to sending the first vendor key, the CA receives a second vendor key assigned to the second IHS from the processor of the second IHS to complete the RDMA connection establishment process (e.g., to complete a trust establishment process). In one or more embodiments, the RDMA connection establishment process may be required in order to allow the SDXI hardware to manage/perform the data movement operation over the RDMA connection.

In Step 504, once the RDMA connection establishment process is completed, the CA may initiate notification of an SDXI function (e.g., 276, FIG. 2.2) about the completed RDMA connection establishment process.

In Step 506, upon initiating notification of the SDXI function (in Step 504), the CA receives a notification from the SDXI function indicating that the AKey table is updated to reflect one or more details of the completed RDMA connection establishment process. For example, the SDXI function may update the corresponding AKey table entries (e.g., a source AKey table entry, a destination AKey table entry, etc.) of the AKey table (and the corresponding RKey table entries of the RKey table) by embedding an IP address of the first IHS into the source AKey table entry (e.g., as "ipaddr_lower16" and "ipaddr_upper16") and an IP address of the second IHS into the destination AKey table entry (e.g., as "ipaddr_lower16" and "ipaddr_upper16"). The updated version of the AKey table and RKey table may be used at a later point-in-time when to perform the data movement operation. In one or more embodiments, the method may end following Step 506.

FIGS. 5.2 and 5.3 show a memory-to-memory data movement operation using the RDMA connection in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 5.2, the method shown in FIG. 5.2 may be executed by, for example, the above-discussed SDXI hardware and SDXI producer of the first IHS. Other components of the system (100) illustrated in FIG. 1 may also execute all or part of the method shown in FIG. 5.2 without departing from the scope of the invention.

In Step 508, at a later point-in-time (e.g., after the RDMA connection establishment process is completed and the notification is received from the SDXI function, after the RDMA offload over the network is completed, etc.), the CA starts to implement the request received in Step 500 of FIG. 5.1. To this end, the CA may send a "copy_to_remote_host (local_buffer_address, dest_address, dest_IP)" API (e.g., API configuration 2 to initiate implementation of the associated back-end protocol) to the producer.

In Step 510, upon receiving the API (in Step 508) and in order to offload the request received in Step 500 of FIG. 5.1 to the SDXI function, the producer enqueues a work descriptor into an SDXI descriptor ring. In one or more embodiments, the work descriptor may include any suitable information for the data within the source buffer (i.e., the data that needs to be moved to the second IHS). The producer may enqueue the descriptor for the SDXI function to make sure that the producer and SDXI function are in sync.

In Step 512, after the producer generates the descriptor in memory (or after the producer enqueues the work in Step 510), the producer notifies the SDXI hardware about the presence of the work (e.g., invokes the SDXI hardware to perform the data movement operation). More specifically, the producer may notify the SDXI function about the "new" work that needs to be performed by ringing the doorbell (or by any other manner such as sending a doorbell signal to the SDXI function).

In Step 514, in response to receiving the notification/doorbell in (Step 512), the SDXI function fetches (e.g., using a fetch command and via the IOMMU) the corresponding descriptor(s) from the SDXI descriptor ring via DMA read (e.g., by acting as a DMA hardware to read the descriptor to determine, at least, whether (i) it includes a write operation to persistent memory, (ii) the memory buffer includes one or more physical regions of persistent memory, and/or (iii) targeted source address space, destination address space, a source IP address, and/or a destination IP address are specified to perform the data movement operation).

In Step 516, the SDXI function analyzes the "fetched" descriptor to infer a source AKey table entry and a destination AKey table entry that need to be checked to initiate the performance of the requested data movement operation. For example, based on the analysis, the SDXI function may infer, at least, (i) the targeted address spaces in the source buffer and destination buffer and (ii) how the operation needs to occur.

In Step 518, the SDXI function analyzes the source AKey table entry to infer an RKey index and embedded source IP address details of the first IHS. In one or more embodiments, the SDXI function may then send the RKey index/value to a NIC function of the first IHS for verification purposes. As indicated above, an IP address is a useful parameter to distinguish different hosts/IHSs within the network (and their related memory address spaces such as source address space and destination address space for the data movement operation). With the help of the IP addresses of both first and second IHSs, instead of just stating/using a copy operation based API (e.g., copy (src_addr, dest_addr)), one may state/use more functional/sophisticated yet simple API (e.g., API configuration 2) to perform the data movement operation between different IHSs with a better user experience and performance. In Step 520, the SDXI function analyzes the destination AKey table entry to infer embedded destination IP address details of the second IHS.

Turning now to FIG. 5.3, the method shown in FIG. 5.3 may be executed by, for example, the above-discussed SDXI hardware. Other components of the system (100) illustrated in FIG. 1 may also execute all or part of the method shown in FIG. 5.3 without departing from the scope of the invention.

In Step 522, based on the RKey index received in Step 518 of FIG. 5.2 as an input, the NIC function (of the first IHS) reads and verifies that the SDXI function is allowed to perform the operation. Based on that, the NIC function may invoke (e.g., by sending an instruction or a command) the SDXI function to perform the requested data movement operation over the RDMA connection.

In Step 524, upon verification in Step 522 and in response to the NIC function's command, the SDXI function directly or indirectly obtains (via a DMA read over the IOMMU) the data from the source buffer based on the embedded source IP address details (and the source AKey table entry). In one or more embodiments, the source buffer may include source data that needs to be migrated to the destination buffer of the second IHS. Thereafter, the SDXI function may provide the data to the NIC function so that the NIC function performs the data movement operation.

In Step 526, based on the embedded destination IP address details (e.g., based on the SDXI IP extensions shown in the AKey table) and API configuration 2, the NIC function moves the data from the source buffer of the first IHS to the destination buffer of the second IHS with the help of the RDMA connection, SDXI function, and NIC function of the second IHS (e.g., to access the destination buffer over the IOMMU of the second IHS). Thereafter, the processor of the second IHS may store the data to persistent storage/database of the second IHS for further or later use.

In Step 528, after receiving a feedback from the processor of the second IHS with respect to the completed data movement operation (e.g., after the date movement operation is successfully performed), the NIC function may initiate notification of the SDXI function about the completed data movement operation.

In Step 530, upon receiving the notification from the NIC function, the SDXI function may initiate notification of the producer about the completed data movement operation. In one or more embodiments, upon receiving the notification, the SDXI function may send a completion status signal (e.g., which may indicate that the data movement operation has been fully completed and no data are retained in the corresponding memory buffers) to the completion status. Based on that, the producer may also conclude that the SDXI function has completed the work and may rely upon the other completion status block to determine success, failure, or other associated information. In one or more embodiments, the method may end following Step 530.

FIG. 6.1 shows an RDMA connection establishment process between a first IHS (e.g., 200, FIG. 2.3) and a second IHS (e.g., 201, FIG. 2.3) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 6.1, the method shown in FIG. 6.1 may be executed by, for example, the above-discussed CA, SDXI API, and a processor of the second IHS. Other components of the system (100) illustrated in FIG. 1 may also execute all or part of the method shown in FIG. 6.1 without departing from the scope of the invention.

In Step 600, a processor of the BMC detects that the first IHS is powered on by a user. This detection may trigger the processor of the BMC to perform one or more steps (see Step 400 of FIG. 4.1). Thereafter, the processor of the BMC (in conjunction with a boot loader) initiates the secure booting process of the first IHS when the booting process is completed. After the booting process is completed, the user may send (via the corresponding client) a data retrieval request to the CA for a block of data to be retrieved from a source buffer of the second IHS to a destination buffer of the first IHS (e.g., a pull-based data movement operation).

Upon receiving the request and in conjunction with the SDXI API, the CA may initiate a data retrieval operation by initiating an RDMA connection establishment process between the first IHS and second IHS. To this end, the CA may send a first vendor key (assigned to the first IHS) to the processor of the second IHS.

In Step 602, in response to sending the first vendor key, the CA receives a second vendor key assigned to the second IHS from the processor of the second IHS to complete the RDMA connection establishment process (e.g., to complete a trust establishment process). In one or more embodiments, the RDMA connection establishment process may be required in order to allow the SDXI hardware to manage/perform the data retrieval operation over the RDMA connection.

In Step 604, once the RDMA connection establishment process is completed, the CA may initiate notification of an SDXI function (e.g., 276, FIG. 2.2) about the completed RDMA connection establishment process.

In Step 606, upon initiating notification of the SDXI function (in Step 604), the CA receives a notification from the SDXI function indicating that the AKey table is updated to reflect one or more details of the completed RDMA connection establishment process. For example, the SDXI function may update the corresponding AKey table entries (e.g., a source AKey table entry, a destination AKey table entry, etc.) of the AKey table (and the corresponding RKey table entries of the RKey table) by embedding an IP address of the first IHS into the destination AKey table entry (e.g., as "ipaddr_lower16" and "ipaddr_upper16") and an IP address of the second IHS into the source AKey table entry (e.g., as "ipaddr_lower16" and "ipaddr_upper16"). The updated version of the AKey table and RKey table may be used at a later point-in-time when to perform the data movement operation. In one or more embodiments, the method may end following Step 606.

FIGS. 6.2 and 6.3 show a memory-to-memory data retrieval operation using the RDMA connection in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 6.2, the method shown in FIG. 6.2 may be executed by, for example, the above-discussed SDXI hardware and SDXI producer of the first IHS. Other components of the system (100) illustrated in FIG. 1 may also execute all or part of the method shown in FIG. 6.2 without departing from the scope of the invention.

In Step 608, at a later point-in-time (e.g., after the RDMA connection establishment process is completed and the notification is received from the SDXI function, after the RDMA offload over the network is completed, etc.), the CA starts to implement the request received in Step 600 of FIG. 6.1. To this end, the CA may send a "copy_from_remote_host (local_buffer_address, remote_buffer_address, remote_IP)" API (e.g., API configuration 3 to initiate implementation of the associated back-end protocol) to the producer.

In Step 610, upon receiving the API (in Step 608) and in order to offload the request received in Step 600 of FIG. 6.1 to the SDXI function, the producer enqueues a work descriptor into an SDXI descriptor ring. In one or more embodiments, the work descriptor may include any suitable information for the data within the source buffer (i.e., the data that needs to be moved from the second IHS). The producer may enqueue the descriptor for the SDXI function to make sure that the producer and SDXI function are in sync.

In Step 612, after the producer generates the descriptor in memory (or after the producer enqueues the work in Step 610), the producer notifies the SDXI hardware about the presence of the work (e.g., invokes the SDXI hardware to perform the data retrieval operation). More specifically, the producer may notify the SDXI function about the "new" work that needs to be performed by ringing the doorbell (or by any other manner such as sending a doorbell signal to the SDXI function).

In Step 614, in response to receiving the notification/doorbell in (Step 612), the SDXI function fetches (e.g., using a fetch command and via the IOMMU) the corresponding descriptor(s) from the SDXI descriptor ring via DMA read (e.g., by acting as a DMA hardware to read the descriptor to determine, at least, whether (i) it includes a write operation to persistent memory, (ii) the memory buffer includes one or more physical regions of persistent memory, and/or (iii) targeted source address space, destination address space, a source IP address, and/or a remote IP address are specified to perform the data retrieval operation).

In Step 616, the SDXI function analyzes the "fetched" descriptor to infer a source AKey table entry and a destination AKey table entry that need to be checked to initiate the performance of the requested data retrieval operation. For example, based on the analysis, the SDXI function may infer, at least, (i) the targeted address spaces in the source buffer and destination buffer and (ii) how the operation needs to occur.

In Step 618, the SDXI function analyzes the destination AKey table entry to infer an RKey index and embedded IP address details of the first IHS. In one or more embodiments, the SDXI function may then send the RKey index/value to a NIC function of the first IHS for verification purposes. As indicated above, an IP address is a useful parameter to distinguish different hosts/IHSs within the network (and their related memory address spaces such as source address space and destination address space for the data retrieval operation). With the help of the IP addresses of both first and second IHSs, instead of just stating/using a copy operation based API (e.g., copy (src_addr, dest_addr)), one may state/use more functional/sophisticated yet simple API (e.g., API configuration 3) to perform the data retrieval operation between different IHSs with a better user experience and performance. In Step 620, the SDXI function analyzes the source AKey table entry to infer embedded IP address details of the second IHS.

Turning now to FIG. 6.3, the method shown in FIG. 6.3 may be executed by, for example, the above-discussed SDXI hardware. Other components of the system (100) illustrated in FIG. 1 may also execute all or part of the method shown in FIG. 6.3 without departing from the scope of the invention.

In Step 622, based on the RKey index received in Step 618 of FIG. 6.2 as an input, the NIC function (of the first IHS) reads and verifies that the SDXI function is allowed to perform the operation. Based on that, the NIC function may invoke (e.g., by sending an instruction or a command) the SDXI function to perform the requested data retrieval operation over the RDMA connection.

In Step 624, upon verification in Step 622 and in response to the NIC function's command, the SDXI function directly or indirectly identifies (via a DMA read over the IOMMU) the data in the source buffer based on the embedded IP address details of the second IHS (and the source AKey table entry). In one or more embodiments, the source buffer may include source data that needs to be retrieved to the destination buffer of the first IHS. Thereafter, the SDXI function may provide one or more details of the data to the NIC function so that the NIC function performs the data retrieval operation.

In Step 626, based on the embedded IP address details of the first IHS (e.g., based on the SDXI IP extensions shown in the AKey table) and API configuration 3, the NIC function retrieves the data from the source buffer of the second IHS to the destination buffer of the first IHS with the help of the RDMA connection, SDXI function, and NIC function of the second IHS (e.g., to access the source buffer over the IOMMU of the second IHS). Thereafter, the CA may store the data to persistent storage/database of the first IHS for further or later use.

In Step 628, after receiving a feedback from the processor of the second IHS with respect to the completed data retrieval operation (e.g., after the date retrieval operation is successfully performed), the NIC function may initiate notification of the SDXI function about the completed data retrieval operation.

In Step 630, upon receiving the notification from the NIC function, the SDXI function may initiate notification of the producer about the completed data retrieval operation. In one or more embodiments, upon receiving the notification, the SDXI function may send a completion status signal (e.g., which may indicate that the data retrieval operation has been fully completed and no data are retained in the corresponding memory buffers) to the completion status. Based on that, the producer may also conclude that the SDXI function has completed the work and may rely upon the other completion status block to determine success, failure, or other associated information. In one or more embodiments, the method may end following Step 630.

Turning now to FIG. 7. FIG. 7 shows a diagram of a computing device in accordance with one or more embodiments of the invention. In one or more embodiments of the invention, the computing device (700) may include one or more computer processors (702), non-persistent storage (704) (e.g., volatile memory, such as RAM, cache memory), persistent storage (706) (e.g., a non-transitory computer readable medium, a hard disk, an optical drive such as a CD drive or a DVD drive, a Flash memory, etc.), a communication interface (712) (e.g., Bluetooth interface, infrared interface, network interface, optical interface, etc.), an input device(s) (710), an output device(s) (708), and numerous other elements (not shown) and functionalities. Each of these components is described below.

In one or more embodiments, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (e.g., a LAN, a WAN, Internet, mobile network, etc.) and/or to another device, such as another computing device.

In one or more embodiments, the computing device (700) may include one or more output devices (708), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein. One or more embodiments of the invention may be implemented using instructions executed by one or more processors of a computing device. Further, such instructions may correspond to computer readable instructions that are stored on one or more non-transitory computer readable mediums. While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a data movement operation, comprising:
    sending, by a calling application (CA), an application programming interface (API) configuration to a producer of a first information handling system (IHS) to start implementing a data movement request received from a user;
    upon receiving the API and by the producer, enqueuing a descriptor into a descriptor ring,
        wherein the producer enqueues the descriptor to make sure that the producer and a smart data accelerator interface (SDXI) function are synchronized;
    after enqueuing the descriptor and by the producer, sending a doorbell signal to notify the SDXI function about a presence of the descriptor;
    in response to receiving the doorbell signal and by the SDXI function, fetching the descriptor from the descriptor ring via direct memory access (DMA) read;
    analyzing, by the SDXI function, the descriptor to infer a source access key (AKey) table entry of an AKey table and a destination AKey table entry of the AKey table to initiate the data movement operation;

analyzing, by the SDXI function, the source AKey table entry to infer a receiver access key (RKey) index and a source Internet protocol (IP) address index, wherein the SDXI function sends the RKey index to a network interface controller (NIC) function;

analyzing, by the SDXI function, the destination AKey table entry to infer a destination IP address index;

verifying, by the NIC function and based on the RKey index, that the SDXI function is allowed to perform the operation,
   wherein, after the verification, the NIC function invokes the SDXI function to perform the operation;

upon verification and by the SDXI function, obtaining the data from the source buffer based on the source IP address index,
   wherein, after the obtaining, the SDXI function sends the data to the NIC function;

moving, based on the destination IP address index and by the NIC function, the data to a destination buffer of a second IHS using a transmission control protocol (TCP) connection; and initiating, by the NIC function, notification of the SDXI function about the completed data movement operation.

2. The method of claim 1, further comprising:

prior to sending the API configuration to the producer of the first IHS:
   receiving, by the CA, the data movement request from the user for the data to be moved from the source buffer of the first IHS to the destination buffer of the second IHS;
   sending, upon receiving the data movement request and by the CA, a synchronize sequence numbers (SYN) segment to a processor of the second IHS to initiate a TCP connection establishment process between the first IHS and the second IHS;
   in response to sending SYN segment and by the CA, receiving an acknowledgment field significant (ACK) and SYN segment from the processor of the second IHS;
   in response to receiving the ACK and SYN segment and by the CA, sending an ACK segment to the processor of the second IHS to complete the TCP connection establishment process;
   notifying, by the CA, the administrator about the completed TCP connection establishment process,
      wherein the TCP connection establishment process is required in order to allow an SDXI hardware to manage the data movement operation over the TCP connection,
      wherein the SDXI hardware comprises the SDXI function;
   notifying, by the CA, the SDXI function about the completed TCP connection establishment process; and
   receiving, by the CA, a notification from the SDXI function indicating that the AKey table and an IP address table are updated to reflect the completed TCP connection establishment process.

3. The method of claim 2, wherein in order to reflect the completed TCP connection establishment process on the AKey table, the SDXI function updates the source AKey table entry of the AKey table by inputting the source IP address index to the IP address table and updates the destination AKey table entry of the AKey table by inputting the destination IP address index to the IP address table.

4. The method of claim 2, wherein in order to reflect the completed TCP connection establishment process on the IP address table, the SDXI function updates the IP address table by inputting the IP address of the first IHS and the IP address of the second IHS.

5. The method of claim 4, wherein the source IP address index and the destination IP address index specify IP addresses of interest to perform the data movement operation without embedding the IP address of the first IHS into the source AKey table entry and the IP address of the second IHS into the destination AKey table entry.

6. The method of claim 1, wherein the descriptor specifies at least one selected from a group consisting of a type of the descriptor, an attribute of the data, a source address, a destination address, a source IP address, a destination IP address, a job that has been initiated by the user, and a completion signal indicator.

7. The method of claim 1, wherein, upon receiving the notification from the NIC function, the SDXI function sends a completion status signal to a completion status component to notify the producer that the descriptor has been completed.

8. A method for managing a data movement operation, comprising:

sending, by a calling application (CA), an application programming interface (API) configuration to a producer of a first information handling system (IHS) to start implementing a data movement request received from a user;

upon receiving the API and by the producer, enqueuing a descriptor into a descriptor ring,
   wherein the producer enqueues the descriptor to make sure that the producer and a smart data accelerator interface (SDXI) function are synchronized;

after enqueuing the descriptor and by the producer, sending a doorbell signal to notify the SDXI function about a presence of the descriptor;

in response to receiving the doorbell signal and by the SDXI function, fetching the descriptor from the descriptor ring via direct memory access (DMA) read;

analyzing, by the SDXI function, the descriptor to infer a source access key (AKey) table entry of an AKey table and a destination AKey table entry of the AKey table to initiate the data movement operation;

analyzing, by the SDXI function, the source AKey table entry to infer a receiver access key (RKey) index and an embedded source IP address of the first IHS, wherein the SDXI function sends the RKey index to a network interface controller (NIC) function;

analyzing, by the SDXI function, the destination AKey table entry to infer an embedded destination IP address of a second IHS;

verifying, by the NIC function and based on the RKey index, that the SDXI function is allowed to perform the operation,
   wherein, after the verification, the NIC function invokes the SDXI function to perform the operation;

upon verification and by the SDXI function, obtaining the data from the source buffer based on the embedded source IP address of the first IHS,
   wherein, after the obtaining, the SDXI function sends the data to the NIC function;

moving, based on the embedded destination IP address of the second IHS and by the NIC function, the data to a destination buffer of the second IHS using a remote direct memory access (RDMA) connection; and initiating, by the NIC function, notification of the SDXI function about the completed data movement operation.

9. The method of claim 8, further comprising:
prior to sending the API configuration to the producer of the first IHS:
receiving, by the CA, the data movement request from the user for the data to be moved from the source buffer of the first IHS to the destination buffer of the second IHS;
sending, upon receiving the data movement request and by the CA, a first vendor key assigned to the first IHS to a processor of the second IHS to initiate the RDMA connection establishment process between the first IHS and the second IHS;
in response to sending first vendor key and by the CA, receiving a second vendor key assigned to the second IHS from the processor of the second IHS to complete an RDMA connection establishment process;
notifying, by the CA, the administrator about the completed RDMA connection establishment process,
wherein the RDMA connection establishment process is required in order to allow an SDXI hardware to manage the data movement operation over the RDMA connection,
wherein the SDXI hardware comprises the SDXI function;
notifying, by the CA, the SDXI function about the completed RDMA connection establishment process; and
receiving, by the CA, a notification from the SDXI function indicating that the AKey table is updated to reflect the completed RDMA connection establishment process.

10. The method of claim 9, wherein in order to reflect the completed RDMA connection establishment process on the AKey table, the SDXI function updates the source AKey table entry of the AKey table by embedding a source IP address of the first IHS into the source AKey table entry and updates the destination AKey table entry of the AKey table by embedding a destination IP address of the second IHS into the destination AKey table entry.

11. The method of claim 8, wherein the descriptor specifies at least one selected from a group consisting of a type of the descriptor, an attribute of the data, a source address, a destination address, a job that has been initiated by the user, and a completion signal indicator.

12. The method of claim 8, wherein, upon receiving the notification from the NIC function, the SDXI function sends a completion status signal to a completion status component to notify the producer that the descriptor has been completed.

13. The method of claim 8, wherein the RDMA connection is generated on a secure data transfer path between the first IHS and the second IHS, wherein the first IHS and the second IHS are part of a private network.

14. A method for managing a data retrieval operation, comprising:
sending, by a calling application (CA), an application programming interface (API) configuration to a producer of a first information handling system (IHS) to start implementing a data retrieval request received from a user;
upon receiving the API and by the producer, enqueuing a descriptor into a descriptor ring,
wherein the producer enqueues the descriptor to make sure that the producer and a smart data accelerator interface (SDXI) function are synchronized;
after enqueuing the descriptor and by the producer, sending a doorbell signal to notify the SDXI function about a presence of the descriptor;
in response to receiving the doorbell signal and by the SDXI function, fetching the descriptor from the descriptor ring via direct memory access (DMA) read;
analyzing, by the SDXI function, the descriptor to infer a source access key (AKey) table entry of an AKey table and a destination AKey table entry of the AKey table to initiate the data retrieval operation;
analyzing, by the SDXI function, the destination AKey table entry to infer a receiver access key (RKey) index and an embedded IP address of the first IHS, wherein the SDXI function sends the RKey index to a network interface controller (NIC) function;
analyzing, by the SDXI function, the source AKey table entry to infer an embedded IP address of a second IHS;
verifying, by the NIC function and based on the RKey index, that the SDXI function is allowed to perform the operation,
wherein, after the verification, the NIC function invokes the SDXI function to perform the operation;
upon verification and by the SDXI function, identifying the data in the source buffer based on the embedded IP address of the second IHS,
wherein, after the identifying, the SDXI function sends a detail of the data to the NIC function;
retrieving, based on the embedded IP address of the first IHS and by the NIC function, the data to the destination buffer of the first IHS using a remote direct memory access (RDMA) connection; and
initiating, by the NIC function, notification of the SDXI function about the completed data retrieval operation.

15. The method of claim 14, further comprising:
prior to sending the API configuration to the producer of the first IHS:
receiving, by the CA, the data retrieval request from the user for the data to be retrieved from the source buffer of the second IHS to the destination buffer of the first IHS;
sending, upon receiving the data retrieval request and by the CA, a first vendor key assigned to the first IHS to a processor of the second IHS to initiate the RDMA connection establishment process between the first IHS and the second IHS;
in response to sending first vendor key and by the CA, receiving a second vendor key assigned to the second IHS from the processor of the second IHS to complete an RDMA connection establishment process;
notifying, by the CA, the administrator about the completed RDMA connection establishment process,
wherein the RDMA connection establishment process is required in order to allow an SDXI hardware to manage the data retrieval operation over the RDMA connection,
wherein the SDXI hardware comprises the SDXI function;
notifying, by the CA, the SDXI function about the completed RDMA connection establishment process; and
receiving, by the CA, a notification from the SDXI function indicating that the AKey table is updated to reflect the completed RDMA connection establishment process.

16. The method of claim 15, wherein in order to reflect the completed RDMA connection establishment process on the AKey table, the SDXI function updates the destination AKey table entry of the AKey table by embedding an IP address of the first IHS into the destination AKey table entry and updates the source AKey table entry of the AKey table by embedding an IP address of the second IHS into the source AKey table entry.

17. The method of claim 14, wherein the descriptor specifies at least one selected from a group consisting of a type of the descriptor, an attribute of the data, a source address, a destination address, a job that has been initiated by the user, and a completion signal indicator.

18. The method of claim 14, wherein, upon receiving the notification from the NIC function, the SDXI function sends a completion status signal to a completion status component to notify the producer that the descriptor has been completed.

19. The method of claim 14, wherein the RDMA connection is generated on a secure data transfer path between the first IHS and the second IHS, wherein the first IHS and the second IHS are part of a private network.

20. The method of claim 19, wherein the secure data transfer path utilizes a tunneling protocol.

* * * * *